United States Patent [19]
Kaufman et al.

[11] Patent Number: 5,847,711
[45] Date of Patent: Dec. 8, 1998

[54] APPARATUS AND METHOD FOR PARALLEL AND PERSPECTIVE REAL-TIME VOLUME VISUALIZATION

[75] Inventors: Arie E. Kaufman, Plainview; Ingmar Bitter, Stony Brook, both of N.Y.

[73] Assignee: The Research Foundation of State University of New York, Albany, N.Y.

[21] Appl. No.: 910,575

[22] Filed: Aug. 1, 1997

Related U.S. Application Data

[63] Continuation-in-part of Ser. No. 388,066, Feb. 13, 1995, abandoned, which is a continuation-in-part of Ser. No. 301,205, Sep. 6, 1994, Pat. No. 5,594,842.

[60] Provisional application No. 60/043,013 Apr. 15, 1997.

[51] Int. Cl.⁶ ................................................. G06T 15/00
[52] U.S. Cl. .............................................................. 345/424
[58] Field of Search ..................................... 345/424, 427

[56] References Cited

U.S. PATENT DOCUMENTS

| | | | |
|---|---|---|---|
| 4,827,413 | 5/1989 | Baldwin et al. | 345/126 |
| 4,835,712 | 5/1989 | Drebin et al. | 345/423 |
| 4,984,157 | 1/1991 | Cline et al. | 345/424 |
| 4,985,856 | 1/1991 | Kaufman et al. | 345/424 |
| 5,038,302 | 8/1991 | Kaufman | 345/424 |
| 5,101,475 | 3/1992 | Kaufman et al. | 345/424 |
| 5,313,567 | 5/1994 | Civanlar et al. | 345/424 |
| 5,317,689 | 5/1994 | Nack et al. | 345/505 |
| 5,361,385 | 11/1994 | Bakalash | 345/424 |
| 5,381,518 | 1/1995 | Drebin et al. | 345/424 |
| 5,412,764 | 5/1995 | Tanaka | 345/424 |
| 5,557,711 | 9/1996 | Malzbender | 345/424 |
| 5,594,842 | 1/1997 | Kaufman et al. | 345/424 |
| 5,594,844 | 1/1997 | Sakai et al. | 345/424 |
| 5,760,781 | 6/1998 | Kaufman et al. | 345/424 |

OTHER PUBLICATIONS

Foley, "*Computer Graphics: Principles and Practice, 2nd Edition*" (pp. 738, 835–842, 914, 1034–1039) 1990.

Kaufman et al, "*A Survey of Architectures for Volume Rendering*", (IEEE Engineering in Medicine and Biology Magazine pp. 18–23) Dec., 1990.

*Primary Examiner*—Mark K. Zimmerman
*Attorney, Agent, or Firm*—Hoffmann & Baron,LLP

[57] ABSTRACT

An apparatus and method for parallel and perspective real-time volume visualization. The method employs ray-slice-sweeping and includes the steps of selecting viewing and processing parameters; initializing a compositing buffer; sampling voxel values from a three dimensional memory buffer onto a current slice of sample points; combining the sample point values with pixels of the compositing buffer along a plurality of interstice ray segments which extend only between the current slice and an adjacent slice associated with the compositing buffer; and repeating the sampling and combining steps by subsequentially sweeping through subsequent slices of sample points parallel to the first processing slice until the last processing slice is reached. Each of the subsequent slices in turn becomes the current slice. The apparatus includes a three dimensional buffer; a pixel bus; a plurality of rendering pipelines; and a control unit. The plurality of rendering pipelines each include a first slice unit; a compositing unit; a two dimensional slice compositing buffer; and a first (preferably bilinear) interpolation unit. Sample point values are combined with pixels of the compositing buffer in the compositing unit along the plurality of interslice ray segments which extend only between a current slice contained in the slice unit and a slice contained in the two-dimensional slice compositing buffer. In the apparatus and method of the present invention, gradients are computed at voxel positions, improving accuracy and allowing for a more compact implementation with less control overhead than prior methods and apparatuses.

37 Claims, 45 Drawing Sheets

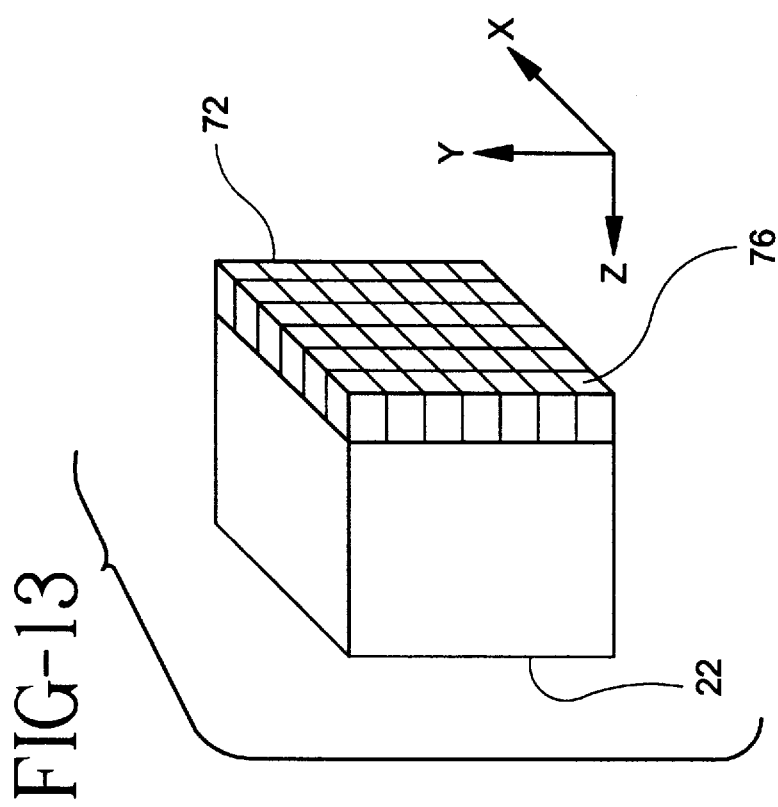

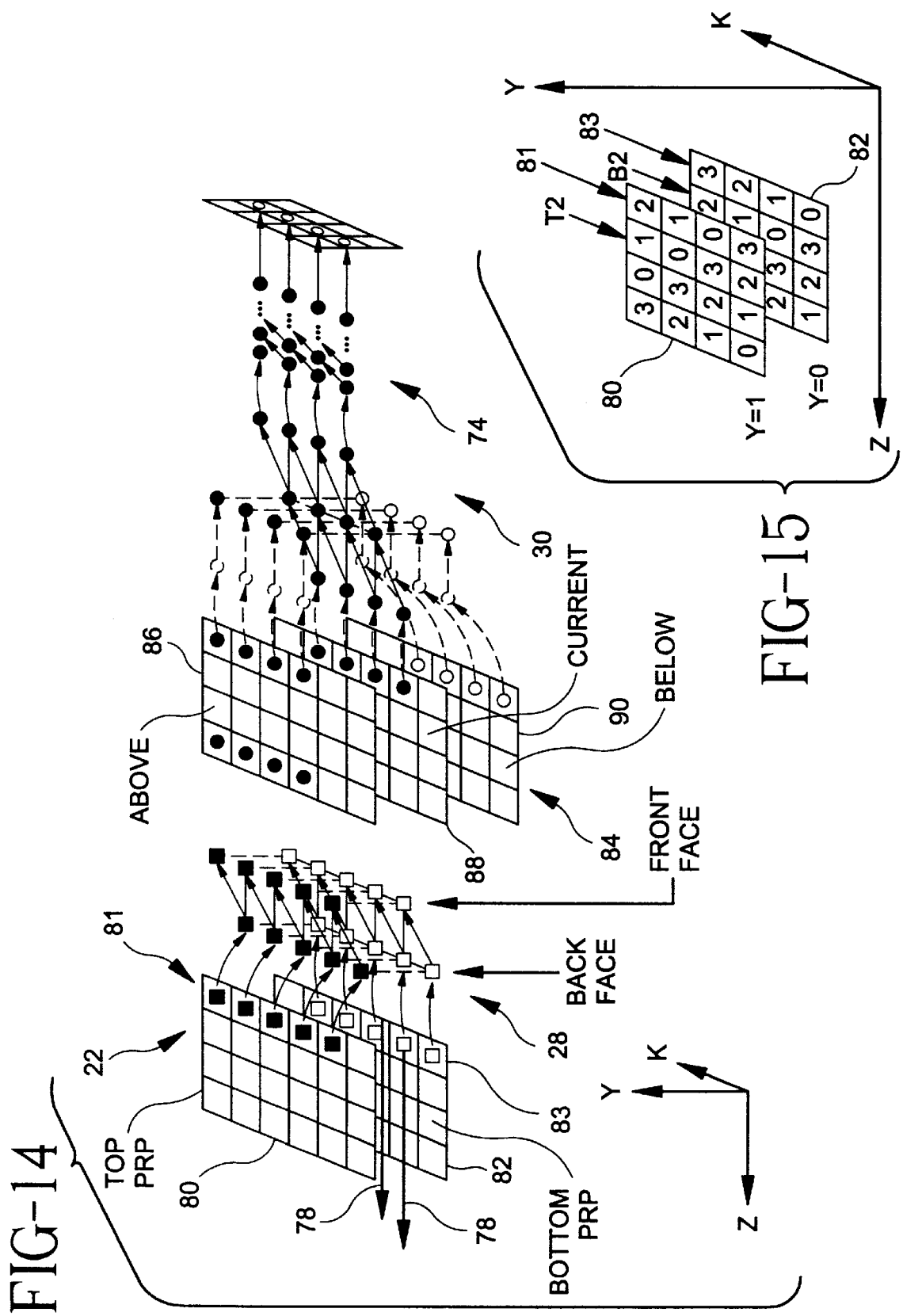

T = TRILIN
S = SHADER
C = COMPOS

FIG-17 VIEWPOINT IN FRONT OF DATASET

FIG-18 VIEWPOINT IN BACK OF DATASET

FIG-26
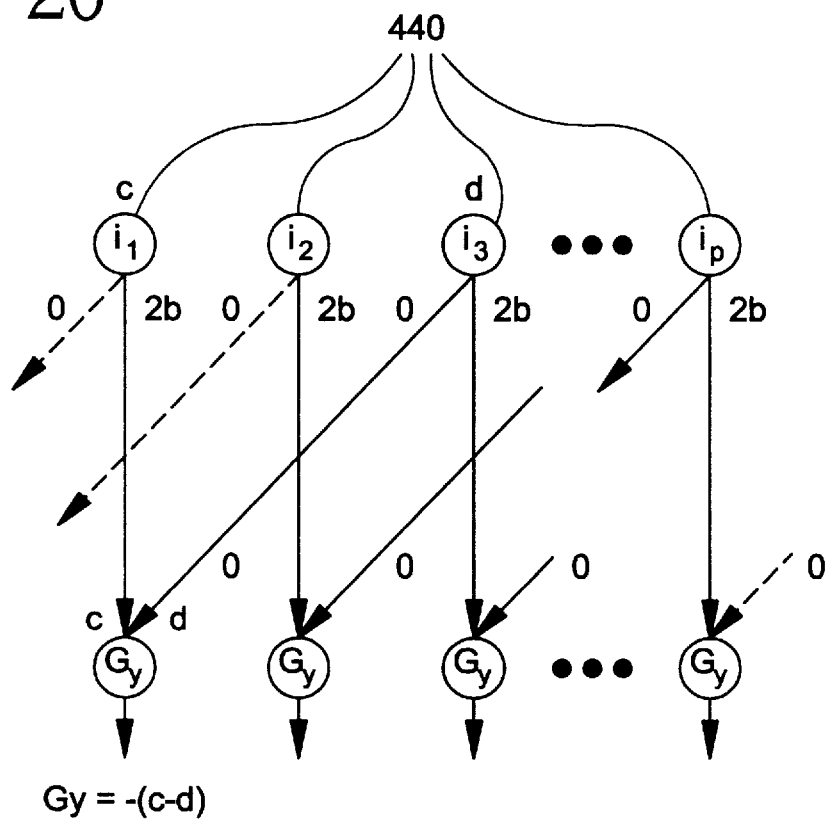
$Gy = -(c-d)$
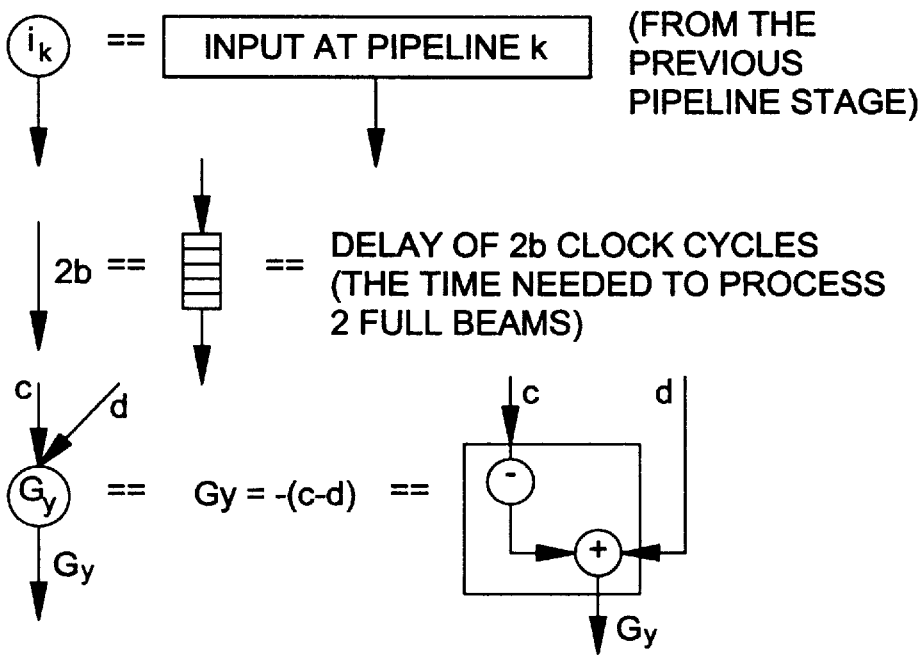

FIG-27
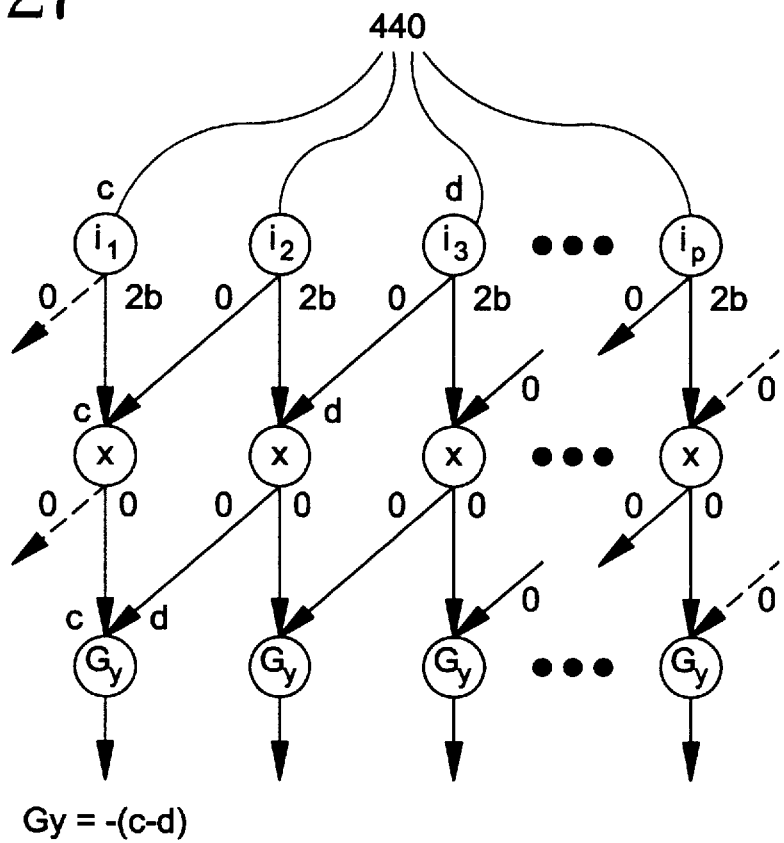
$Gy = -(c-d)$
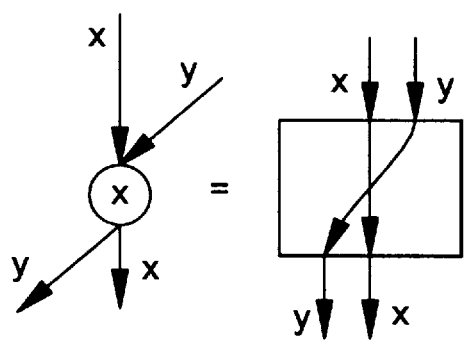

FIG-31
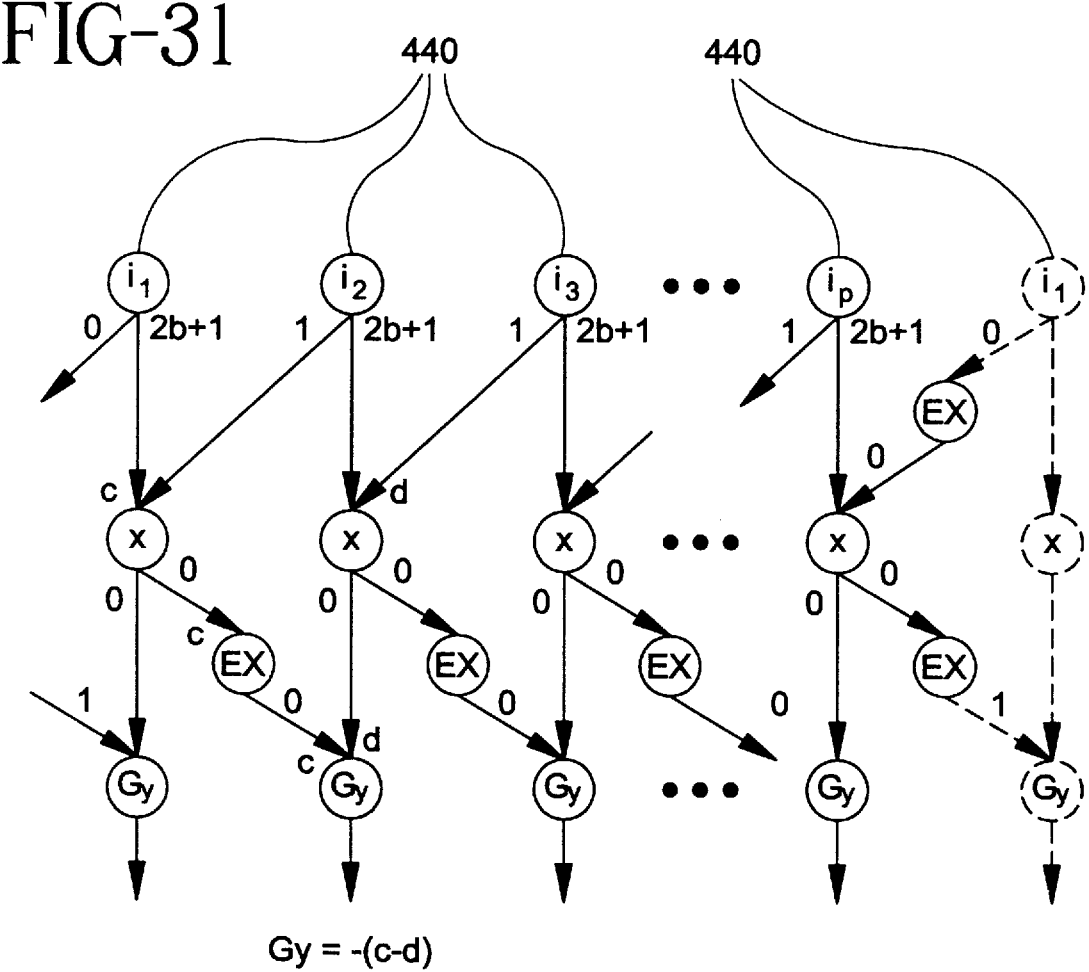
$Gy = -(c-d)$
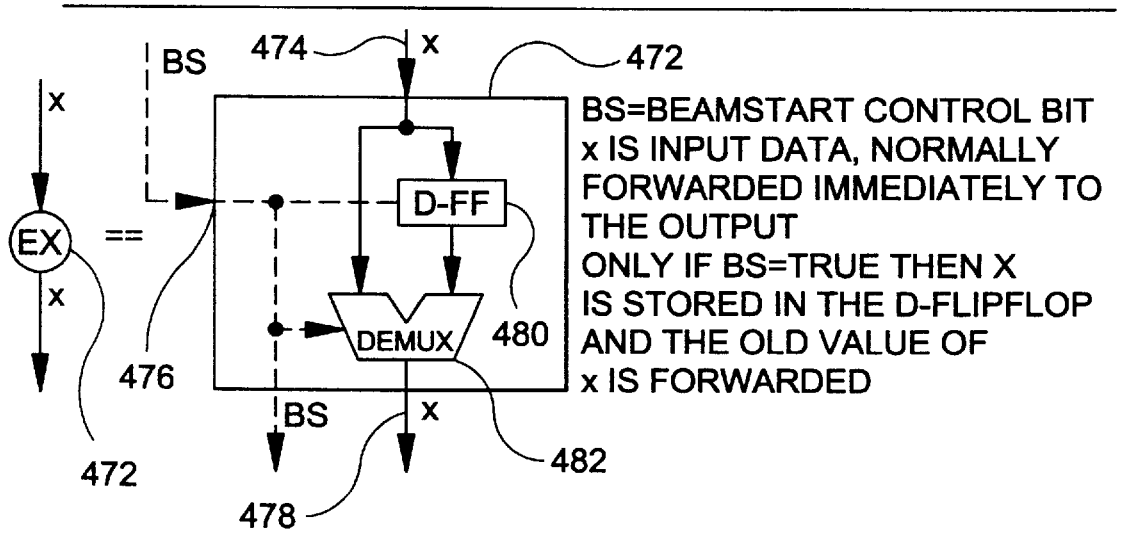
BS=BEAMSTART CONTROL BIT
x IS INPUT DATA, NORMALLY
FORWARDED IMMEDIATELY TO
THE OUTPUT
ONLY IF BS=TRUE THEN X
IS STORED IN THE D-FLIPFLOP
AND THE OLD VALUE OF
x IS FORWARDED
EXTENSIONS TO THE RIGHT HAVE TO DELAY
THE BS CONTROL BIT BY Icc

FIG-32
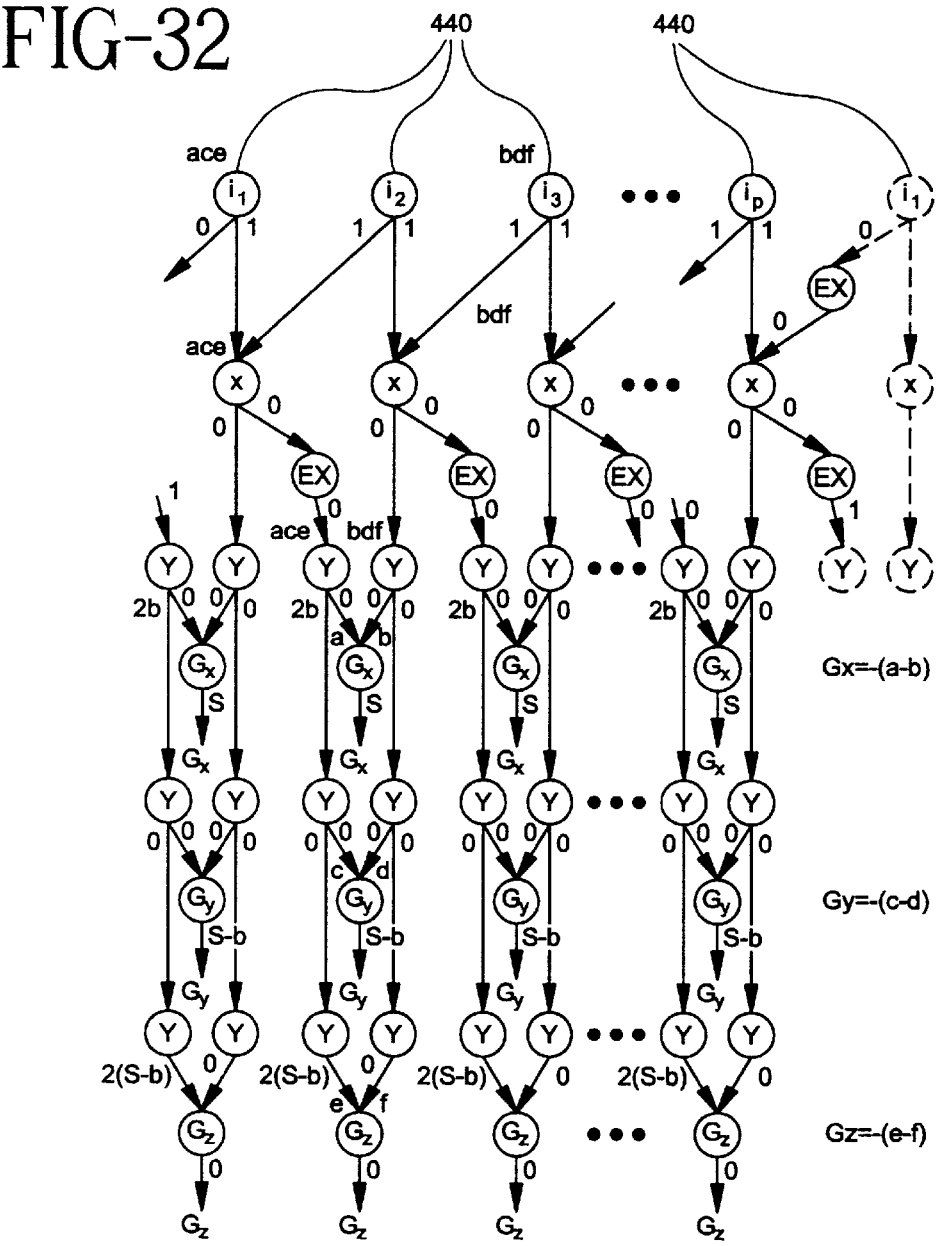
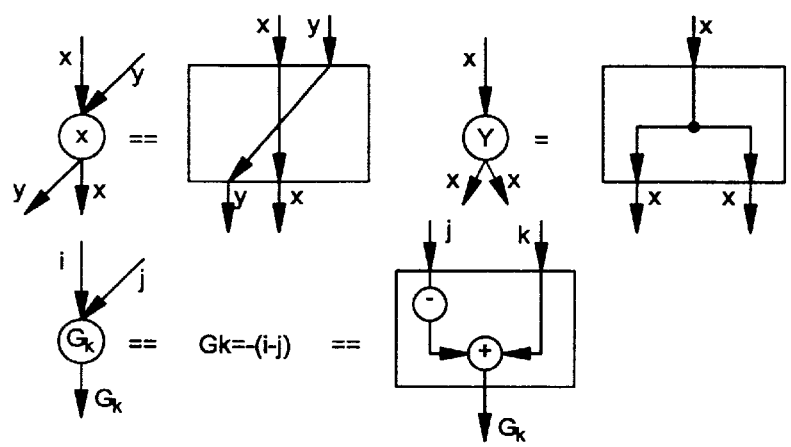

$S_k$ = NEW PIXEL FROM THE SHADER AND CLASSIFICATION STAGES $C_k$ = COMPOSITION OF NEW AND ACCUMULATED PIXELS

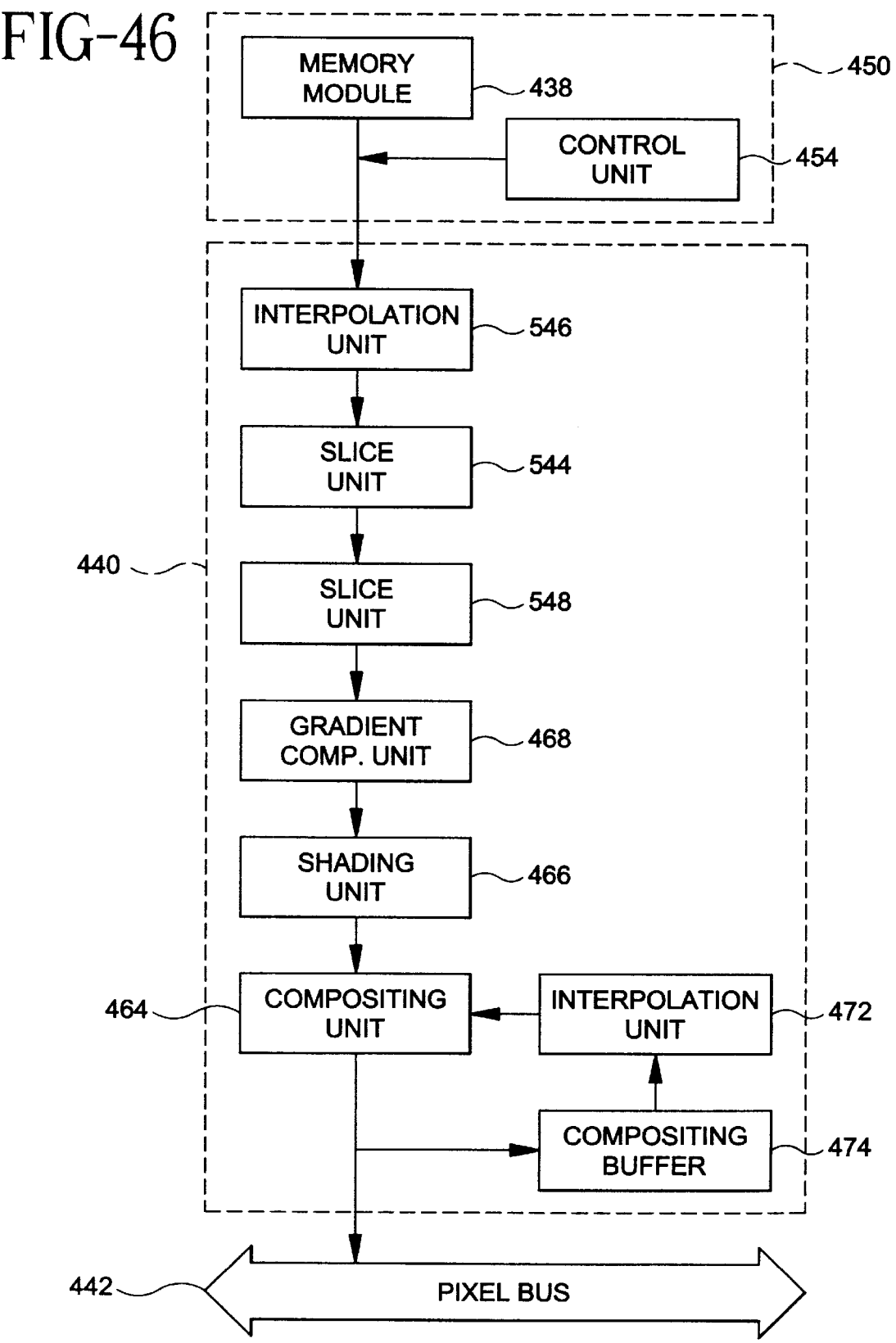

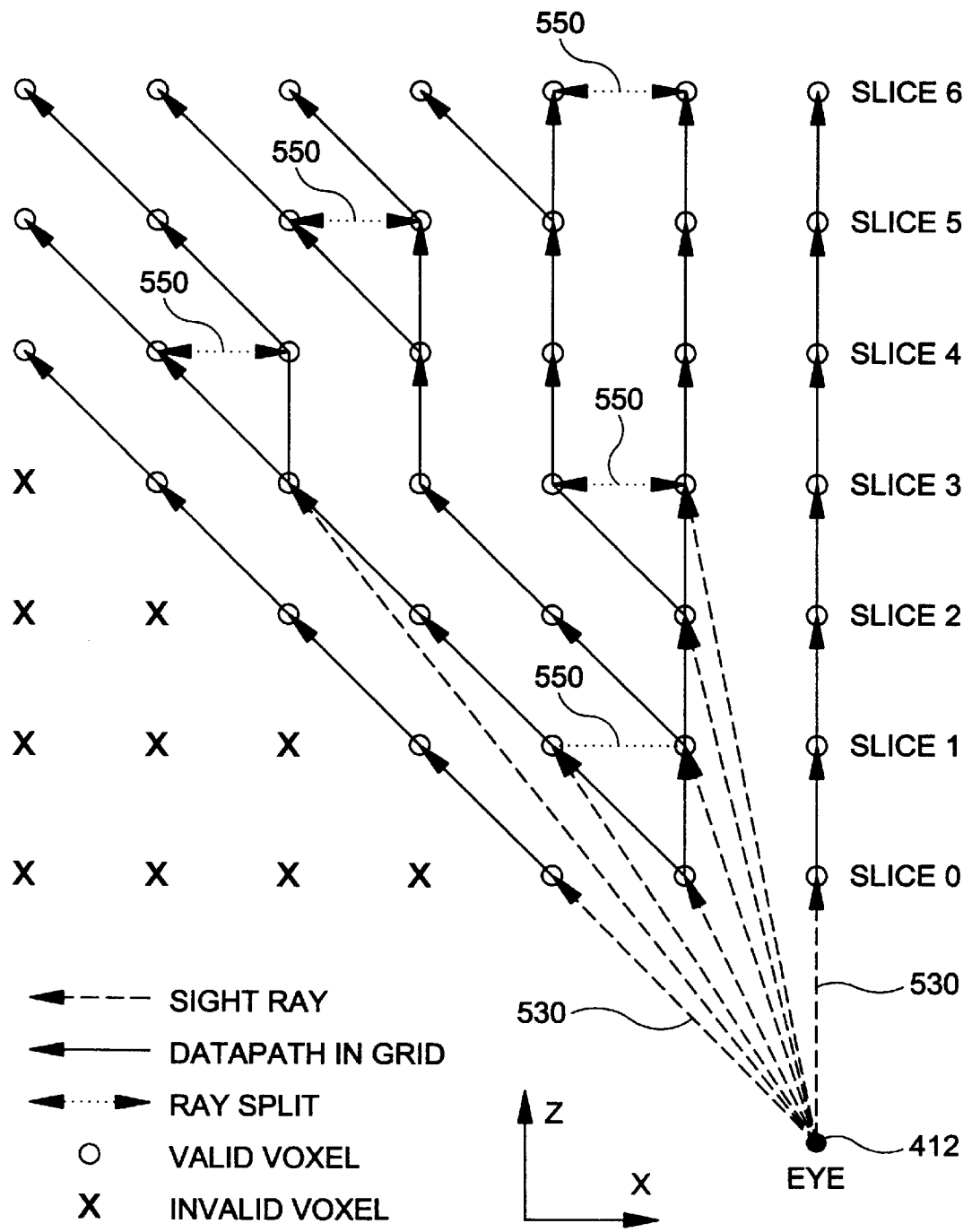

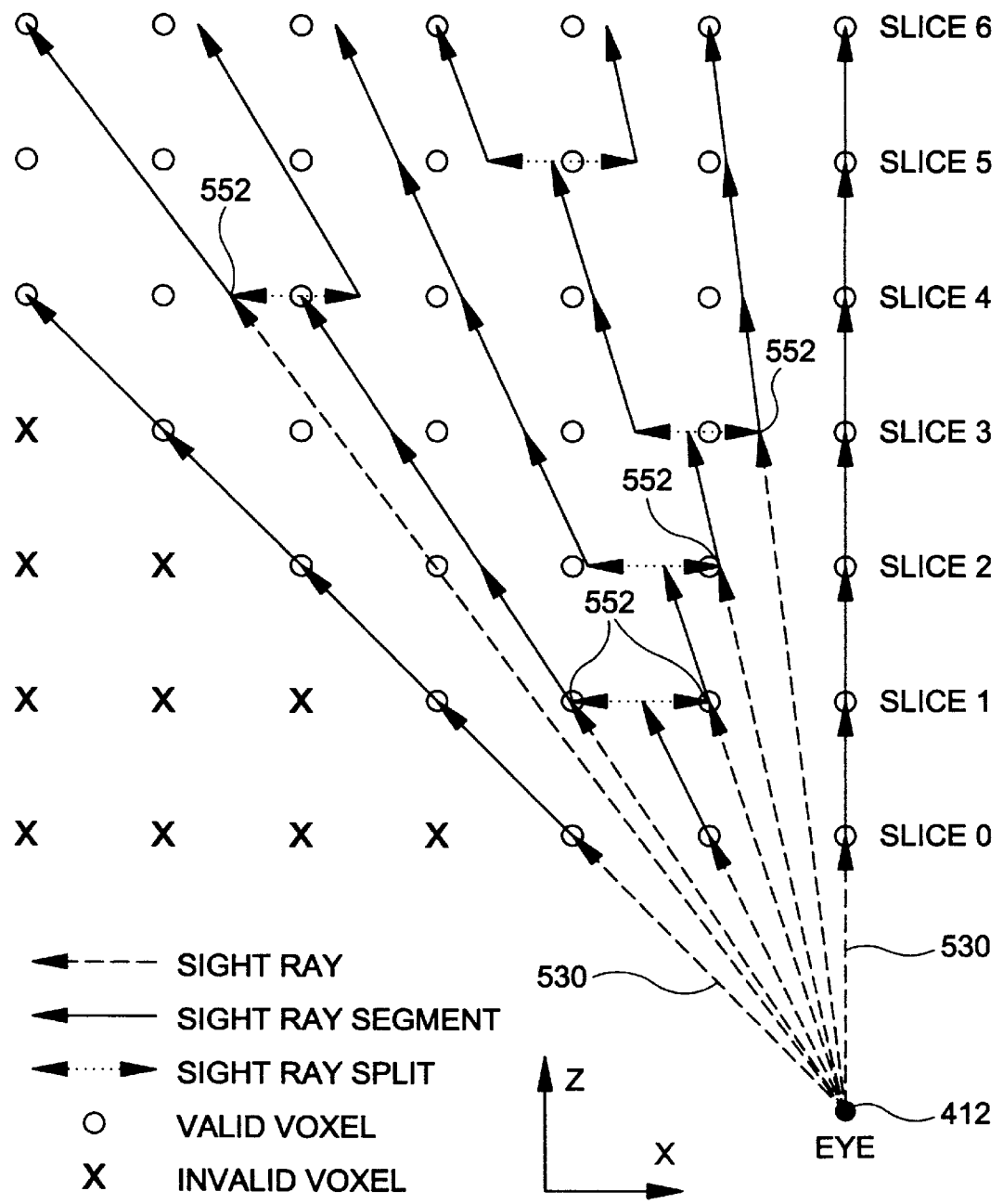

APPARATUS AND METHOD FOR PARALLEL AND PERSPECTIVE REAL-TIME VOLUME VISUALIZATION

BACKGROUND OF THE INVENTION

This application claims priority to U.S. Provisional Patent Application Ser. No. 60/043,013 filed Apr. 15, 1997. This application is a continuation-in-part of U.S. patent application Ser. No. 08/388,066 filed Feb. 13, 1995, now abandoned, which is in turn a continuation-in-part of U.S. patent application Ser. No. 08/301,205 filed Sep. 6, 1994, now U.S. Pat. No. 5,594,842 issued Jan. 14, 1997.

STATEMENT OF GOVERNMENT RIGHTS

This invention was made with Government support under contract MIP-9527694 awarded by the National Science Foundation. The Government has certain rights in the invention.

The present invention relates to three dimensional (3-D) graphics and volumetric imaging, and more particularly to an apparatus and method for real-time parallel and perspective projection of high resolution volumetric images.

Image rendering is the process of converting complex information to a format which is amendable to human understanding while maintaining the integrity and accuracy of the information. Volumetric data, which consists of information relating to three-dimensional phenomena, is one species of complex information that can benefit from improved image rendering techniques. The process of analyzing volumetric data to determine, from a given viewpoint, which portions of a volume are to be presented is commonly referred to as volume visualization. Traditional methods of volume visualization operate by scanning through data points in a sequential manner in order to provide an accurate representation of an object. The need to model objects in real-time and the advantage of doing so using computer graphic systems is clear.

Special purpose computer architectures and methods for volume visualization are known. Referring now to FIG. 1, a volume visualization system 1 is shown. The volume visualization system 1 includes a cubic frame buffer 2 having a skewed memory organization which enables conflict free access of a beam of voxels in any orthographic direction, a two-dimensional (2-D) skewed buffer 4, a ray projection tree 6, and two conveyers 8, 10. The conveyors are commonly referred to as barrel shifters. A first conveyor 8 is coupled between the cubic frame buffer and the two dimensional skewed buffer, while a second conveyor 10 is coupled between the two-dimensional skewed buffer and the ray projection tree. This volume visualization system is capable of providing parallel projection in $O(n^2 \log n)$ time, where n is the measurement of one axis of the cubic frame buffer.

The operation and interrelationship of the cubic frame buffer 2 and the 2-D skewed buffer are shown in FIG. 2. The traditional volume visualization system 1 operates by casting viewing rays 12, originating at a pixel in a projection plane (not shown), through the cubic frame buffer 2 along a selected viewing direction. The viewing rays access a plurality of voxels 14 (defining a projection ray plane (PRP)16) stored in the cubic frame buffer. The voxels defining the PRP are simultaneously retrieved by orthogonal beams 18 and provided to the conveyor 8.

The conveyor 8 provides a 2-D shearing of the voxels of the orthogonal beams which define the PRP. This 2-D shearing serves to align all of the voxels of each discrete viewing ray along a direction parallel to a 2-D axis of the 2-D skewed buffer to provide skewed viewing rays. Once the viewing rays are aligned in the 2-D skewed buffer, the skewed viewing rays can be retrieved and processed by the ray projection tree 6.

Before the ray projection tree 6 receives the skewed viewing rays, the accessed skewed viewing rays are provided to conveyor 10. The conveyor 10 preforms a deskewing operation in order to match the physical sequential order of the input modules of the ray projection tree 6 to the sequential order of the voxels of each viewing ray. Specifically, each viewing ray is shifted such that the first voxel in each projection ray appears at the corresponding first input position of the ray projection tree. The voxels of each ray are then processed by the ray projection tree in parallel so as to generate a pixel value associated with that projection ray.

The above-disclosed volume visualization system has substantial shortcomings and drawbacks. First, the speed at which the system operates is limited by the system architecture which provides arbitrary parallel and orthographic projections in $O(n^2 \log n)$ time. Secondly, the ray projection tree requires that each projection ray be provided thereto in a specific orientation. This requires a conveyor between the two-dimensional skewed buffer and the ray projection tree which adds to the overall hardware required by the system and the time needed for volume visualization. Thirdly, the traditional system provides only surface approximations of discrete projection rays by utilizing the closest non-transparent discrete voxel to points along the discrete projection rays instead of actual values along the continuous projection rays. This provides a somewhat inaccurate representation of the object. Fourthly, the conveyors are not readily capable of shifting data in a manner required for perspective projection (fanning and defanning of data) and real-time visualization of four-dimensional (4-D) data.

It is therefore an object of the present invention to provide a method and apparatus which operate faster than existing volume visualization systems.

It is also an object of the present invention to provide a method and apparatus which is more efficient than existing volume visualization systems.

It is a further object of the present invention to provide a method and apparatus which provide better resolution and a more accurate representation of objects than existing volume visualization systems.

It is another object of the present invention to provide a method and apparatus which are readily capable of supporting perspective projection and real-time visualization of four-dimensional (4-D) data.

It is yet another object of the present invention to provide a method and apparatus that accesses voxel data from the cubic frame buffer only once per projection.

It is yet another object of the present invention to provide a method and apparatus which overcome the inherent disadvantages of known volume visualization systems.

It is still a further object of the present invention to provide a method for perspective projection in which all voxels of the data set contribute to the rendering.

It is still another object of the present invention to provide an apparatus and method which compute gradients at voxel positions in order to improve accuracy and allow more compact implementation.

It is yet a further object of the present invention to provide an apparatus and method for volume visualization which have less control overhead than prior apparatuses and methods.

Other and further objects will be made known to the artisan as a result of the present disclosure, and it is intended to include all such objects which are realized as a result of the disclosed invention.

SUMMARY OF THE INVENTION

In a ray-slice-sweeping method, according to the present invention, for generating a three-dimensional volume projection image, a first step consists of selecting viewing and processing parameters which define a view point from which the image is generated and at least one base plane of a three dimensional buffer in which discrete voxels having a location and at least one voxel value are stored. The base plane is employed for projection purposes. The viewing and processing parameters also define first and last processing slices of the three dimensional buffer. The method includes the additional steps of initializing a compositing buffer having a plurality of pixels, each of which has at least color, transparency and position associated with it; sampling voxel values from the three dimensional buffer onto a current slice of sample points which are parallel to the first processing slice, in order to provide sample point values; and combining the sample point values with the pixels of the compositing buffer. The current slice is the first processing slice during the first execution of the sampling step. In the combining step, the combination occurs along a plurality of interslice ray segments which extend only between the current slice and an adjacent slice associated with the compositing buffer. The sampling and combining steps are repeated by sequentially sweeping through subsequent slices of sample points which are parallel to the first processing slice, until the last processing slice is reached. Each of the subsequent slices in turn becomes the current slice.

In a first preferred method, the sampling step includes sampling voxel values from the three dimensional buffer directly onto grid points of the current slice of sample points, with the sample points coinciding with the grid points. The combining step includes the substep of casting a plurality of sight rays from the view point through the grid points of the current slice of sample points. The interslice ray segments extend along the sight rays from the sample points of the current slice to the adjacent slice associated with the compositing buffer, which they intersect at a plurality of intersection points. Further, when the sampling and combining steps are repeated, the sight rays are recast as each of the subsequent slices becomes the current slice. In the first preferred method, an additional step includes performing one of zero order, first order, second order, third order, and higher order interpolation, or an adaptive combination thereof, among the pixels of the compositing buffer adjacent the intersection points in order to provide interpolated pixel values for combination with the sample points of the current slice.

In a second preferred method according to the present invention, the combining step includes the sub-step of casting a plurality of sight rays from the view point through locations in the adjacent slice associated with the compositing buffer which correspond to grid point locations of the pixels within the compositing buffer. The sight rays intersect the current slice at a plurality of intersection points. Further, the sampling step includes sampling the voxel values from the three dimensional buffer onto the plurality of intersection points by performing zero, first, second, third or higher order interpolation, or an adaptive combination thereof, among voxel values associated with the voxel locations adjacent the plurality of intersection points. Finally, when the sampling and combining steps are repeated, the sight rays are recast as each of the subsequent slices becomes the current slice.

In a third preferred method according to the present invention, the sampling step includes sampling the voxel values from the three dimensional buffer directly onto grid points of the current slice of sample points, with the sample points coinciding with the grid points. A first execution of the combining step includes the sub-step of casting a plurality of sight rays from the view point through the grid points of the current slice of sample points, with the interslice ray segments extending from the sample points of the current slice to intersections of the sight rays with the compositing buffer. The method further includes performing one of zero, first, second, third or higher order interpolation, or an adaptive combination thereof, among pixels of the compositing buffer adjacent to the intersection points in order to provide interpolated pixel values for combination with the simple points of the current slice. The results of the interpolation and the combination step are stored, with an accumulated offset, in grid point locations of those pixels in the compositing buffer which are closest to the intersections of the sight rays with the compositing buffer.

Further, one of merging and splitting of the interslice ray segments is performed. Merging is performed when an attempt is made to store two or more of the results of the interpolation and combination at an identical grid point location; whereas splitting is performed when interslice ray segments diverge beyond a divergence threshold. Additional steps in this preferred method include maintaining the sight rays formed in the first execution of the combining step throughout the sequential sweeping except when the merging or splitting is performed; generating a new sight ray from the view point to a preselected location in the neighborhood of the identical grid point location when the merging is performed; generating two new sight rays from the view point to corresponding preselected locations in the current slice when splitting is performed; and storing the results of the interpolation and the combination in an adjacent grid point location when the accumulated offset exceeds a predetermined value. In the latter case, the storing is done together with a new value for the accumulated offset.

In a particularly preferred form of the third preferred method, an additional step includes dividing the three dimensional buffer into a plurality of zones, separated by zone boundaries, with the merging and splitting being confined to the zones and not occurring across the zone boundaries. The zones and zone boundaries, are selected to enhance the image sharpness and accuracy; most preferably by forming generalized three dimensional pyramids extending from the view point through boundaries of pixels associated with the base plane into the three dimensional buffer.

In a fourth preferred method in accordance with the present invention, a first execution of the combining step includes the substep of casting a plurality of sight rays from the view point through locations in the adjacent slice associated with the compositing buffer. The locations correspond to grid point locations of the pixels within the compositing buffer and the sight rays intersect the current slice at a plurality of intersection points. The interslice ray segments extend from the grid point locations of the pixels within the compositing buffer to the intersection points. Further, the sampling step includes sampling the voxel values from the 3-D buffer onto the plurality of intersection points by one of zero order, first order, second order, third order and higher order interpolation, and adaptive combinations thereof, performed among voxel values associated with voxel locations adjacent the plurality of intersection points. Additional steps include storing the results of the interpolation and the combination, with an accumulated offset, in the grid point locations of the pixels within the compositing buffer; performing one of merging and splitting of the interslice ray segments; and maintaining the sight rays formed in the first execution of the combining step, except when one of the merging and splitting is performed. The merging is performed when an attempt is made to store two or more of the results of the interpolation and the combination in an identical grid point location. Two or more of the interslice slice ray segments are merged in this case. The splitting is performed for at least one interslice ray segment when adjacent interslice ray segments diverge beyond a divergence threshold.

The fourth preferred method includes the additional steps of generating a new sight ray from the view point to a preselected location in the neighborhood of the identical grid point location when the merging is performed; generating two new sight rays from the view point to the corresponding preselected locations in the compositing buffer when the splitting is performed; and storing the results of the interpolation and the combination in an adjacent one of the grid point locations when the accumulated offset exceeds a predetermined value. Storing is done together with a new value of the accumulated offset. In an especially preferred form of the fourth preferred method, the method further includes the additional step of dividing the three dimensional buffer into a plurality of zones which are separated by zone boundaries, with the merging and splitting being confined to individual zones and adjacent zones on either side of that zone and not occurring, for a given zone, across more than one of the zone boundaries on each side of the given zone. The zones and zone boundaries are selected for enhancing image sharpness and accuracy, and for reduction of aliasing. They are preferably determined by forming generalized three dimensional pyramids extending from the view point through boundaries of the pixels associated with the base plane into the three dimensional buffer.

An apparatus, in accordance with the present invention, for parallel and perspective real-time volume visualization via ray-slice-sweeping includes a three dimensional buffer; a pixel bus; a plurality of rendering pipelines; and a control unit. The apparatus is responsive to viewing and processing parameters which define the view point, and the apparatus generates a three dimensional volume projection image from the view point. The image has a plurality of pixels.

The three dimensional buffer stores a plurality of discrete voxels, each of which has a location and at least one voxel value associated therewith. The three dimensional buffer includes a plurality of memory units and the viewing and processing parameters define at least one base plane of the three dimensional buffer as well as first and last processing slices of the three dimensional buffer. The pixel bus provides global horizontal communication. The control unit initially designates the first processing slice as a current slice and controls sweeping through subsequent slices of the three dimensional buffer as current slices, until the last processing slice is reached.

Each of the plurality of rendering pipelines is vertically coupled to a corresponding one of the plurality of memory units and to the pixel bus, and each of the rendering pipelines has horizontal communication with at most its two nearest neighbors. Each of the rendering pipelines in turn comprises at least a first slice unit; a compositing unit; a two-dimensional slice compositing buffer; and a first bilinear interpolation unit. The slice unit has an input coupled to the corresponding one of the plurality of memory units and an output, and it includes a current slice of sample points which are parallel to the first processing slice. The slice unit receives voxel values from the three dimensional buffer onto sample points in order to provide sample point values. The compositing unit has an input coupled to the output of the slice unit and has an output coupled to the pixel bus. The two dimensional slice compositing buffer has a plurality of pixels, each of which has at least color, transparency and position associated with it. The compositing buffer has an input coupled to the output of the compositing unit and has an output coupled to the input of the compositing unit.

The first bilinear interpolation unit has an input which is coupled to either the output of the compositing buffer or the corresponding one of the plurality of memory units. The bilinear interpolation unit also has an output. The output of the bilinear interpolation unit is coupled to the input of the compositing unit when the input of the bilinear interpolation unit is coupled to the output of the compositing buffer. The output of the bilinear interpolation unit is coupled to the input of the slice unit when the input of the bilinear interpolation unit is coupled to the corresponding one of the plurality of memory units.

The sample point values are combined with the pixels of the compositing buffer in the compositing unit. The combination occurs along a plurality of interslice race segments which extend only between the current slice in the slice unit and a slice contained in the two-dimensional slice compositing buffer.

In a first preferred form of the apparatus according to the present invention, the slice unit receives the voxel values from the three-dimensional buffer directly onto grid points of the current slice of sample points, and the sample points coincide with the grid points. The interslice ray segments extend along the plurality of sight rays cast from the view point through the grid points of the current slice of sample points. The interslice ray segments extend from the sample points of the current slice in the slice unit to the slice contained in the two-dimensional slice compositing buffer, and they intersect the slice contained in the two-dimensional slice compositing buffer at a plurality of intersection points. The bilinear interpolation unit has its input coupled to the output of the compositing buffer and its output coupled to the input of the compositing unit. It receives signals associated with pixels of the two-dimensional slice compositing buffer which are adjacent to the intersection points and provides interpolated pixel values for combination with the sample points of the current slice in the compositing unit. The control unit recasts the sight rays as each of the subsequent slices becomes the current slice.

In a second preferred form of apparatus in accordance with the present invention, the first bilinear interpolation unit has its input coupled to the three dimensional buffer and its output coupled to the input of the slice unit. The interslice ray segments extend along a plurality of sight rays cast from the view point through locations in the slice contained in the two dimensional slice compositing buffer. The locations correspond to grid point locations of the pixels within the compositing buffer, and the sight rays intersect the current slice at a plurality of intersection points. The first bilinear interpolation unit receives voxel values associated with voxel locations adjacent the plurality of intersection points and interpolates among the voxel values to provide interpolated voxel values associated with the plurality of intersection points. The control unit recasts the sight rays as each of the subsequent slices becomes the current slice.

In a third preferred form of the apparatus in accordance with the present invention, the slice unit receives the voxel values from the three dimensional buffer directly onto grid points of the current slice of sample points. The sample points coincide with the grid points. The interslice ray segments extend along a plurality of sight rays cast from the view point through the grid points of the current slice of sample points. The interslice ray segments extend from the sample points of the current slice in the slice unit to the slice contained in the two dimensional slice compositing buffer. The interslice ray segments intersect the slice contained in the two dimensional slice compositing buffer at a plurality of intersection points. The first bilinear interpolation unit has its input coupled to the output of the compositing buffer and its output coupled to the input of the compositing unit. The bilinear interpolation unit receives signals associated with the pixels of the two dimensional slice compositing buffer which are adjacent to the intersection points and provides interpolated pixel values for combination with the sample points of the current slice in the compositing unit. The results of the combination of the interpolated pixel values and the sample points of the current slice are stored, with an accumulated offset, in grid point locations of those of the pixels in the compositing buffer which are closest to the intersection of the sight rays with the compositing buffer.

The control unit enables one of merging and splitting of the interslice ray segments. Merging of two or more interslice ray segments is performed when an attempt is made to store two or more of the results of the interpolation and the combination at an identical grid point location. Splitting of at least one of the interslice ray segments is performed when adjacent interslice ray segments diverge beyond a divergence threshold. The control unit maintains the sight rays throughout the sequential sweeping through the subsequent slices, except when either merging or splitting is performed. When the merging is performed, the control unit generates a new sight ray from the view point to a preselected location in the neighborhood of the identical grid point location. When the splitting is performed, the control unit generates two new sight rays from the view point to corresponding preselected locations in the current slice. The control unit stores the results of the interpolation and the combination in an adjacent one of the grid point locations when the accumulated offset exceeds a predetermined value. In this case, the storing is done together with a new accumulated offset value. In a particularly preferred form of the third preferred apparatus, the control unit divides the three dimensional buffer into a plurality of zones separated by zone boundaries, with merging and splitting confined to the zones and not occurring across the zone boundaries. The zones and zone boundaries are selected for enhancing the image sharpness and accuracy.

In a fourth preferred form of apparatus in accordance with the present invention, the first bilinear interpolation unit has its input coupled to the three dimensional buffer and its output coupled to the input of the slice unit. The interslice ray segments extend along a plurality of sight rays cast from the view point through locations in the slice contained in the two dimensional slice compositing buffer. The locations correspond to grid point locations of the pixels within the compositing buffer. The sight rays intersect the current slice at a plurality of intersection points.

The first bilinear interpolation unit receives voxel values associated with voxel locations adjacent the plurality of intersection points and interpolates among the voxel values to provide interpolated voxel values associated with the plurality of intersection points for combination with the pixels of the compositing buffer. Results of the combination are stored, with an accumulated offset, in the grid point locations of the pixels within the compositing buffer.

The control units enables one of merging and splitting of the interslice ray segments. Merging of two or more interslice ray segments is performed when an attempt is made to store two or more of the results of the interpolation and the combination at an identical grid point location. Splitting is performed for at least one of the interslice ray segments when adjacent interslice ray segments diverge beyond a divergence threshold. The control unit maintains the sight rays throughout the sequential sweeping through the subsequent slices, except when merging or splitting is performed. It also generates a new sight ray from the view point to a preselected location in the neighborhood of the identical grid point location when the merging is performed and generates two new sight rays from the view point to the corresponding preselected locations in the compositing buffer when the splitting is performed. Yet further, the control unit stores the results of the interpolation and the combination in an adjacent one of the grid point locations when the accumulated offset exceeds a predetermined value. The storing is done together with a new value for the accumulated offset. In an especially preferred form of the fourth preferred embodiment, the control unit divides the three dimensional buffer into a plurality of zones separated by zone boundaries, with the merging and splitting confined to individual zones and adjacent zones only and not occurring, for any given zone, across more than one of the zone boundaries on each side of the given zone. The zones and zone boundaries are selected for enhancing image sharpness and accuracy, and for reduction of aliasing.

The apparatus of the present invention can also employ a global feedback connection between the pixel bus and the three dimensional buffer. The global feedback connection forms a global loop which is configured for feedback from the pixel bus to the 3-D buffer, and subsequently to any intermediate stage in the plurality of rendering pipelines. The global feedback loop can be used with any of the foregoing embodiments of the apparatus of the present invention.

The apparatus and method of the present invention surpasses existing 3-D voxel based graphics methods and architectures in terms of performance, simplicity, image quality, expandability and ease of hardware realization, as well as low overhead, so as to provide real-time time high resolution parallel and perspective volume viewing from any arbitrary direction.

A preferred form of the apparatus and method for real-time volume visualization, as well as other embodiments, objects, features and advantages of this invention, will be apparent from the following detailed description of illustrative embodiments thereof, which is to be read in connection with the accompanying drawings.

BRIEF DESCRIPTION OF THE DRAWINGS

FIG. 13 is a functional diagram showing a voxel beam and a slice of voxel data as part of a cubic frame buffer;

FIG. 14 is a functional diagram of the method of the present invention;

FIG. 15 is a functional diagram showing the skewing scheme of voxel data for adjacent voxel beams and projection ray planes;

FIG. 26 shows a signal flow graph for the gradient y-component of the present invention, including de-skewing and proper time lineup;

FIG. 27 shows a signal flow graph for the gradient y-component in the present invention, with only nearest neighbor connections;

FIG. 31 shows, in signal flow graph form, another form of the gradient y-component of the present invention;

FIG. 32 shows a signal flow graph for all gradient components in a configuration which minimizes pin count;

FIG. 46 provides details of a preferred form of apparatus in accordance with the present invention;

FIG. 47 depicts a method according to the present invention employing ray splitting with interpolation in the compositing buffer; and FIG. 48 depicts a method according to the present invention employing ray splitting with interpolation on the current slice.

DETAILED DESCRIPTION OF THE PREFERRED EMBODIMENTS

The method and apparatus of the present invention are capable of manipulating data and supporting real-time visualization of high resolution voxel-based data sets. The method and apparatus are designed for use as a voxel-based system as described in the issued patents and pending applications of Arie Kaufman, a named inventor of this application, including "Method Of Converting Continuous Three-Dimensional Geometrical Representations Into Discrete Three-Dimensional Voxel-Based Representations Within A Three-Dimensional Voxel-Based System", which issued an Aug. 6, 1991, as U.S. Pat. No. 5,038,302; "Method Of Converting Continuous Three-Dimensional Geometrical Representations Of Polygonal Objects Into Discrete Three-Dimensional Voxel-Based Representations Thereof Within a Three-Dimensional Voxel-Based System", which issued on Jan. 22, 1991, as U.S. Pat. No. 4,987,554; "Method And Apparatus For Storing, Accessing, And Processing Voxel-Based Data", which issued on Jan. 15, 1991, as U.S. Pat. No. 4,985,856; "Method Of Converting Continuous Three-Dimensional Geometrical Representations of Quadratic Objects Into Discrete Three-Dimensional Voxel-Based Representations Thereof Within A Three-Dimensional Voxel-Based System", which was filed on May 4, 1989, as Ser. No. 07/347,593, which was abandoned in favor of U.S. Ser. No. 08/031,599, filed on Mar. 15, 1993 as a continuation application of the '593 application; "Method And Apparatus For Generating Arbitrary Projections Of Three-Dimensional Voxel-Based Data", which issued on Mar. 31, 1992 as U.S. Pat. No. 5,101,475; "Method And Apparatus For Real-Time Volume Rendering From An Arbitrary Viewing Direction", which was filed on Jul. 26, 1993, as U.S. Ser. No. 08/097,637; and "Method And Apparatus For Generating Realistic Images Using A Discrete Representation", which was filed on Mar. 20, 1992, as U.S. Ser. No. 07/855,223, the entire disclosure of each of these references is incorporated herein by reference.

Figure 3:
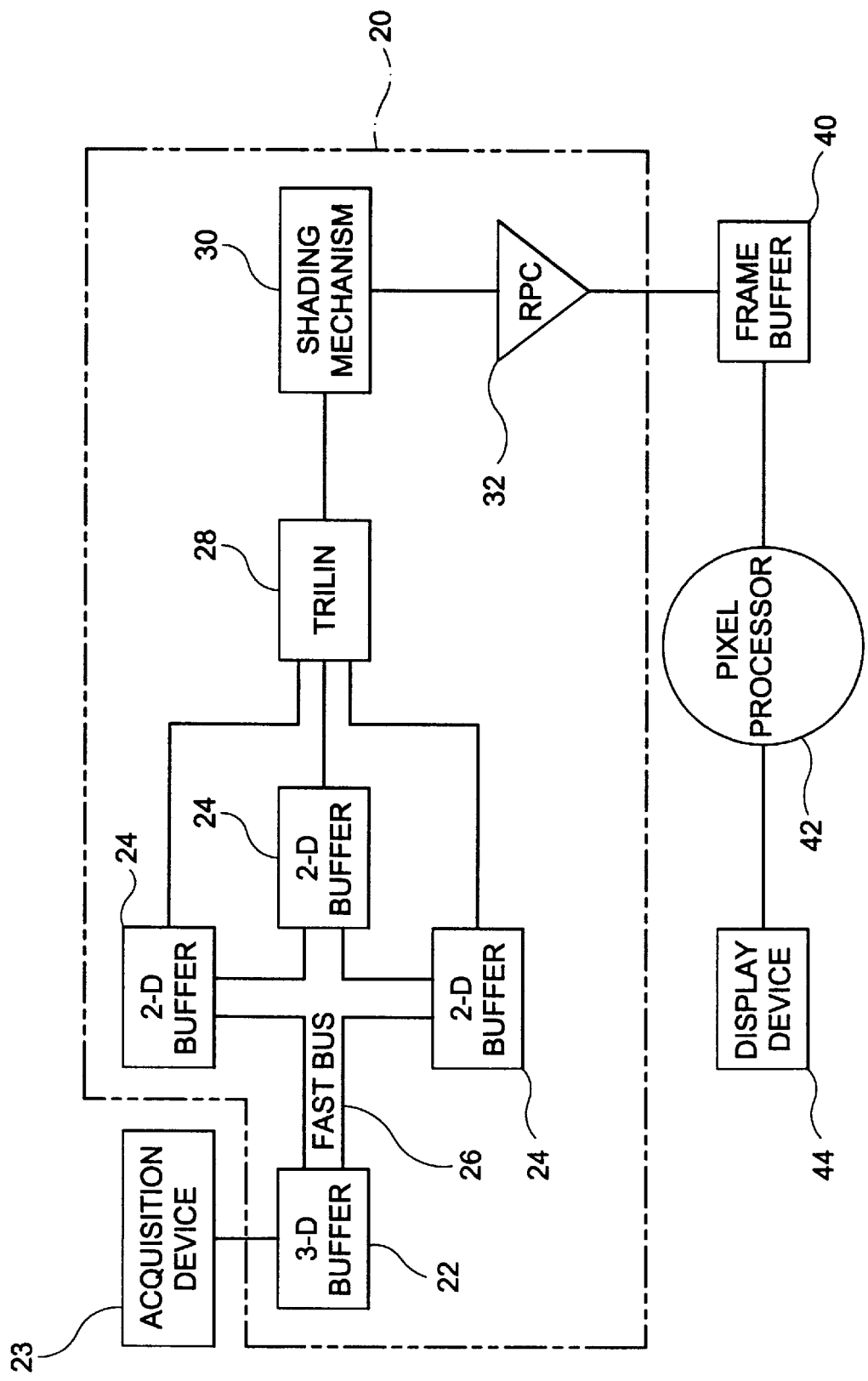
FIG. 3 is a functional block diagram of the apparatus for providing a 3-D volume projection of an object from a desired viewing direction constructed in a accordance with the present invention.

Referring now to FIG. 3, the apparatus of the present invention 20 preferably includes six basic components. These include a cubic frame buffer 22 having a plurality of memory storage units capable of storing voxels therein, three two-dimensional (2-D) buffers 24 and an interconnection mechanism 26 coupling the cubic frame buffer to each of the 2-D buffers. The cubic frame buffer is a three-dimensional (3-D) memory organized in n memory modules (or memory slices), wherein each memory module has $n^2$ memory storage units as described in the above-identified references. The cubic frame buffer also includes an independent dual access and addressing unit (not shown in the figures). A 3-D skewed memory organization, as described in the above-identified references, enables conflict-free access of any beam (i.e., a ray parallel to a main axis of the cubic frame buffer). The apparatus also includes an interpolation mechanism 28, shading mechanism 30 and projection mechanism 32.

The addressing unit of the cubic frame buffer 22 maps voxels in specific memory locations of the cubic frame buffer so as to provide conflict-free access of beams of voxels. Specifically, a voxel with space coordinates (x,y,z) is mapped onto the $k^{th}$ memory module by:

k=(x+y+z) mod n  0≦k,x,y,z≦n−1

Since beams of voxels are accessed such that two coordinates are always constant, the third coordinate guarantees that only one voxel from a corresponding beam resides in any one of the memory modules.

Each of the 2-D buffers 24 of the present invention are 2-D voxel storage devices having $2n^2$-n memory storage units. The cubic frame buffer 22 is coupled to the 2-D buffers 24 by the interconnection mechanism 26. The interconnection mechanism, hereinafter referred to as the "fast bus", is an interconnection network that supports the high-bandwidth transfer of data (beams of voxels) from the cubic frame buffer to the 2-D buffer. The fast bus manipulates the beams of voxels including skewing, de-skewing, fanning and de-fanning the voxel beams in order to support both parallel and perspective projection. In a preferred embodiment, the fast bus employs multiplexers and transceivers with associated control units and a multi-channel bus to accomplish the data transfer speeds required for real-time volume visualization.

The voxels utilized in the volume visualization apparatus can be provided by a data acquisition device 23 (such as a scanner or M.R.I. device) or other mechanisms as known in the art.

Figure 4:
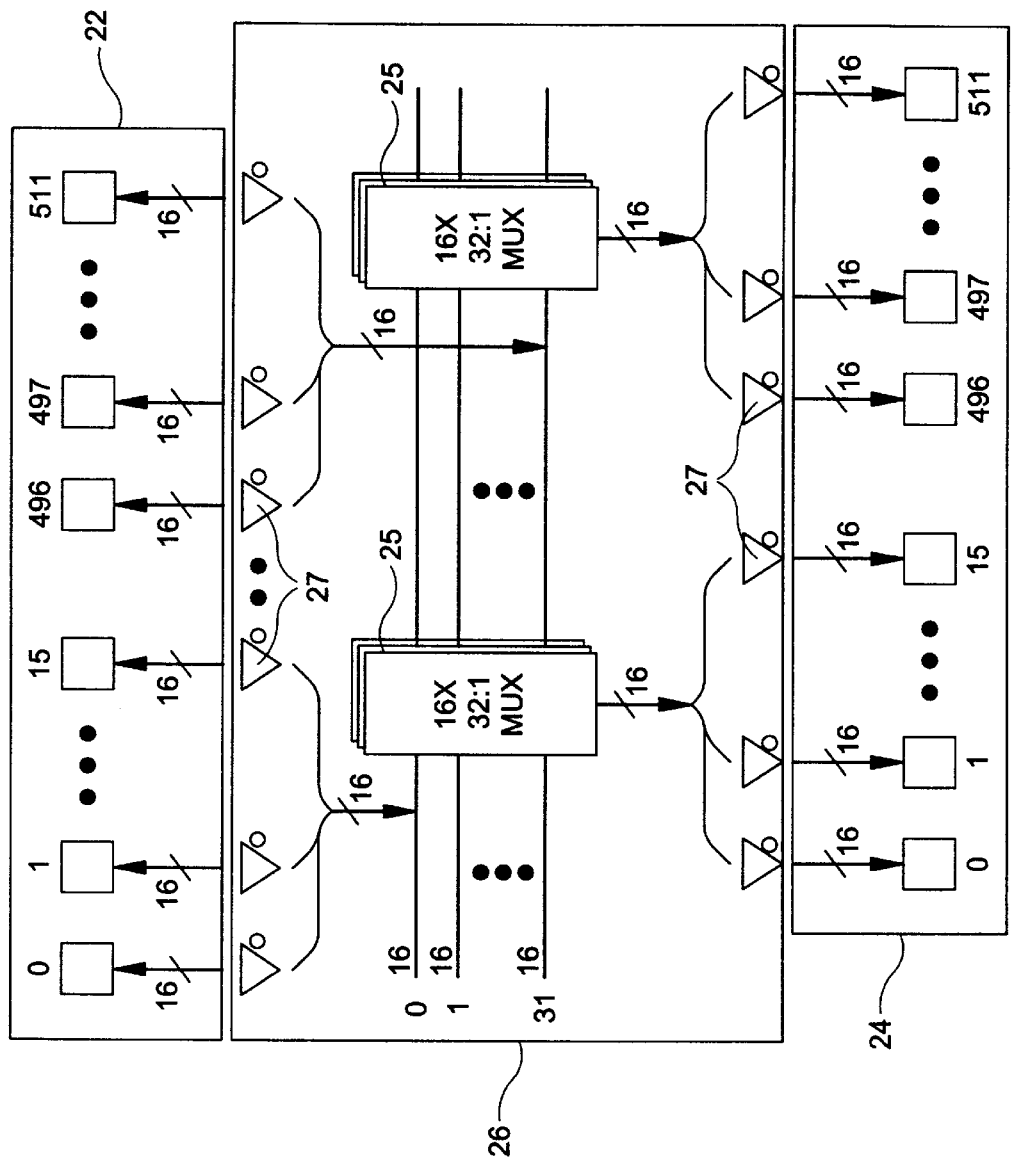
FIG. 4 is a functional block diagram of an interconnection mechanism which couples a cubic frame buffer and a two dimensional buffer.

Referring now to FIG. 4, a preferred form of the fast bus configuration is shown for a cubic frame buffer 22 having n=512 and a fast bus having 32 bus channels. As shown in the figure, the 512 memory modules of the cubic frame buffer are divided into 32 groups having 16 memory modules in each group. As a result, memory modules 0–15 transfer voxel information on channel 0 of the fast bus, memory modules 16–31 transfer voxel information on channel 1 of the fast bus and so on such that memory modules 496–511 transfer voxel information on channel 31 of the fast bus.

As previously stated, the fast bus includes a plurality of multiplexers 25 such that the voxel data from the memory modules (0–511) of the cubic frame buffer 22 are time-multiplexed onto a designated 16-bit fast bus channel for that group of memory modules. Table 1 shows the memory module data time-multiplexed on the fast bus. The signal multiplexing is achieved by utilizing a clock input with transceivers 27 associated with each memory module.

TABLE 1

| | Time Slice | | | | |
|---|---|---|---|---|---|
| Channel | 00 | 01 | ... | 14 | 15 |
| 00 | 000 | 001 | ... | 014 | 015 |
| 01 | 016 | 017 | ... | 030 | 031 |
| . | . | . | . | . | . |
| . | . | . | . | . | . |
| . | . | . | . | . | . |
| 30 | 480 | 481 | ... | 494 | 495 |
| 31 | 496 | 497 | ... | 510 | 511 |

As shown in FIG. 4, the 2-D buffers are divided into 32 groups wherein each group includes 16 memory modules. For each group of the memory modules of the 2-D buffer, voxel data from the 32 channels of the fast bus are provided into a respective memory module of the group of 16 memory modules.

The operation of the multiplexers 25 and transceivers 27 are controlled by a look-up table commonly referred to as the bus channel map. The bus channel map is pre-computed based upon selected viewing parameters (i.e., viewing direction, etc.). A change in the selected viewing parameters requires a re-computation of the look-up table. However, the limited size of the look-up table allows the re-computation to occur without affecting the real-time volume visualization and processing provided by the system.

Referring again to FIG. 3, the apparatus of the present invention 20 also preferably includes an interpolation mechanism 28 coupled to the 2-D buffers 24. In a preferred embodiment of the invention, the interpolation device is a tri-linear (TRILIN) interpolation mechanism which receives information about continuous viewing rays that are cast, preferably from the selected viewing position, through the cubic frame buffer 24. At evenly spaced locations along each viewing ray, sample points are indicated. The interpolation mechanism performs a tri-linear interpolation utilizing voxel data corresponding to pixel points proximate to each viewing ray sample point in order to determine interpolated voxel values for the sample points. These interpolated voxel values are used for providing a more accurate volume visualization image.

The apparatus of the present invention may also include a shading mechanism 30 coupled to the interpolation mechanism 28. Alternatively, the shading mechanism can be coupled directly to each of the 2-D buffers 24. In a preferred embodiment of the present invention, the shading mechanism receives viewing ray and sample point information from the interpolation mechanism. Thereafter, the shading mechanism receives the voxel data values proximate each viewing ray sample point. More specifically, the shading mechanism receives discrete voxel rays on the immediate left, right, above and below as well as the values of the viewing ray sample points proximate the current sample point. Based on the voxel information provided, a gradient vector for each sample point is determined by taking the differences of all voxel values proximate each sample point to provide an indication of the direction and amount of change in the characteristics of the object.

Figure 5A:
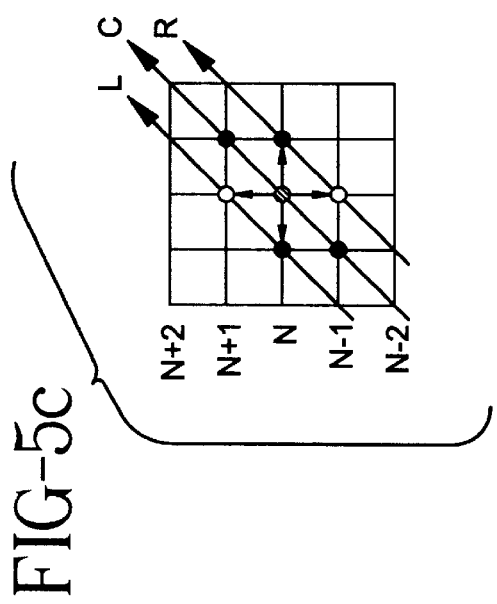
FIG. 5A is a graph of a 10-neighborhood gradient estimation method in accordance with the present invention.
Figure 5C:
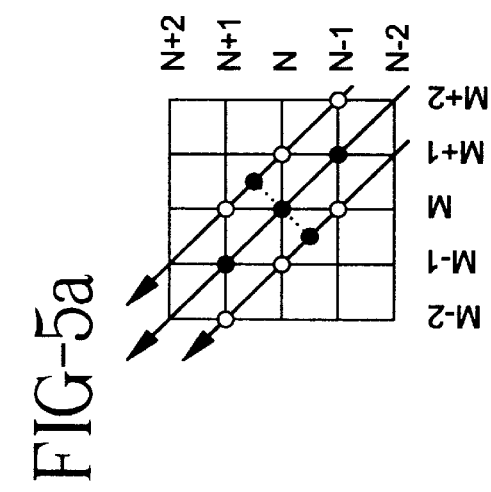
FIG. 5C is a graph of a 12-neighborhood gradient estimation method in accordance with the present invention.
Figure 5B:
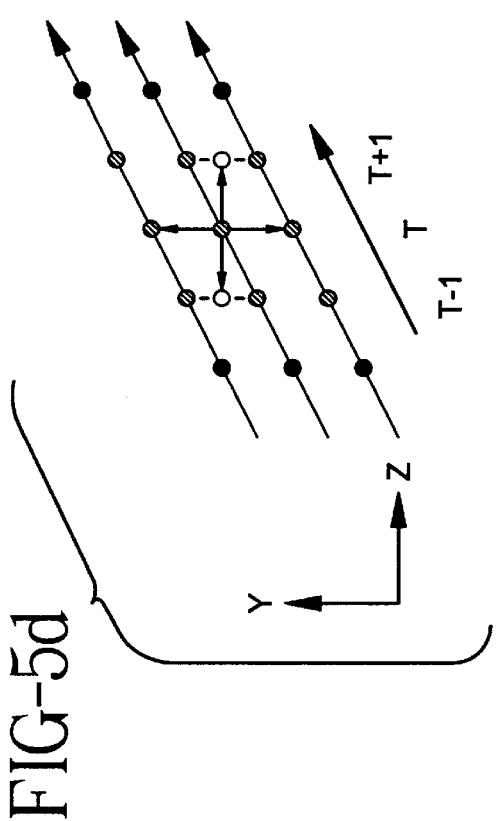
FIG. 5B is a graph of a 26-neighborhood gradient estimation method is accordance with the present invention.

FIGS. 5A and 5B illustrate two different gradient estimation schemes. The most simple approach (not shown) is the 6-neighborhood gradient. This method uses the difference of neighboring sample values along the continuous ray, P(n, m+1)–P(n,m–1) in the x direction and P(n+1,m+1)–P(n–1, m–1) in the y direction. Although the left, right, above and below ray samples are in the same plane and orthogonal to each other, the samples in the y direction of the ray are not. More importantly, when a change in the viewing direction causes a change in the major axis from m to n, the values of P(n+1,m)–P(n–1,m) are used to calculate the gradient in the x direction. This leads to noticeable motion aliasing.

In a preferred form of the present invention as shown in FIG. 5A, the aliasing problem is circumvented by performing an additional linear interpolation. The additional step includes resampling the neighborhood rays at positions that are orthogonal (black samples) to the current sample point. This approach is commonly referred to as the 10-neighborhood gradient estimation, and it solves the problem of switching the major axis during object rotations.

Referring now to FIG. 5B, the use of a 26-neighborhood gradient will be described. Instead of fetching sample values from four neighboring rays, 26 interpolated samples from 8 neighboring rays are fetched and the gradient is estimated by taking weighted sums (i.e., the voxels closest to the sample point are given the greatest weight in determining the gradient) inside and differences between adjacent planes. This method leads to better over all image quality, but the switching of major axis is still noticeable, although less than with the 6-neighborhood gradient method.

Figure 5D:
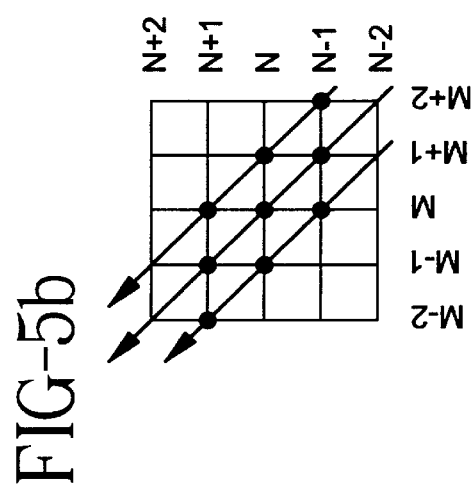
FIG. 5D is a graph of an 8-neighborhood gradient estimation method in accordance with the present invention.

In an alternative form of the present invention as shown in FIG. 5C and 5D, the aliasing problem is circumvented by performing an additional linear interpolation. The additional step includes resampling the neighborhood rays at positions that are orthogonal (white samples) to the base plane. Depending upon the position of the new positions, either a bi-linear interpolation or a linear interpolation has to be performed. These approaches are commonly referred to as the 12-neighborhood and 8-neighborhood gradient estimation, respectively. Each of these schemes serve to solve the problem of switching the major axis during object rotations and provide gradient vectors that are orthogonal to the main axis of the data set.

In the case of perspective projections, the front of each projection ray plane (PRP) is uniformly sampled with n rays one unit apart. As the rays diverge towards the back of the cubic frame buffer volume, the distance between rays increases, and the averaged value, as previously explained, is utilized.

The shading mechanism preferably also includes a light vector lookup table. By knowing the gradient value and the values of the light vector look-up table, an intensity of each sample point can be generated using a variety of shading methods (e.g., using an integrated Phong Shader as known in the art). In order to display translucency at a sample point, opacity values are generated using a transfer function represented as a 2-D lookup table indexed by sample density.

Referring again to FIG. 3 and as mentioned previously, the present invention also preferably includes a projection mechanism (RPC) 32. The projection mechanism receives interpolated voxel values (corresponding to viewing ray sample points) from the interpolation mechanism 28, combines the interpolated voxel values in one of the variety of ways, and generates a pixel value for each viewing ray. The pixel value corresponds to the color, opacity and texture of the object or space being represented at a corresponding pixel location. Preferably, the projection mechanism is able to combine the interpolated voxel values with either back-to-front compositing, front-to-back compositing, first opaque projection, weighted sum projection, last-to-first cut projection or first-to-last cut projection (which provides a volume visualization of a cross section of an object or region having a specified thickness).

Figure 6:
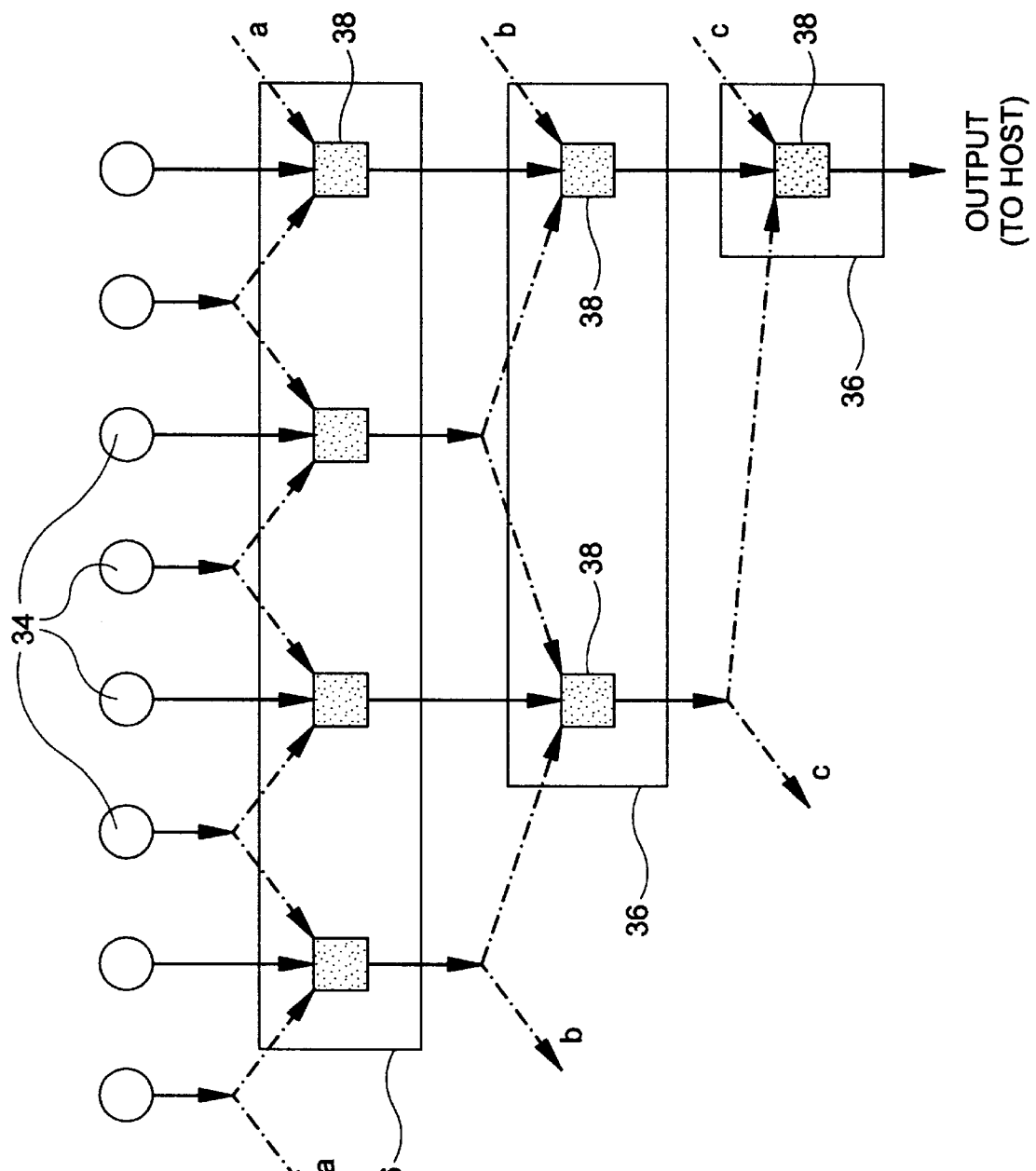
FIG. 6 is a functional block diagram of a projection mechanism constructed in accordance with the present invention.

In the preferred embodiment of the present invention, the projection mechanism is a ray projection cone (RPC) which generates one pixel value signal per clock cycle using a variety of projection schemes as described above. As shown in FIG. 6, the ray projection mechanism includes a plurality of input ports 34 for receiving the plurality of interpolated sample signals for each of the plurality of continuous viewing rays. Coupled to each of the plurality of input ports 34 are a plurality of voxel combination stages 36. Each voxel combination stage includes a plurality of voxel combination units (VCU) 38. As shown in FIG. 6, each successive voxel combination stage includes fewer VCU than the previous voxel combination stage. Each VCU is preferably coupled to three input ports 34. However, in the preferred embodiment, the RPC is designed to select only two interpolated sample signals from two of the three input ports or preceding VCU's. Specifically each VCU selects as input the left and center or right and center connection for receiving input signals depending upon the selected viewing scheme.

As shown in FIG. 6, the RPC is a folded (circular) cross-linked binary tree with n leaves, which can be dynamically mapped onto a tree with its leftmost leaf at any arbitrary end-node of the RPC. This allows the processing of a viewing ray of voxels such that the first voxel of the ray can be provided to any input port of the RPC. This in turn allows the cone to be hardwired to the outputs of the 2-D buffers which contain the voxels. Such a configuration eliminates the need for a set of n, n-to-1 switching units or barrel shifters for de-skewing of the 2-D buffer data as was required by prior art ray projection mechanisms. In a preferred embodiment of the invention, the leaves of the cone contain the TRILIN and the shading mechanism.

Preferably, the RPC accepts as input a set of n interpolated sample signals along the viewing ray and produces a pixel value signal for the pixel corresponding to the associated viewing ray. As shown in FIG. 6, the cone is a hierarchical pipeline of n−1 primitive computation nodes VCU. At any given time frame, the cone is processing log n viewing rays simultaneously in a pipelined fashion, producing a new pixel value signal corresponding for one pixel of the display every clock cycle.

The opacity of each voxel may be pre-stored with every voxel or provided through a look-up table or a transfer function inside the shading mechanism at the leaves of the cone. In a preferred embodiment, the VCU produces an output signal by performing one of the following operations:

| First opaque: | if($\alpha_L$ is opaque) | $V' = V_L$ |
| | else | $V' = V_R$ |
| Maximum value: | if($C_L < C_R$) | $V' = V_R$ |
| | else | $V' = V_L$ |
| Weighted sum: | $C^1 = C_L + W_k C_R$ | | where W is the weighting factor and k is the cone level (i.e., the number of voxel combination stages). $W_k$ is pre-computed and pre-loaded into the VCU's. It should be mentioned that a weighted sum is useful for depth cueing, bright field, and x-ray projections. Compositing is determined by the following:

$$C' = C_L + (1-\alpha_L)C_R$$
$$\alpha' = \alpha_L + (1-\alpha_L)\alpha_R$$

where the first level VCU's compute $C_I = C_I \alpha_I$, assuming the values are gray-levels. This is actually a parallel implementation of the front-to-back (or back-to-front) compositing. The pixel value is transmitted, for example, to a general purpose host computer or a pixel processor 42, where post-processing, such as post-shading, splatting, and 2-D transformation or warping, is performed.

Referring again to FIG. 3, the apparatus of the present invention may also include a frame buffer 40, pixel processor 42 and display device 44 coupled to the projection mechanism. Preferably, the pixel value signal generated by the projection mechanism 32 is provided to the frame buffer 40 where each pixel value signal is stored, provided to the pixel processor 42 for 2-D transformation, filtering or warping, and thereafter provided to a display device 44 for visual display. The pixel processor 42, as is known in the art, transforms the pixel value signal so that it can be properly displayed on the display device.

Referring now to FIGS. 7–11, the interpolation mechanism 28 and the method of determining interpolated sample value signals will now be described. The interpolation mechanism 28 of the present invention generates a voxel value signal at non-voxel locations by utilizing the eight surrounding voxels and interpolating as follows:

$$P_{abc} = P_{000}(1-a)(1-b)(1-c) + P_{100}a(1-b)(1-c) + P_{010}(1-a)b(1-c) + P_{001}(1-a)(1-b)c + P_{101}a(1-b)c + P_{011}(1-a)bc + P_{110}ab(1-c) + P_{111}abc.$$

The relative 3-D coordinate of a corresponding sample point within the cubic frame buffer with respect to a corner voxel closest to the origin is (a,b,c). The data values associated with the corner voxels of the cubic frame buffer are $P_{ijk}$, where i, j, k=0 or 1, and the interpolated data value associated with the sample point is $P_{abc}$. Different optimizations aim at reducing the arithmetic complexity of this method, but the arbitrary memory access to fetch eight neighboring voxels for each sample point makes this one of the most time consuming operations during volume rendering.

By transforming discrete rays of the PRP that are stored in the cubic frame buffer so that they are aligned, and storing them in two 2-D buffers as previously described, the data access time can be greatly reduced. Instead of fetching the eight-neighborhood of voxels of each resampling location, four discrete rays are fetched from the buffer, two from each of the projection ray planes (PRP) above and below the current ray. The projection ray planes are provided from the 2-D buffers. In parallel implementations of the interpolation method, neighboring rays reside in adjacent interpolation modules, requiring only a local shift operation of one voxel unit between neighbors.

Figure 7A:
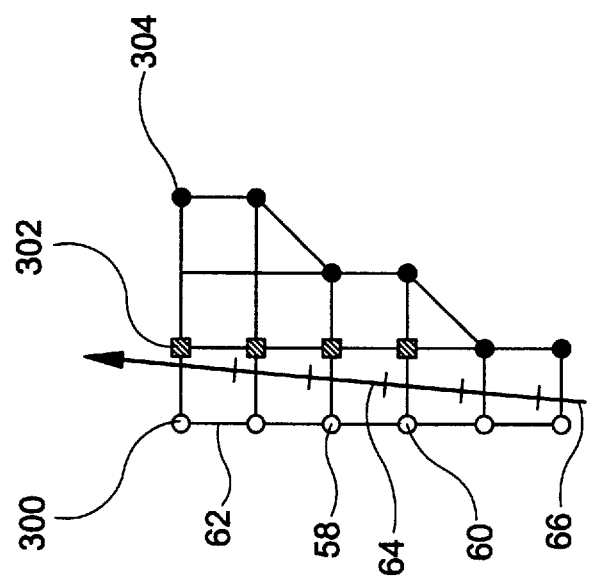
FIG. 7A is a graph of a first method of interpolation utilized in accordance with the present invention.
Figure 7B:
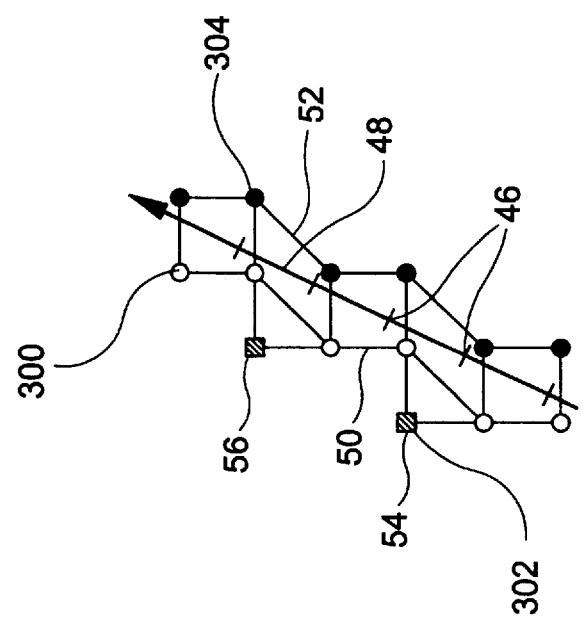
FIG. 7B is a graph of a second method of interpolation utilized in accordance with the present invention.

An interpolation method is shown in FIGS. 7A and 7B. Open circles 300 represent discrete ray A and black circles 304 represent discrete ray B. Shaded boxes 302 represent missing voxels. Referring to FIG. 7A, sample points 46 on the continuous ray 48 are interpolated using bi-linear interpolation between samples of proximate discrete rays 50 (white) and 52 (black). The first sample point of the continuous ray 48 can be correctly interpolated using four voxels from discrete rays 50, 52 since the four voxels form a rectangle (i.e., the rays do not make a discrete step to the left or right).

As soon as the discrete rays step to the left or right as is the case for the second and fourth samples along the continuous ray 48, the four adjacent voxels form a parallelogram, and a straightforward bi-linear interpolation might not provide accurate voxel sample values. Therefore, the grey shaded square voxels 54,56 are required to yield a more accurate result. However, these voxels reside on discrete rays two units away from the continuous ray 48.

Referring now to FIG. 7B, the problem of not utilizing the best voxel point to provide an interpolated sample signal is shown for perspective projections. Since discrete rays diverge for perspective viewing, the correct neighboring voxels are not stored in the 2-D buffers. For example, only two voxels 58, 60 of discrete ray 62 contribute to the correct interpolation of the third sample point 64 of the continuous ray 66. In the 3-D case, as many as six voxels may be missing in the immediate neighborhood of sample point 64 for perspective projections.

The solution is to perform a sheared tri-linear interpolation by dividing the method into four linear and one bi-linear interpolation. Instead of specifying the sample location with respect to a corner voxel closest to the origin as was done with previous methods, each 3-D coordinate along the continuous ray consists of relative weights for linear interpolations along each axis in possible sheared voxel neighborhoods. These weights can be pre-computed and stored in templates.

Figure 8B:
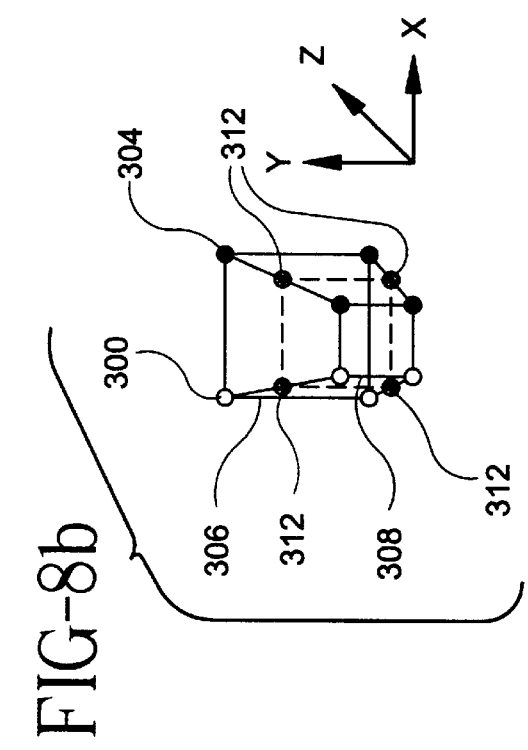
FIG. 8B is a diagram of the method of interpolation for perspective projection.
Figure 8D:
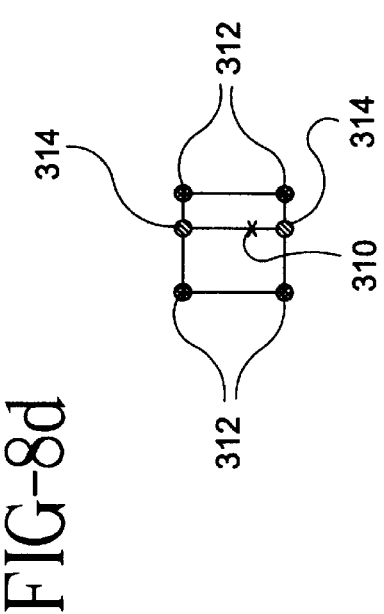
FIG. 8D is a diagram of the method of interpolation for a perspective projection.
Figure 8A:
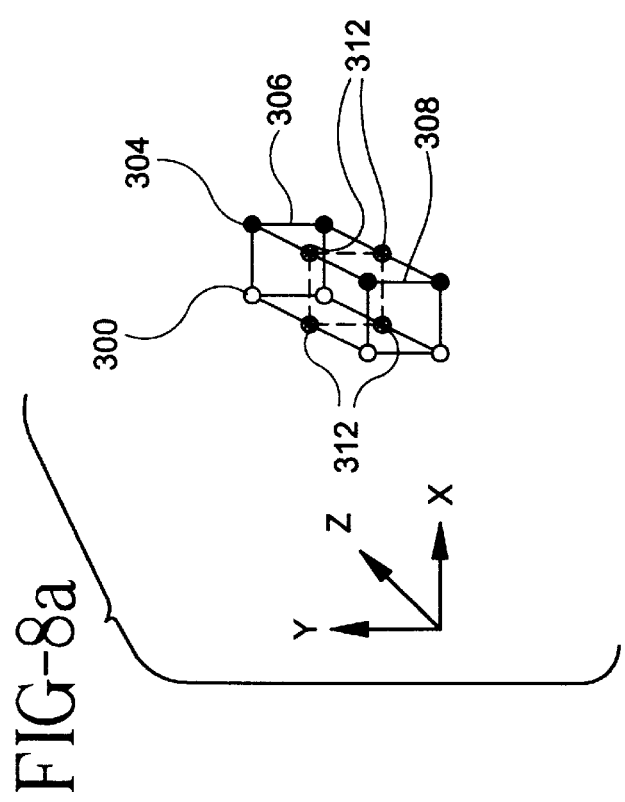
FIG. 8A is a diagram of the method of interpolation for a parallel projection.
Figure 8C:
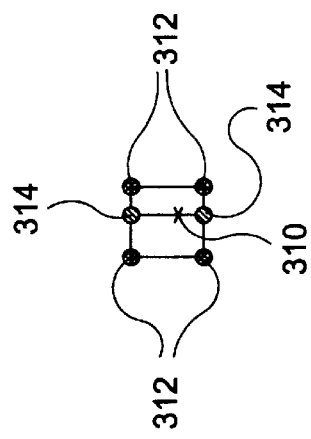
FIG. 8C is a diagram of the method of interpolation for a parallel projection.

Referring now to FIG. 8A–8D, the steps necessary for interpolation in 3-D are shown for both parallel projection (FIGS. 8A and 8C) and perspective projection (8B and 8D). Open circles 300 represent discrete ray A and black circles 304 represent discrete ray B. First, four linear interpolations are performed in the direction of the major axis (the Z-axis is the major direction of travel of the continuous ray) using eight voxels of four neighboring discrete rays stored the 2-D buffers. As shown in FIGS. 8A and 8B, these eight voxels are the vertices of an oblique parallelepiped for parallel projections or of a frustum of a pyramid for perspective projections. Four voxels each reside on two separate planes one unit apart, which are commonly called the front 308 or the back 306 plane depending on when it is encountered during ray traversal in the direction of the major axis. Therefore, only one weight factor has to be stored, corresponding to the distance between the front plane and the position of the ray sample point. The resulting four interpolated values (doublehatched circles 312) form a rectangle and can be bi-linearly interpolated to yield the final interpolated sampled value 310. This bi-linear interpolation is divided into two linear interpolations between the corner values (single-hatched circles 314) and the final linear interpolation between the edge values. In FIGS. 8C and 8D, this is shown as two interpolations in the X-direction followed by one interpolation in the Y-direction.

Figure 9:
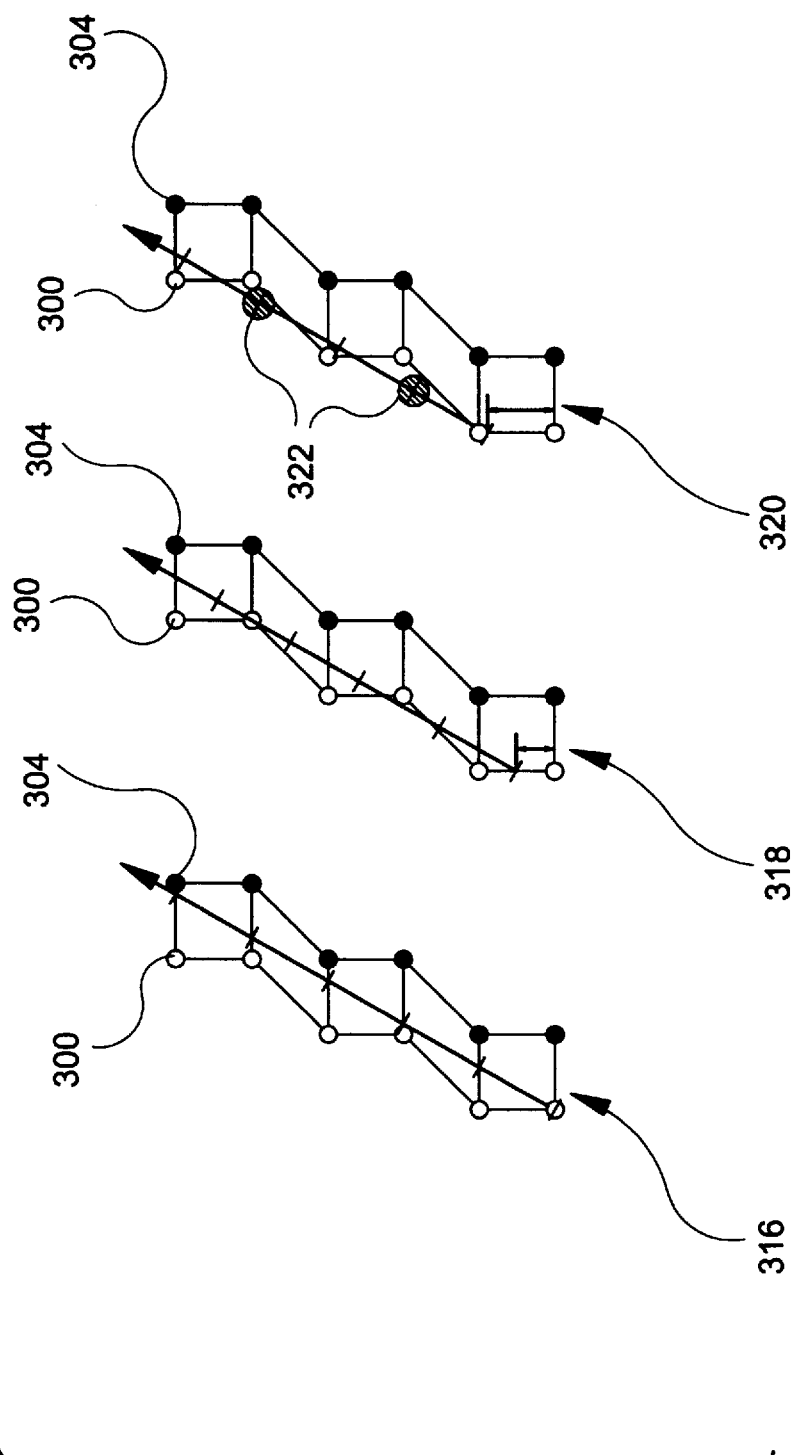
FIG. 9 is a diagram of a modified method for interpolation in accordance with the present invention.

The sample points corresponding to the continuous rays are preferably inside the polyhedron defined by the voxels on the four surrounding discrete rays. When constructing the discrete rays, all continuous rays start at integer positions of the base plane (i.e., they coincide with voxels of the first slice of the volume dataset). As shown in FIG. 9, the use of these rays during ray casting effectively reduces the trilinear interpolation to a bi-linear interpolation, because all sample points along the ray fall onto the front planes of the parallelepiped or pyramid frustum.

Referring now to FIG. 9 (no offset case 316), utilizing X and Y integer positions on the base-plane permits an offset (see offset in range case 318) from the base-plane in the major direction of ray transversal as a degree of freedom and enables sheared tri-linear interpolations. However, as shown in FIG. 9 (offset out of range case 320) for offsets in the major direction that are relatively large, some of the samples 322 along the ray may fall outside the bounding box defined by the discrete rays. Note that in FIG. 9, open circles 300 represent a discrete ray A and black circles 304 represent a discrete ray B.

Figure 10:
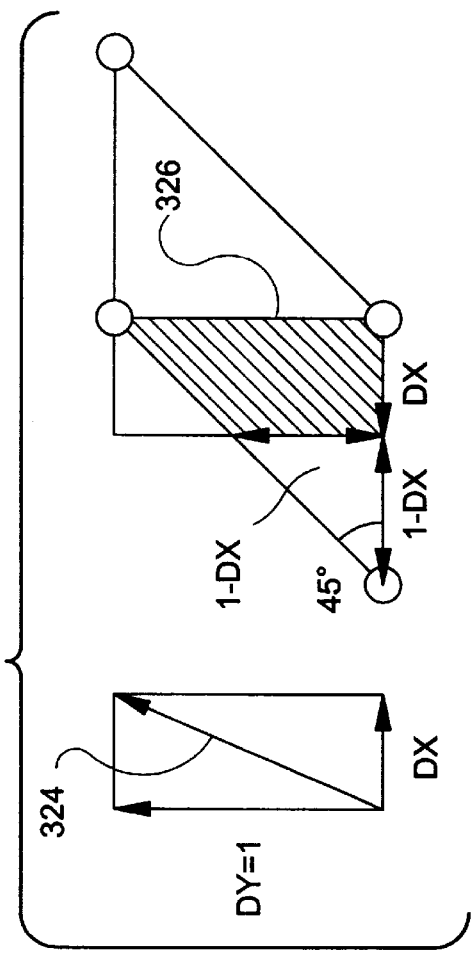
FIG. 10 is a diagram of the maximum offset estimation for use in a method of interpolation in accordance with the present invention.

Referring now to FIG. 10, a continuous viewing vector 324 is split into a dx component along the X-axis (dx and dy in 3-d) and a unit vector in direction of the major axis (the Y-axis). By stepping in the direction of the major axis, the viewing vector may be added to the current sample position in order to get the new sample position.

Suppose that the addition of dx at the current sample position leads to a step of the discrete rays in the x direction. This step can only occur if the current sample position has a relative x offset with respect to the lower left corner voxel of more than 1−dx for positive dx (or less than 1+dx for negative dx). In other words, the current sample position was inside the rectangle of side dx by 1 shown in FIG. 10. However, only the shaded region 326 of this rectangle contains sample positions inside the parallelepiped defined by the corner voxels. Taking the smallest side in the major axis as the worst-case, this means that in-range samples have maximal relative y offsets of no more than 1−dx for positive dx (no less than 1+dx for negative dx).

Since stepping is performed with a unit vector in the direction of the major axis, all relative offsets along the continuous ray are determined by the offsets of the first ray samples from the base-plane. The above argument easily extends to 3-D, making the maximum allowed offset in the direction of the major axis:

$$\min(1 - dx, 1 - dy),\ dx, dy \geq 0$$
$$\min(1 + dx, 1 - dy),\ dx < 0, dy \geq 0$$
$$\min(1 - dx, 1 + dy),\ dx \geq 0, dy < 0$$
$$\min(1 + dx, 1 + dy),\ dx, dy < 0,$$

where dx and dy are the components of the viewing vector in the x and y directions, respectively. Notice that for 45° viewing angle, dx and dy are 1, yielding an offset of 0 and bi-linear interpolation as shown in FIG. 9.

In the preferred embodiment of the invention, a single ray is cast from the origin of the image plane onto the base-plane using uniform distance between samples and the offset is chosen in the major direction of the first sample after the ray penetration of the base-plane. If necessary, the offset is iteratively reduced until it satisfies the above condition. This leads to view dependent offsets in the major direction of travel and to varying resampling of the dataset. The variation of resampling points according to the viewing direction is an advantage for interactive visualization, because more of the internal data structure can be revealed.

Each discrete ray consists of n voxels, independent of the viewing direction. Since the maximum viewing angle difference with the major axis is not more than 45 degrees, the volume sample rate is defined by the diagonal through the cube and is by a factor of √3 higher for orthographic viewing. It has been found that for ray-compositing, this is not an important consideration due to the averaging nature of the compositing operator.

A more severe problem is the varying size of the sample neighborhood. For parallel projections, the eight voxels surrounding the sample point either form a cube with sides of length one or an oblique parallelepiped as shown in FIG. 8A. For perspective projections, however, the surrounding voxels may form the frustum of a pyramid with parallel front and back planes as in FIG. 8B. Due to the divergence of rays towards the back of the data set, the column spanned by this frustum increases, thereby reducing the precision of the tri-linear interpolation. However, it has been found that the distance between neighboring discrete rays at the end of the volume never exceeds two voxels for a $256^3$ dataset while still achieving a high amount of perspectivity. Furthermore, in typical datasets, the samples at the back of the volume have little influence on the final pixel color due to compositing along the ray.

Figure 11:
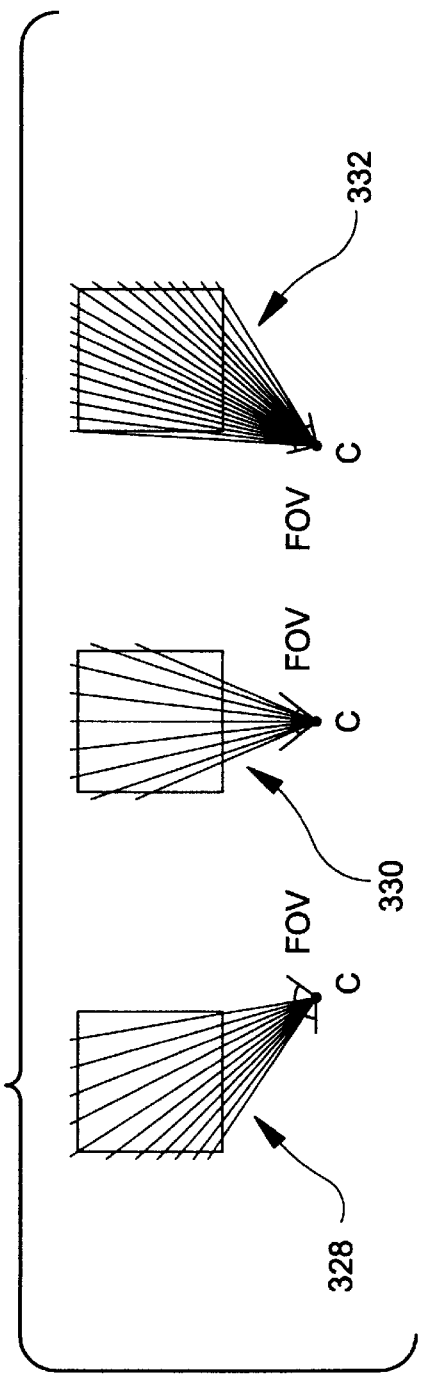
FIG. 11 is a diagram showing the sampling rates of the cubic frame buffer based upon differing fields of view.

The center of projection (C) and the field-of view (FOV) in perspective projections also influence the sampling rate. The discrete line algorithm casts exactly one ray per pixel of the base-plane, or a maximum of 2n rays per scanline. Referring now to FIG. 11, in cases where the FOV extends across the dataset (correct sampling case 328), this guarantees better sampling than regular image order ray-casting which would cast n rays scanning the FOV and send wasteful rays that miss the dataset. However, for a small FOV the discrete line stepping yields undersampling (case 330) in the active regions of the base-plane. Case 332 of FIG. 11 shows a situation where two base-plane images contribute to the final view image. This is the worst case in the generation of three base-plane projections for a single perspective image.

As is evident from the above description, the apparatus and method of the present invention provides a more accurate representation of the object or scene being displayed due to the interpolation and shading included in the invention. In addition, since the present invention does not require conveyors or the like as used in prior art devices, the apparatus of the present invention operates more efficiently and faster than the prior art systems because the data manipulation is performed "on the fly" in a highly parallel manner. Specifically, the apparatus and method performs in $O(n^2)$ time as compared to the prior art system which performs in $O(n^2 \log n)$ time. In addition, since the interconnection mechanism is capable of performing both de-skewing for parallel projection and de-fanning for perspective projection (i.e., a form of data compression), the present invention is capable of supporting perspective projection and real-time visualization of four dimensional (4-D) data.

Figure 12:
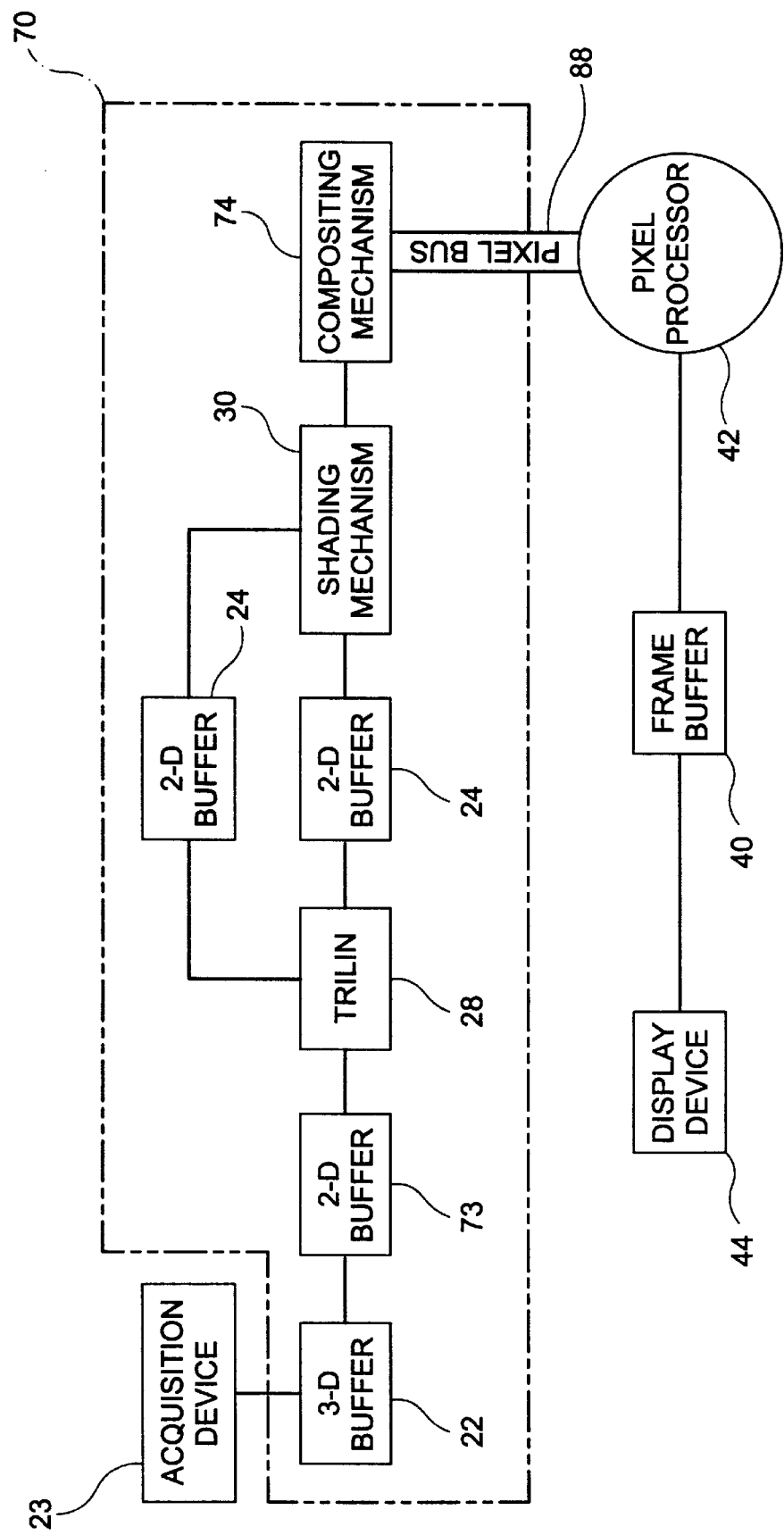
FIG. 12 is a functional block diagram of an alternative form of the apparatus for providing a 3-D volume projection of an object from a desired viewing direction constructed in accordance with the present invention.

Referring now to FIG. 12, an alternative embodiment of the present invention 70 is shown. The apparatus of the alternative embodiment of the present invention preferably includes a cubic frame buffer (CFB) 22 having a plurality of memory storage units capable of storing voxel data therein as previously described. The cubic frame buffer of the alternative form of the present invention may include a 3-D skewed memory organization enabling conflict free access of any beam of voxels 72 (i.e., a ray parallel to a main axis of the cubic frame buffer) as shown in FIG. 13. The apparatus also includes a first two-dimensional buffer 73, an interpolation mechanism (TRILIN) 28, two two-dimensional buffers 24, shading mechanism 30, and compositing mechanism 74. Coupled to the output of the compositing mechanism is a pixel processor 42, frame buffer 40, and display device 44 for generating the three-dimensional (3-D) volume projection image. The relative positioning of the pixel processor 42 and frame buffer 40 can be interchanged as required.

In an alternative form of the present invention, the method includes generating a viewing ray for each of the plurality of pixels of the display device 44. As each viewing ray traverses through the CFB, the viewing ray may change any of its x, y and z coordinates. The plurality of viewing rays define a viewing direction through the cubic frame buffer. The method further includes generating a plurality of regularly spaced sample points along each viewing ray. In order to assign a value signal to each sample point of the viewing ray, an interpolation process is employed utilizing values assigned to voxels within the CFB. Specifically, beams of voxels are retrieved from the cubic frame buffer. A beam of voxels is any discrete row, column or axle of voxels parallel to a primary axis (x, y or z) of the cubic frame buffer. In one embodiment of the invention, two n×1 slices of voxel data signals 76 which include n beams of voxels (as shown in FIG. 13) are consecutively retrieved and provided to the interpolation mechanism 28. These slices of voxel data signals can be substantially parallel to the major axis of the 3-D memory (i.e., parallel to a normal of the base plane) or substantially orthogonal to the major axis of the 3-D memory (i.e., parallel to the base plane). While two entire n×1 slices of voxel data are provided to the interpolation mechanism and utilized for each of the plurality of viewing rays as described above, for simplicity the description will be limited to one group of viewing rays.

In another embodiment of the invention, one n×1 slice of voxel data signals 76 which includes n beams of voxels (as shown in FIG. 13) are consecutively retrieved and provided to the interpolation mechanism 28. These slices of voxel data signals can be substantially parallel to the major axis of the 3-D memory (i.e., parallel to a normal of the base plane) or substantially orthogonal to the major axis of the 3-D memory (i.e., parallel to the base plane). For parallel viewing, the interpolation mechanism is a bi-linear or higher order device. Alternatively, for perspective viewing, the interpolation mechanism is a linear or higher order device which utilizes a larger neighborhood of voxels inside the n×1 slice. It is foreseen that not only one slice of voxel data could be utilized, but that a plurality of slices can be accessed to generate the interpolated sample point signals.

Referring now to FIG. 14, one embodiment of the present invention is shown. Each of the plurality of viewing rays 78 traversed through the cubic frame buffer 22 (and the corresponding sample points thereon) may be defined by two projection ray planes (PRP) within the CFB. The two PRP are commonly referred to as a top PRP 80 and a bottom PRP 82. The method of the present invention includes accessing a first beam of voxel signals 81 from the top PRP 80 and a first beam of voxel signals 83 from the bottom PRP 82. Each beam of voxels 81, 83 is provided to a "back-face" input of the interpolation mechanism as shown in FIG. 14.

Referring now to FIG. 15, the top and bottom PRP 80, 82 are shown removed from the cubic frame buffer (CFB) memory. According to the skewing scheme, voxel data having 3-D coordinates x, y and z is physically stored in memory module number $$K=(x+y+z) \bmod n \quad 0 \leq k,x,y,z \leq n-1$$

where n is the size of the cubic memory. The numbers in the planes indicate the x coordinate of a voxel that will be read from module k given certain y and z coordinates. As is evident from the figure, voxels from adjacent beams in the same PRP and voxels from adjacent beams from different PRPs have a different order of x coordinates (i.e., a skewing difference of one). In the present invention, this skewing difference between adjacent voxel beams is compensated such that appropriate voxel values of each voxel beam (i.e., voxels having the same x coordinate value) are aligned by providing a shift when voxel data signals are accessed.

As is shown in FIG. 14, the alignment of voxel data signals is preferably achieved by providing the bottom PRP 82 to the back face of the interpolation mechanism 28 without shifting the voxel data signal, and by providing the top PRP 80 to the back face of the interpolation mechanism with a shift of one unit in the negative k direction.

The method of the present invention further includes moving the first beam of voxels of the first and second voxel planes from the "back face" to a "front face" of the interpolation mechanism during the next clock cycle. In addition, a second beam of voxels from the top PRP 80 and a second beam of voxels from the bottom PRP 82 are provided to the "back face" input of the interpolation mechanism 28. Due to the skewing of data between the first voxel beam and the second voxel beam of each PRP as shown in FIG. 15, the first voxel beam of both the top and bottom PRP 80, 82 are shifted one position in the positive k direction when they are provided from the "back face" to the "front face" of the interpolation mechanism. Therefore, when the four corresponding voxel beams are present in the interpolation mechanism, the voxels of each voxel beam will be aligned so that the correct 8-voxel neighborhood is present to perform tri-linear interpolation for a sample point of each viewing ray. As a result, four voxel beams simultaneously reside in the interpolation mechanism.

The above-described shifting of voxels from the cubic frame buffer 22 to the "back-face" input of the interpolation mechanism 28 and from the "back-face" input to the "front-face" of the interpolation mechanism occurs for each clock cycle. However, if the voxel data that is stored in the cubic frame buffer is unskewed, then no shift of the voxel beams, interpolated sample point signal or shaded sample point signals is necessary.

Once the first and second voxel beams for the top and bottom PRPs 80, 82 are shifted and they are properly oriented, an interpolated sample point signal for the first sample point of each viewing ray is generated by the interpolation mechanism 28.

In a preferred embodiment of the invention, the interpolation mechanism 28 is a tri-linear interpolation mechanism (TRILIN). In order to perform a tri-linear interpolation, it is necessary to utilize eight adjacent voxels that form a cell around the sample point of the viewing ray. Alternatively, a bi-linear interpolation or higher order interpolation mechanism using voxels that are inside or outside the eight voxel neighborhood (i.e., less than or more than 8 voxel values) can be utilized.

When the viewing direction (i.e., viewing rays) has a positive or negative component in the y direction, a simple stepping scheme is employed to properly align the voxel beams in adjacent voxel planes. The stepping scheme from the cubic frame buffer to the "back-face" input of the interpolation mechanism and from the "back-face" input to the "front-face" of the interpolation is as follows:

| | Shift of Voxels in K Direction | |
|---|---|---|
| Y Step | Shift from CFB to Back-Face | Shift from Back-Face to Front-Face |
| −1 | Bottom plane → no shift | Bottom plane → no shift |
| | Top plane → −1 shift | Top plane → no shift |
| 0 | Bottom plane → no shift | Bottom plane → +1 shift |
| | Top plane → −1 shift | Top plane → +1 shift |
| +1 | Bottom plane → no shift | Bottom plane → +2 shift |
| | Top plane → −1 shift | Top plane → +2 shift |

Once the interpolated sample points are determined, the method further includes generating a gradient estimation signal for each interpolated sample point signal by providing the interpolated sample point signals to a buffer 84 for temporary storage therein. The buffer preferably includes an above buffer 86, current buffer 88 and below buffer 90. However, the method can be implemented with any two of these three buffers. The gradient estimation signal provides an indication as to surface inclination at a specific interpolated sample point. In a preferred form of the present invention, three pairs of interpolated sample point signals about a specific interpolated sample point are required to generate a gradient estimation signal. In view of the three pairs of voxels required, the actual differences in all directions (above and below, front and back, right to left) can be computed by determining central differences between selected interpolated sample points.

In order to determine the gradient difference in the major direction (i.e., along the z viewing direction), it is necessary for the shading mechanism to have access to two beams of interpolated sample points within the current buffer that are two clock cycles apart (i.e., one beam that precedes and one beam that lags the desired sample).

FIG. 14 illustrates that one group of interpolated sample points is simultaneously output by each of the above, current and below buffers 86, 88, 90 to the shading mechanism 30. However, due to the skewing of voxel data within the CFB, the interpolated sample point signals are not aligned in the above, current and below buffers as required. In order to properly align the interpolated sample point signals within the above and current buffers, the interpolated sample point signals of the current buffer are preferably shifted one position in the positive k direction within the shading mechanism 30. In order to properly align the interpolated sample point signals in the above and below buffers, the below buffer sample point signals are preferably shifted two positions in the positive k direction within the shading mechanism. In addition, the interpolated sample point signals from the above and below buffers are preferably delayed by one clock cycle so as to be aligned with the interpolated sample point signals in the current buffer. The combination of the shifts and delays compensates for the skewing difference between the interpolated sample point signals that are provided by the above, below and current buffers.

With the properly aligned interpolated sample point signals available in the shading mechanism 30, gradient differences can be accurately computed for each interpolated sample point signal every clock cycle utilizing the shading mechanism and gradient estimation method as previously described. Preferably, central differences are taken between the interpolated sample point signals on the immediate left and right, above and below as well as along the viewing ray (i.e., front and back of current sample point). The shading mechanism preferably also includes a light vector lookup table. By knowing the gradient value and the values of the light vector look-up table, an intensity of each sample point can be generated using a variety of shading methods (e.g., using an integrated Phong Shader as known in the art). As known in the art, in order to display translucency at a sample point, opacity values are generated using a transfer function represented preferably as a 2-D or 3-D lookup table or other indexing method to accessed by sample density and/or gradient value.

When the viewing direction (i.e., viewing rays) has a single positive or negative component in the y-direction, a simple stepping or shifting scheme is employed to properly align the interpolated sample value signals with adjacent groups of interpolated sample value signals in the shading unit. Specifically, a shift of interpolated sample value signals is preferred from the above, below and current buffers to the shading mechanism 30 is as follows:

| | Shift of Interpolated Samples in K Direction | |
|---|---|---|
| Y Step | Shift from ABC Buffer to Shading Mechanism | Shift Inside Shading Mechanism |
| −1 | Above plane → no shift | Above plane → −1 shift |
| | Current plane → no shift | Current plane → no shift |
| | Below plane → +2 shift | Below plane → −1 shift |
| 0 | Above plane → no shift | Above plane → no shift |
| | Current plane → no shift | Current plane → +1 shift |
| | Below plane → +2 shift | Below plane → no shift |
| +1 | Above plane → no shift | Above plane → +1 shift |
| | Current plane → no shift | Current plane → +2 shift |
| | Below plane → +2 shift | Below plane → +1 shift |

Once the gradient estimation values are computed for each interpolated sample point of the current buffer, each of the interpolated sample point signals including a shading component is provided to a compositing mechanism 74 which performs composition operations of sample points along respective viewing rays. Since the beams of shaded sample value signals that are output by the shading mechanism are still skewed, the composition of a single orthogonal ray cannot be done by a single compositing unit. Specifically, in a preferred embodiment of the invention, each interpolated sample point of the viewing ray is composited in a different compositing mechanism. Since two consecutive voxel beams have a skewing difference therebetween, the compositing results for each consecutive composited ray have to be provided with a unit step in the positive k direction for each consecutive composition step as shown in FIG. 14. For any viewing ray having a steps in x and/or y (positive, negative or none), a shift of shaded sample value signals from the shading mechanism to the compositing mechanism is as follows:

| | Shift of Gradient Sample Values in K | | |
|---|---|---|---|
| | | Y | |
| X | Negative | None | Positive |
| Negative | −1 | 0 | 1 |
| None | 0 | 1 | 2 |
| Positive | 1 | 2 | 3 |

The composition of interpolated sample points performed within the composition mechanism occurs in substantially the same method as previously explained. Specifically, the composition mechanism could combine the interpolated voxel values with either back-to-front compositing, front-to-back compositing, first opaque projection, weighted sum projection, last-to-first cut projection or first-to-last cut projection or any other known composition technique.

Once the interpolated sample points are composited, they are provided, for example, to a general purpose host computer or a pixel processor 42, where post processing, such as post-shading, splatting, and 2-D transformation or warping, is preformed. Pixel processing for display on the display device 44 preferably occurs as previously explained.

In an alternative form of the present invention, one slice of voxel data signals are accessed from the 3-D memory. Each slice of voxel data signals is substantially parallel to the base plane of the 3-D memory. The slice of voxel data consists of a plurality of voxel data beams that are provided to the interpolation mechanism. In this embodiment, the interpolation mechanism has only one face (either a back face or a front face). The interpolation mechanism is a bi-linear or higher order device for parallel viewing wherein the interpolation utilizes voxels from one slice. For perspective viewing, the interpolation mechanism is a linear or higher order device which utilizes a larger neighborhood of voxels from the one slice. The interpolated voxel value signals are thereafter provided to the above, below and current buffers 86, 88, 90 as previously described.

The above described method can support both parallel and perspective viewing of objects stored in the 3-D memory. For perspective viewing, since the viewing rays are substantially divergent (i.e., not parallel), the slices of voxel data signals accessed for any one viewing ray may not be utilized for determining the interpolated sample valve signal for any other viewing ray. Therefore, each viewing ray requires access of individual voxel planes. This is also required for the shading mechanism and compositing mechanism.

Figure 16:
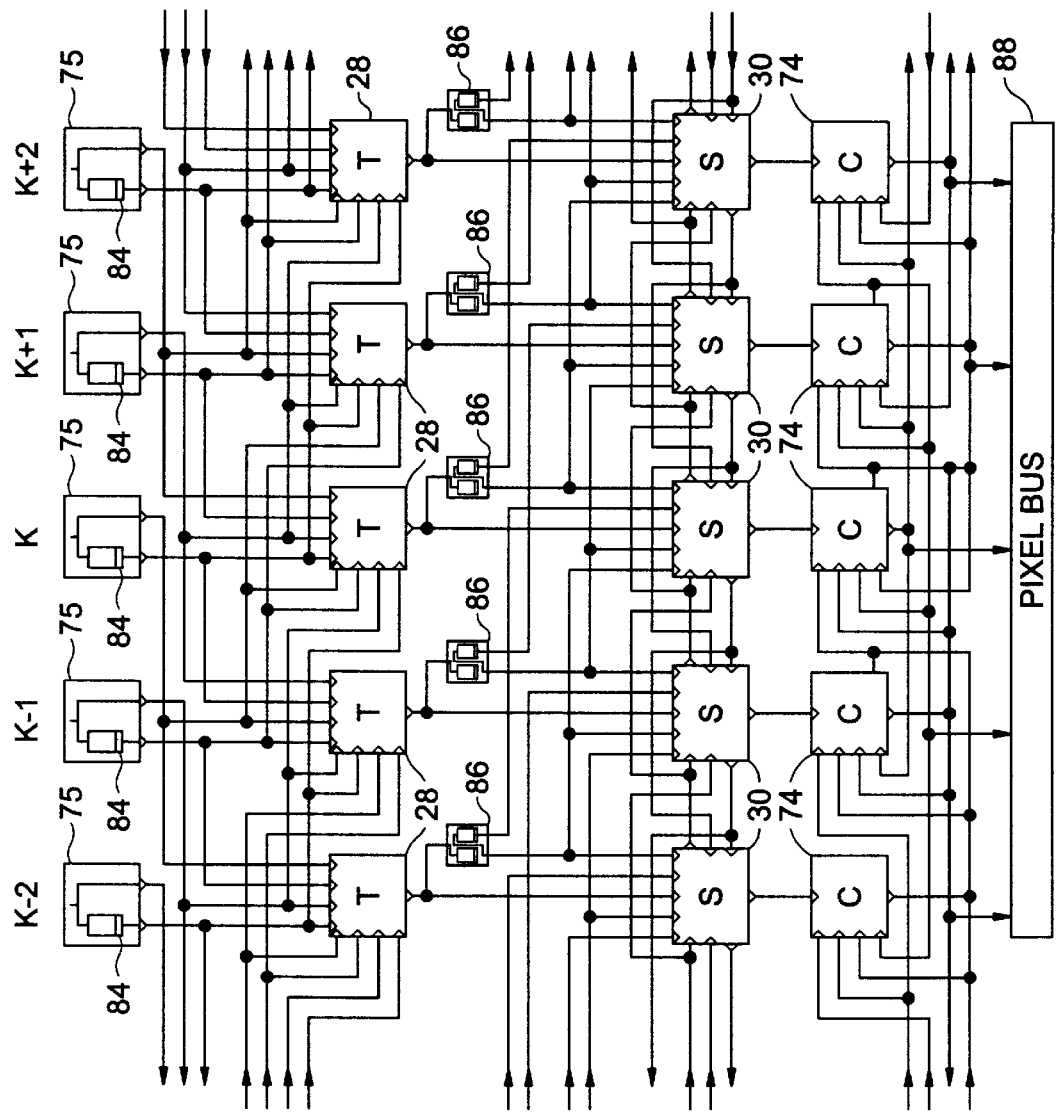
FIG. 16 is a functional block diagram of the apparatus for providing a 3-D volume projection of an object in accordance with the present invention.

Referring now to FIG. 16, a more detailed drawing of the interconnections of embodiment of the apparatus is shown. FIG. 16 shows the implementation of five memory units 75 of the CFB 22 including a first in—first out buffer (FIFO buffer) 84. Each of the five memory units 75 are unable to output two beams simultaneously but by including the FIFO buffer, one slice of memory is provided for one of the PRPs. The apparatus also includes five interpolation mechanisms (TRILIN) 28 that are coupled to the FIFO buffers and memory units in accordance with the shifting requirements between the cubic frame buffer and the interpolation mechanisms as previously described. The five interpolation mechanism 28 are coupled to five shading mechanisms 30 utilizing direct connections for one of the above, below and current planes, and two FIFO buffers 86 for the two remaining above, below and current planes. The shading mechanisms 30 are interconnected among proximate shading mechanism in accordance with the shifting requirements between the TRILIN and the shading mechanism as previously described. The apparatus also includes five compositing units 74 that are preferably directly coupled to a respective shading mechanism for receiving an output signal from each shading mechanism. Each compositing unit perform a projection method as previously described. The interconnection of each component is evident based upon the above requirements of data shifts by and between each component of the apparatus. The output signals provided by the compositing mechanism are output to a pixel bus 88 that forwards the compositing mechanism output signals to the pixel processor 42, frame buffer 40 and display device 44 to generate the volumetric image.

The alternative embodiment of the present invention is advantageous because it is a novel ray-casting method and apparatus that leads to a uniform mapping of sample points along viewing rays onto voxels that avoids multiple access of voxel data for the interpolation mechanism and shading mechanism. The method and apparatus of the present invention access each voxel inside the cubic frame buffer (CFB) only once per projection. This permits regular memory access patterns leading to high efficiency and enabling real-time performance rates needed for visualization of dynamically changing 3D data sets.

A ray-slice-sweeping method in accordance with the present invention will now be described. Ray-slice-sweeping is a plane sweep algorithm for volume rendering. The compositing buffer sweeps through the volume and combines the accumulated image with a new slice of just-projected voxels. The image combination is guided by sight rays from the view point through every voxel of the new slice. All voxels of the data set contribute to the rendering. Gradients are computed at the voxel positions, thereby improving accuracy and allowing a more compact implementation than previous methods. Less control overhead is required than previous methods.

Ray-slice-sweeping is a hybrid method in which each volume slice projects all its voxels towards the view point, but only one inter-slice unit in distance. At the end of the sweep, the compositing buffer contains the base plane image which then has to be warped onto the image plane. The sweep is done in object storage order, yet it is image-pixel driven, while the warp is performed in scan line order; thus, ray-slice-sweeping is properly described as a hybrid method. The ray-slice-sweeping method has particular utility for perspective projections. However, parallel projections can also readily be performed with the view point at infinity.

Figure 17:
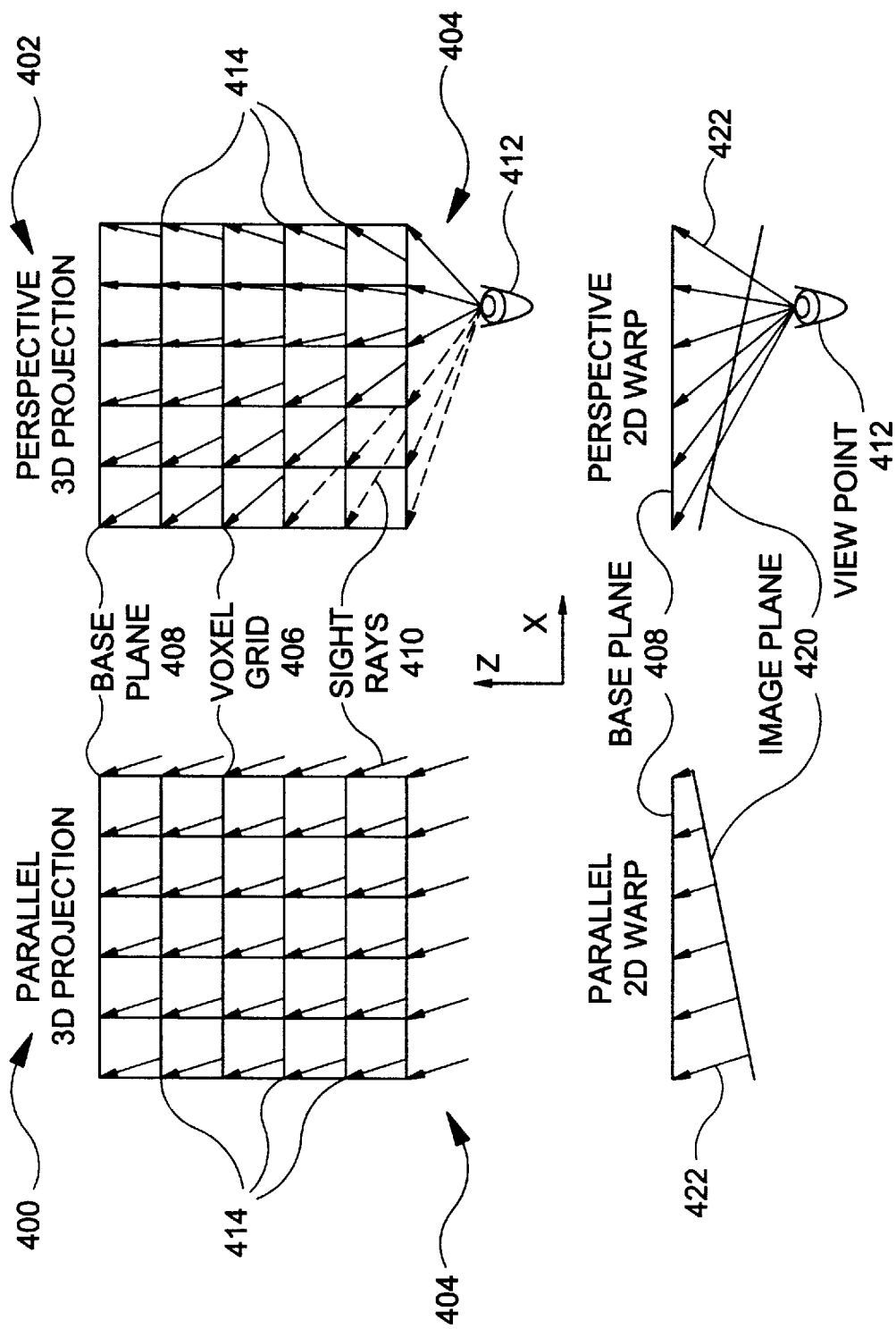
FIG. 17 shows a ray-slice-sweeping method of the present invention with front-to-back compositing.

Reference should now be had to FIG. 17 which depicts ray-slice-sweeping through a volume using front-to-back compositing. Case 400 is for a parallel three dimensional projection, while Case 402 is for a perspective three dimensional projection. In each case, a three dimensional volume 404 includes individual voxels located on a grid 406. FIG. 17 depicts the three dimensional volume in a two dimensional view perpendicular to the y axis, showing the x and z directions. Each volume 404 has a base plane 408 employed for projection purposes to be discussed below. In one form of the invention, as depicted in FIG. 17, a plurality of sight rays 410 are cast from a view point 412 for each slice of voxels. The view point in Case 400 of FIG. 17 is at infinity, since this is a parallel projection. Slices of voxels are indicated as reference numeral 414.

Figure 18:
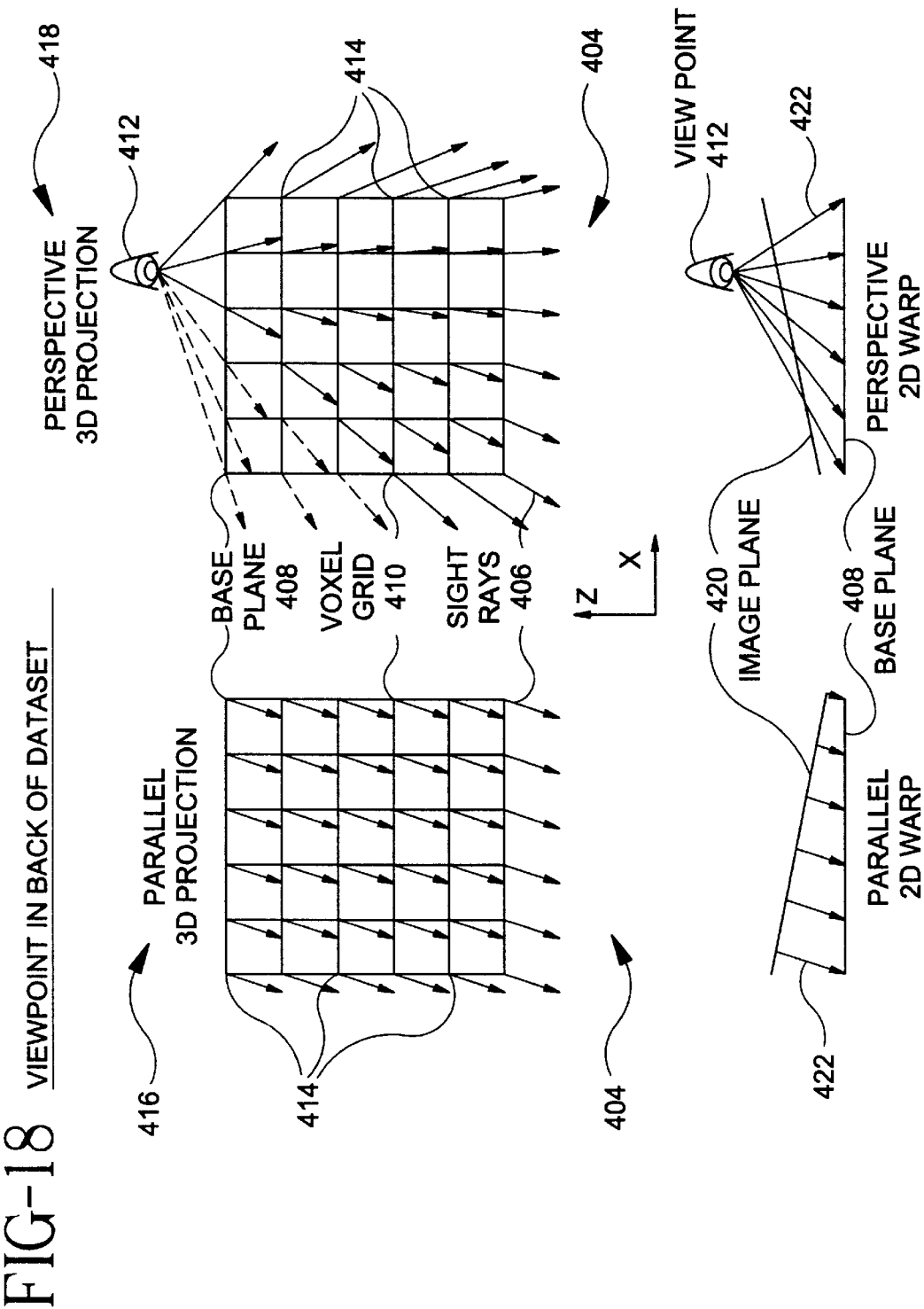
FIG. 18 shows a ray-slice-sweeping method of the present invention with back-to-front compositing.

While sweeping through the volume 404 in, for example, front-to-back processing order (i.e., front-to-back sweeping), each voxel of the current slice has to be colored, illuminated and classified, resulting in RGBA intensities for that voxel (red, green, blue and alpha). In a preferred form of the method, sweeping through the dataset is carried out in the positive z direction, independent of the view point. With the view point 412 in front of the volumetric dataset 404, as shown in FIG. 17, front-to-back sweeping and front-to-back compositing are used to combine the RGBA values of the current slice with those of the compositing buffer. Front-to-back compositing is shown in greater detail in FIG. 19 and will be discussed below. Alternatively, when the view point is in front of the data set, both the sweeping and compositing can be performed in a back-to-front fashion. FIG. 18 shows back-to-front compositing with the view point 412 in back of the three dimensional data set 404. Similar items have received similar numbers. The parallel case is indicated as 416 with the perspective case indicated as 418.

With reference again to FIG. 17, as noted, rays 410 cast by the method within a horizontal cut through the volumetric dataset 404 are depicted. The data slices 414 are preferably processed in the positive z direction. Those sight rays 410 which are dashed exceed a 45° viewing angle limit, and do not influence the final image. In FIG. 17, with the view point 412 in front of the volumetric dataset 404, the sight rays 410 point towards the voxel grid positions 406 and start in between voxels of the previous slice. Computing an interpolation, such as a bilinear interpolation, of the four compositing buffer colors surrounding the starting point of an individual ray 410 yields the colors needed to perform compositing calculations for the current voxel. As noted, compositing will be discussed below with respect to FIG. 19. It will be appreciated that all values written to the compositing buffer are aligned with the voxel grid 406. Note that the rays depicted in FIGS. 17 and 18 lie along the sight rays 410 but extend only between adjacent slices 414. These short portions of the sight rays are referred to herein as interslice ray segments to avoid confusion, and will be discussed further below.

Referring back now to FIG. 18, sight rays 410 are depicted for a view point 412 behind the volumetric dataset 404. In this case, the sight rays begin at the voxel positions and point towards the previously processed slice. The accumulated colors employed in back-to-front compositing are determined, for example, by bilinear interpolation of the four compositing buffer colors surrounding the endpoint of a given ray 410.

Still with reference to FIGS. 17 and 18, it will be appreciated that in all of Cases 400, 402, 416, 418 the final compositing buffer values, which are contained at the base plane 408, must then be projected onto an image plane 420. Separate rays 422 are projected from the view point to the grid locations of the base plane 408 and control the warping of the image on the base plane 408 onto the image plane 420, for later projection purposes. It should be appreciated that again, the view point 412 is at infinity for Cases 400 and 416, since they are parallel, such that the separate rays 422 are parallel.

It should be noted that all operations carried out during the ray-slice-sweeping method read and write data only within a local neighborhood of the currently processed voxel. The small modifications add up from slice to slice, such that at the end of the sweeping, all voxels have been shifted to the image position required by perspective projection. Note that there are neither regions between rays in which voxel data is skipped, nor is any voxel used more than once. Thus, the method automatically maintains a well-balanced work load.

Figure 19:
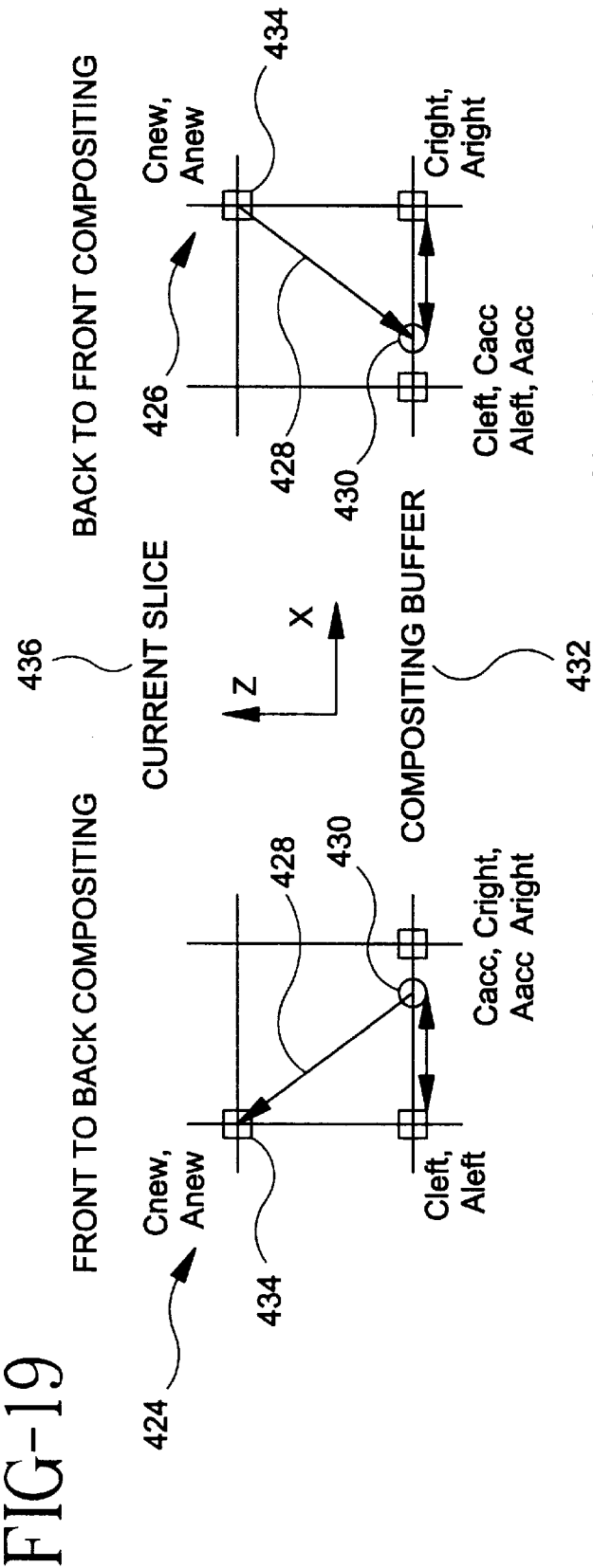
FIG. 19 shows compositing techniques of the present invention for front-to-back and back-to-front cases.

Reference should now be had to FIG. 19 which depicts both front-to-back and back-to-front compositing techniques suitable for use with the method of the present invention. Case 424 depicts front-to-back compositing, while Case 426 depicts back-to-front compositing. In the front-to-back compositing Case 424, the interslice ray segment 428 can extend along a sight ray cast from the view point 412 (not shown in FIG. 19) through an intersection point 430 in the compositing buffer 432 to a grid point location 434 of the current slice 436. For the case shown, interpolation can occur in the compositing buffer using the formulas depicted in the figure.

Similarly, for the back-to-front compositing Case 426, the interslice ray segment 428 can extend along a sight ray cast from the view point 412 (not shown in FIG. 19) through a grid point location 434 in the current slice terminating in an intersection point 430 within the compositing buffer, wherein interpolation is again performed, using the equations shown in FIG. 19. It is to be understood that higher or lower orders of interpolation may be performed, as discussed further below.

A discussion of the architecture of the apparatus of the present invention will now be presented. The invention disclosed in the parent of the present application, i.e., U.S. patent application Ser. No. 08/388,066 filed Feb. 13, 1995, is a pipelined scalable volume rendering architecture based on ray casting. The present invention modifies the raycasting approach by implementing ray-slice-sweeping. Sample points are employed which are directly on the voxel grid. Thus, the trilinear interpolation stage (see items 28 in FIG. 16) is not needed in the apparatus of the present invention. In turn, the gradient computation is simplified. During perspective projection, all voxels of the dataset contribute to the rendering. Since there is less control information required for rays, the implementation can be more compact.

Figure 20:
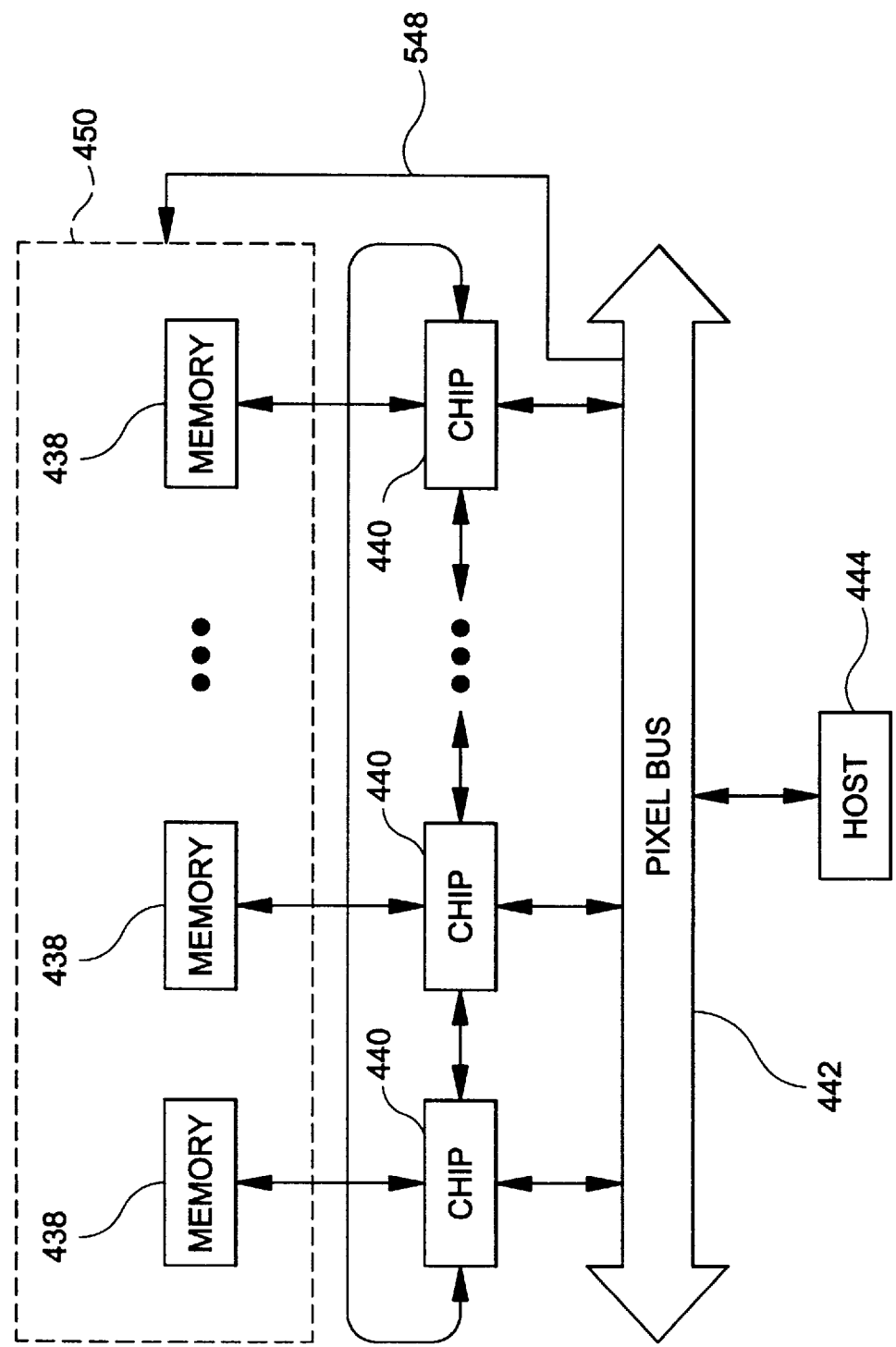
FIG. 20 shows an overview of the architecture of a preferred form of the present invention.

Reference should now be had to FIG. 20 which gives a brief overview of the architecture of the present invention. Voxel memory is distributed over several memory modules 438. A rendering pipeline 440 is provided for each memory module 438. As suggested by the labeling in FIG. 20, each rendering pipeline 440 is preferably implemented on a separate chip. Each of the rendering pipelines 440 works on the three dimensional projection simultaneously. Only nearest neighbor connections are required for horizontal communication, until final base plane pixels are computed. These pixels are sent over a global pixel bus 442 to a host or graphics card memory 444 to be assembled into one image and warped onto the final image plane as depicted in FIGS. 17 and 18.

Figure 21:
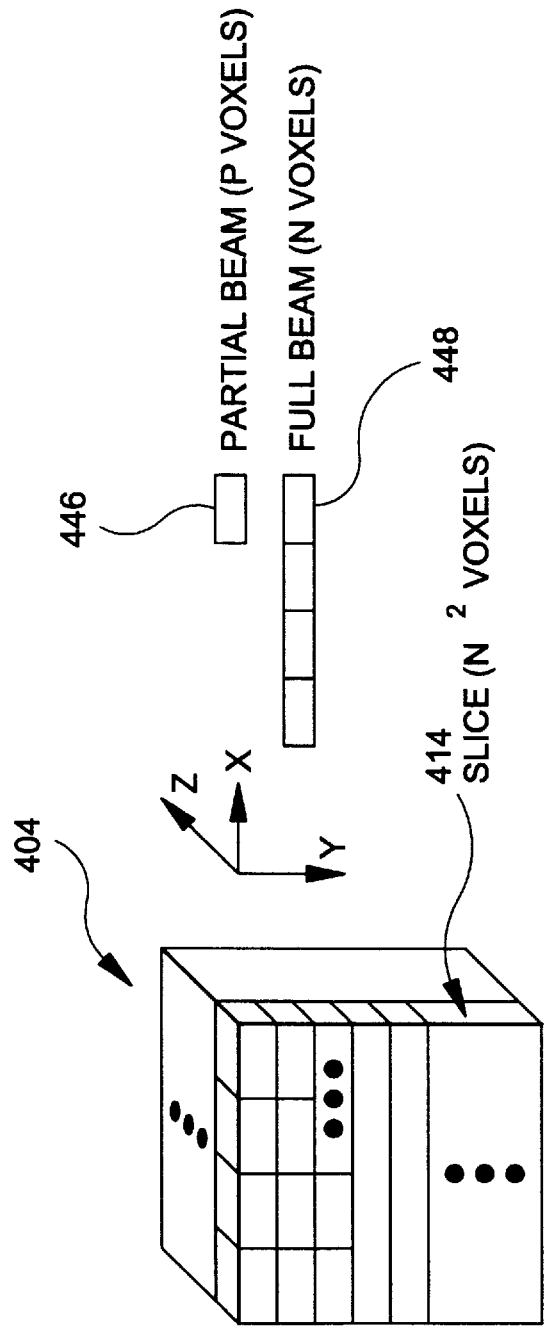
FIG. 21 depicts partial beam processing order as employed in the present invention.

Further details will now be provided about the various modules within the rendering pipelines 440. As an aid in understanding operation of the present invention, signal flow graphs (SFG), as are known in the art of volume imaging, will be employed. In the SFG, circles represent stages within a pipeline 440, vertical arcs show data flow within a pipeline, and diagonal arcs show data flow between pipelines. The weight on each arc represents the number of pipeline cycles for which the data must be delayed before reaching the next pipeline stage. All units assume partial beam processing. Beams are rows of voxels. Breaking a beam into equal size segments produces partial beams; the size of a partial beam is equal to the number of parallel pipelines 440 implemented in hardware. Reference should be had to FIG. 21 which depicts partial beams 446 having p voxels and full beams 448 having n voxels. As shown in the figure, for each three dimensional volume 404, slices 414 are preferably incremented in the positive z direction. Within each slice 414, full beams are preferably incremented in the positive y direction. Finally, within each full beam 448, partial beams 446 are preferably incremented in the positive x direction. To handle differences between partial-beam-end, beam-end and slice-end, each module has an extension unit (EX) at every pipeline stage with neighbor connections.

The terms "partial-beam-end," "beam-end" and "slice-end" refer respectively to the end of a partial beam, the end of a full beam and the end of a slice. Each voxel has control bits associated with it; when the end of a partial beam is reached, the partial-beam-end control bit is set to true; when the end of a full beam is reached, the beam-end control bit is set to true and when the end of a slice is reached, the slice-end control bit is set to true. The extension unit (EX) is discussed further below. It is to be understood that as used herein, a full beam generally includes all the voxels in one row, while a partial beam is the result of dividing a full beam into a number of smaller, partial beams; these may be equal in size or not. When the term "beam" is used, it will be apparent from the context whether it refers to a full beam or the general case of either a full or partial beam. As used in the claims herein, the term "beam" is intended to include at least one of a full beam and a partial beam. Note that any details about the architecture of the present invention which are not specifically discussed are identical to those of the architecture for the parent Ser. No. 08/388,066 case, with specific reference to FIGS. 12–16 as discussed above.

Figure 22:
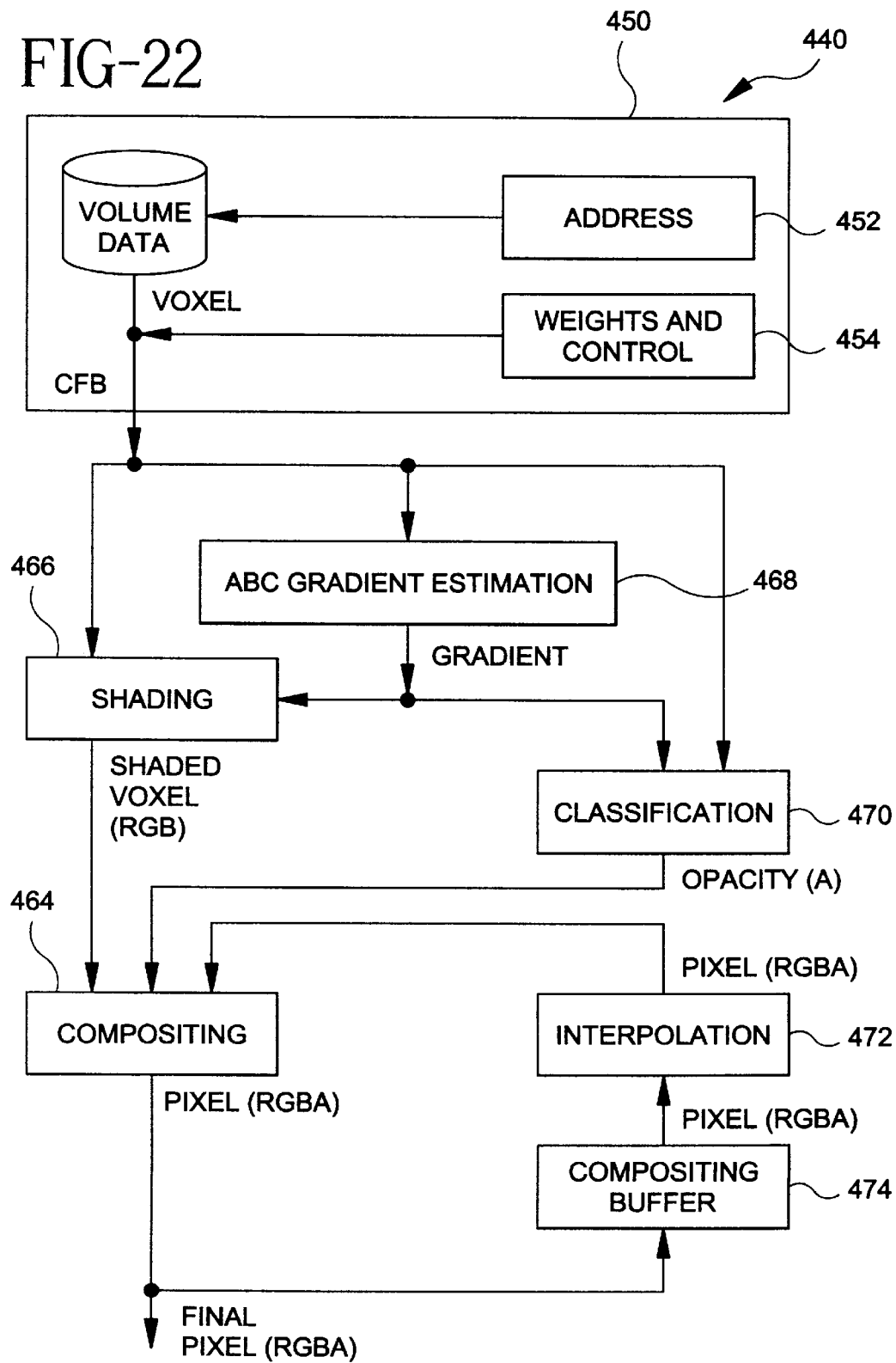
FIG. 22 depicts an individual rendering pipeline of a preferred form of apparatus in accordance with the present invention.

Reference should now be had to FIG. 22, which provides further details of the rendering pipelines 440 of the present invention. FIG. 22 also depicts a three dimensional cubic frame buffer 450 which contains the individual memory modules 438, each of which connects to one of the rendering pipelines 440. Cubic frame buffer 450, as noted, contains the memory modules 438 which provide distributed skewed storage of voxels, as well as an address generator 452 and a control unit 454. The cubic frame buffer 450 is the only stage within the rendering pipeline (in this context, used to include the entire architecture) which has global position information. It makes all global decisions for all pipeline modules. Subsequent stages make their selections based on the control bits generated in the cubic frame buffer.

The following abbreviations are employed throughout the present application:

| | |
|---|---|
| (i, k) | Memory Space coordinates: k = memory module number, i = address in module. |
| ($u_d$, $v_d$, $w_d$) | Dataset Space coordinates: right handed, view independent and static. |
| ($x_p$, $y_p$, $z_p$) | Pipeline Space coordinates: right handed, view dependent and changes if major view direction changes. |
| n: | number of voxels along one axis of a cubic dataset. |
| p: | number of parallel pipelines. |
| k: | current pipeline number. |
| b: | number of partial beams (p · b = n). |
| $N_s$: | current slice number. |
| $N_B$: | current beam number. |
| $N_b$: | current partial beam number. |
| SR: | control bit for start of ray |
| ER: | control bit for end of ray |

The cubic frame buffer 450 must first calculate the position of the voxels starting to flow down an individual pipeline 440 in the current clock cycle. An efficient incremental algorithm for this needs only a few local registers to store counters for the current partial beam number $N_b$, the beam number $N_B$, and the slice number $N_s$. The result is the three dimensional voxel position P=(x,y,z) in the pipeline coordinate system. The view point V is also defined in the pipeline coordinate system.

Figure 23:
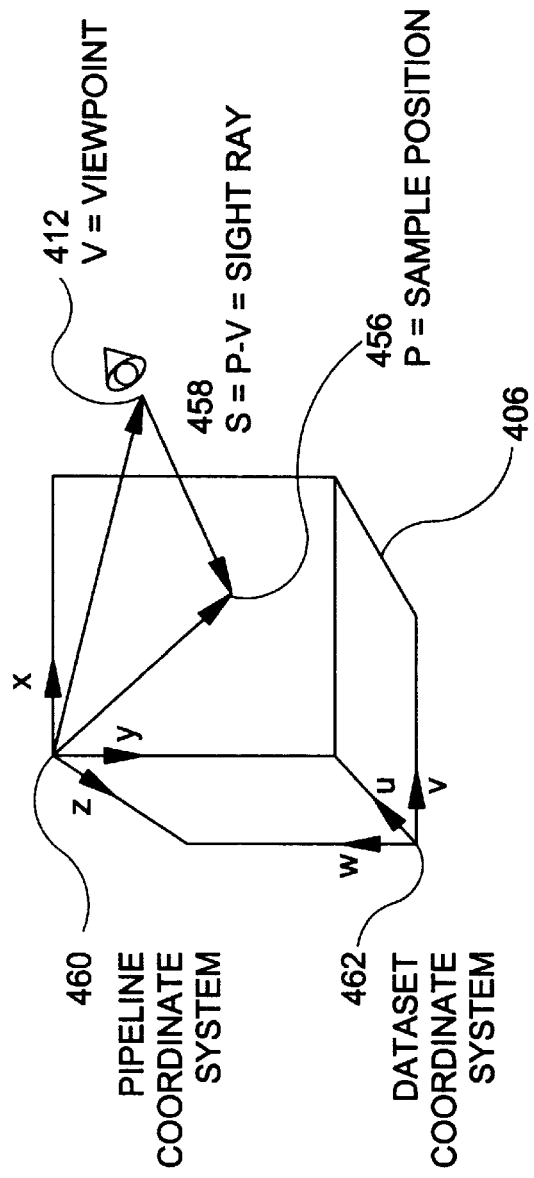
FIG. 23 defines a sight ray and different coordinate systems employed in the present invention.

The sight ray S of a voxel is the vector from the view point to the voxel position. Reference should be made to FIG. 23 showing the view point 412, voxel or sample position 456, sight ray S 458, pipeline coordinate system 460 and dataset coordinate system 462 for a three dimensional volume 406. Voxel/sample position 456 is defined by the vector P in the pipeline coordinate system 460. View point 412 is defined by the vector V in the pipeline coordinate system 460. Thus, sight ray S 458 is the vector S=P–V. Normalizing S yields dx=$S_x$/$S_z$ and dy=$S_y$/$S_z$. These normalized x and y components determine bilinear (or other order) interpolation weights generated by control unit 454 (in FIG. 22) and are forwarded to the compositing unit 464 (also in FIG. 22). The components dx and dy are also range checked. If the absolute value |dx|>1 or |dy|>1, then the viewing angle exceeds 45° and an invalid bit is set to true. To permit voxels with the ranges in excess of 1 to be valid, the architecture would require connections beyond nearest neighbor. The shading stage 466 assigns complete transparency (alpha=0) to those shaded voxels which have the invalid bit set.

As in the embodiment of the parent application (again referring to FIGS. 12–16), for any arbitrary viewing direction, at least one face of the three dimensional data cube 404 has a normal within plus or minus 45° of the sight ray S 458. The slices 414 processed by the method of the present invention are parallel to that slice (i.e., that face of the dataset 404). Accordingly, the restriction to using only nearest neighbors is feasible.

For parallel viewing, all sight rays S 458 are the same; sweeping the volume 404 once delivers a complete image. In perspective projection mode, the sight rays S 458 differ for each voxel within the volumetric dataset 404, as might those faces of the volume 404 for which the normal is within plus or minus 45°. This is especially likely to happen for view points 412 which are close to or inside the volumetric dataset 404. In order to acquire a full image with these settings, multiple sweeps through the data volume 404 in different processing directions are necessary. The final image is assembled from the regions of valid pixels in the different base plane images.

All of the architectures disclosed herein, including those for the parent Ser. No. 08/388,066 and grandparent Ser. No. 08/301,205 applications, share the same memory layout. A voxel at a position P'=(u,v,w) is stored in memory module k=(u+v+w) mod p. This is called skewed memory. It distributes the voxels across memory modules such that all voxels of a partial beam 446 parallel to the x, y or z axis reside in different memory modules 438. Thus, they can be accessed conflict free. All computation in the pipeline assumes working on slices 414 perpendicular to the z axis, and uses pipeline coordinates 460. To compute the voxel memory address, the vector P=(x,y,z) has to be transformed into the dataset coordinate system 462. The transformed vector P'=(u,v,w) is used to compute the address: i=u div p+vb+wb$n_y$. While storing the data, one has to ensure that a voxel at position (u,v,w) is written to memory module k=(u+v+w) mod p. However, in the rendering mode, this computation is implicit; each rendering pipeline 440 has only one dedicated memory module 438.

To be certain that voxels are only shaded if they have valid gradients, the weight and control portion 454 must also set the invalid bit for all voxels that have a direct neighbor on the other end of the dataset. For these voxels, the cubic frame buffer 450 may also have to set the SR or ER bits. That is, ER should be set to true if the current voxel is on the left most slice of the dataset 404 and dx less than 0. The SR and ER bits are forwarded to the compositing unit 464, where they enable the compositing buffer reset (this is done by SR) and the pixel output to the final image (this is done by ER). The control unit 454 also has to set the start of beam (BS) bit whenever the current partial beam 446 is the first on a full beam 448. This bit is needed in the aforementioned extension units.

Finally, in order to output the final pixels to the unskewed base plane position, the cubic frame buffer 450 must compute the pixel address for each compositing buffer element. The coordinates are:

$$x = (N_b \cdot p + k - N_J - (N_B - 1) + 2n)2 \bmod n + N_J \cdot A$$

where

-continued $$A = \begin{cases} 1 \text{ if } dx > 0; \\ 0 \text{ if } dx = 0; \\ -1 \text{ if } dx < 0 \end{cases}$$

and $$y = (N_B - 1) + N_3 \cdot B$$

where $$B = \begin{cases} 1 \text{ if } dy > 0; \\ 0 \text{ if } dy = 0; \\ -1 \text{ if } dy < 0 \end{cases}$$

With reference again to FIG. 22, each pipeline 440 also preferably includes an ABC gradient estimation unit 468, a classification unit 470, an interpolation unit 472 and a compositing buffer 474. The classification unit 470 can include a look-up table for opacity based on intensity. It can, if desired, be formed as part of the shading unit 466. The gradient estimation unit 468 can also be included as part of the shading unit 466, if desired. In this case, the shading unit deals with RGB, α, and other displayable parameters.

Figure 24:
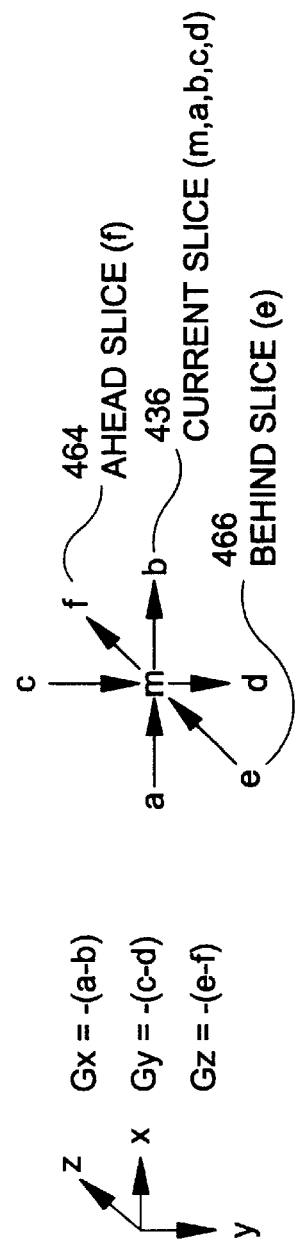
FIG. 24 illustrates gradient components and the unskewed spacial relationship of six computation parameters as employed in gradient estimation with the present invention.

Further details regarding the function of the gradient estimation unit 468 will now be provided. Referring to FIG. 24, the preferred gradients used for shading in the present invention are central difference gradients. As a consequence, the six axis-aligned neighbors (labeled a–f) of a given voxel (labeled m) are needed to compute the gradient. In the present invention, all necessary neighbors are already on the voxel grid 406. Accordingly, no interpolation and no gradient corrections are necessary. With reference to FIG. 24, voxel f is contained in the ahead slice 464, voxels m, a, b, c and d are contained in the current slice 436 and voxel e is contained in the behind slice 466. The GX, G, and G. gradient components are calculated using the formulas in FIG. 24. It will be appreciated that FIG. 24 depicts the unskewed spatial relationship of the six computation parameters, i.e., voxels a–f.

The voxels needed for the gradient computation reside in three planes, the ahead 464, behind 466 and current 436 planes (slices). The terminology ahead, behind and current reflects the processing order of the slices. The slices may be stored in first-in-first-out (FIFO) buffers designated as ABC for ahead, behind and current respectively. Most preferably, only the behind and current slices are stored in a FIFO; the ahead slice preferably comes directly from the cubic frame buffer 450. The FIFO buffers will be discussed further hereinbelow with reference to FIG. 46.

Figure 25:
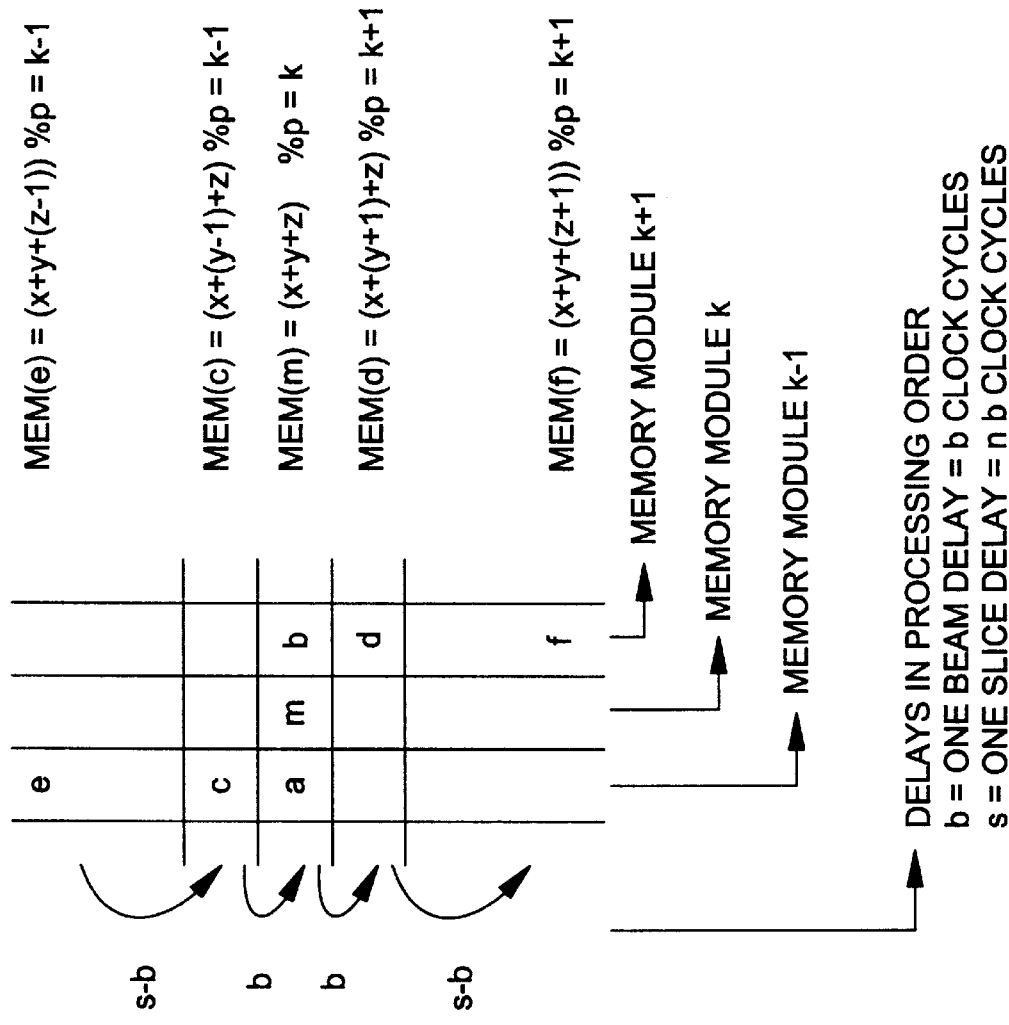
FIG. 25 shows the skewed position of the gradient computation parameters depicted in FIG. 24.

Reference should now be had to FIG. 25 which depicts the spatial and temporal relationships between the gradient computation parameters with skewing considered. Voxel e is read first. After b(n–1)=(s-b) cycles, voxel c is available in the same pipeline. After b cycles later, voxel a is read in the same pipeline and voxel b two pipelines to the right. That pipeline also reads voxels d and f after b and b(n–1) more cycles.

The delaying and moving of these voxels, so that they can be used to compute the three gradient components, will now be discussed utilizing the above-mentioned signal flow graphs (SFGs). SFGs have been discussed above. Those desiring further details can refer to the Ph.D. thesis of Hanspeter Pfister entitled "Architectures for Real-Time Volume Rendering" available from the Computer Science Department at the State University of New York at Stony Brook, Stony Brook, N.Y. 11794-4400, and published in January, 1997. Initially, the easiest possible approach will be presented; each subsequent figure will then add a new inherent consideration. New logical symbols will be explained at the bottom of each SFG.

Reference should now be had to FIG. 26, which shows a SFG which computes only the y-component of the gradient. Voxel c is delayed and voxel d is moved, such that they end up at the same clock cycle in the same pipeline. Hence, computation of the vertical gradient component $G_y$=–(c–d) is enabled.

Figure 28:
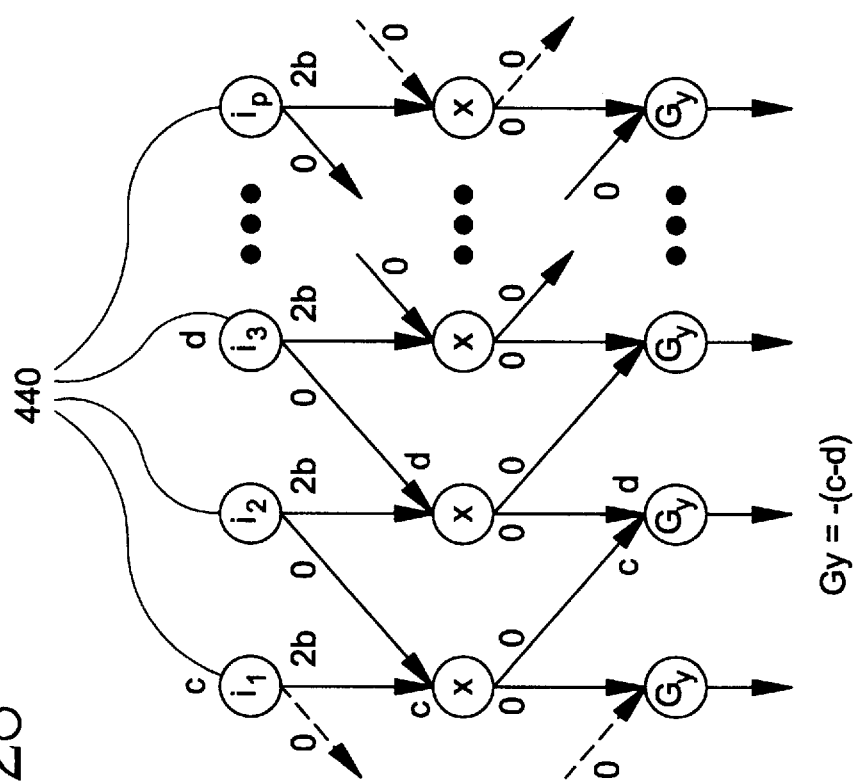
FIG. 28 shows the a signal flow graph of the gradient y-component in a form of the present invention wherein the result is computed in the pipeline of the corresponding center voxel.

Referring now to FIG. 27, the approach of FIG. 26 is modified so that only nearest neighbor connections are used. The approach of FIG. 27 requires one additional pipeline stage to receive voxel d from the pipeline to the right and send it to the pipeline to the left. In FIG. 28, the forwarding directions are changed such that the y-gradient is computed in that pipeline which also holds the corresponding center voxel m.

Figure 29:
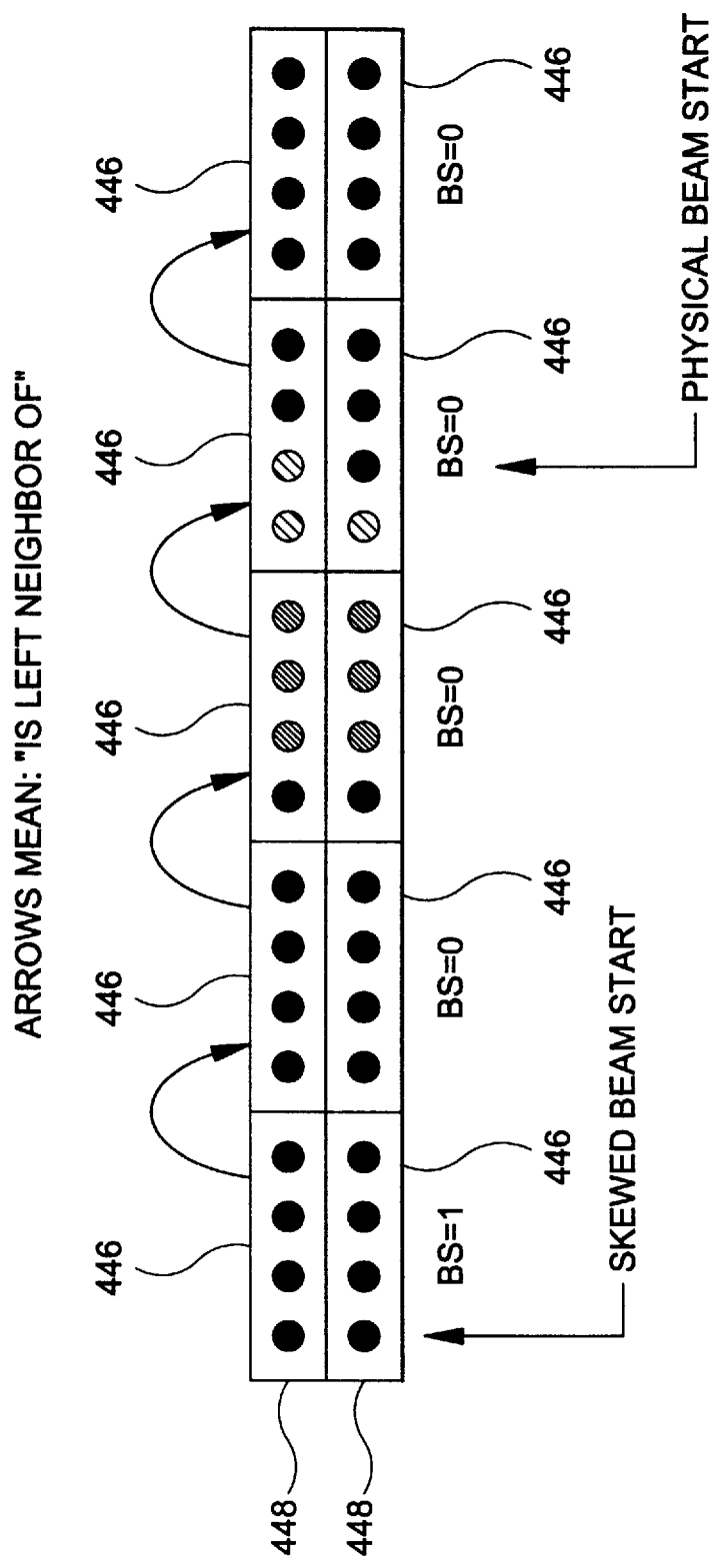
FIG. 29 shows two consecutive full beams of the present invention in skewed space.

With reference now to FIG. 29, it will be seen that partial beams 446 are tiled across each full beam 448. FIG. 29 illustrates two full beams 448 in skewed space, each having five partial beams 446. The shaded circles represent voxels with different intensities. In the example depicted in FIG. 29, each partial beam 446 has four voxels. The arrows indicate that a given voxel is the left neighbor of the other given voxel to which the arrow is connected. The voxel in the right most pipeline is usually the left neighbor of the voxel in the left most pipeline one clock cycle later. Consequently, forwarding to the right requires buffering the right most voxel for one clock cycle. This buffer logically extends the next partial beam. Due to the skewing, the physical start of a beam changes from beam to beam. Thus, the left most and right most voxels of a beam are also neighbors. Therefore, forwarding to the right requires the right most pipeline to send its data to the left most one. Unfortunately, it arrives there a full beam processing time (b cycles) too late. The architecture of the parent Ser. No. 08/388,066 application, depicted in FIGS. 12–16 herein, handled this problem by reading the beam as soon as possible, but delaying the processing of the data by b cycles. This required buffering of the entire beam.

Figure 30:
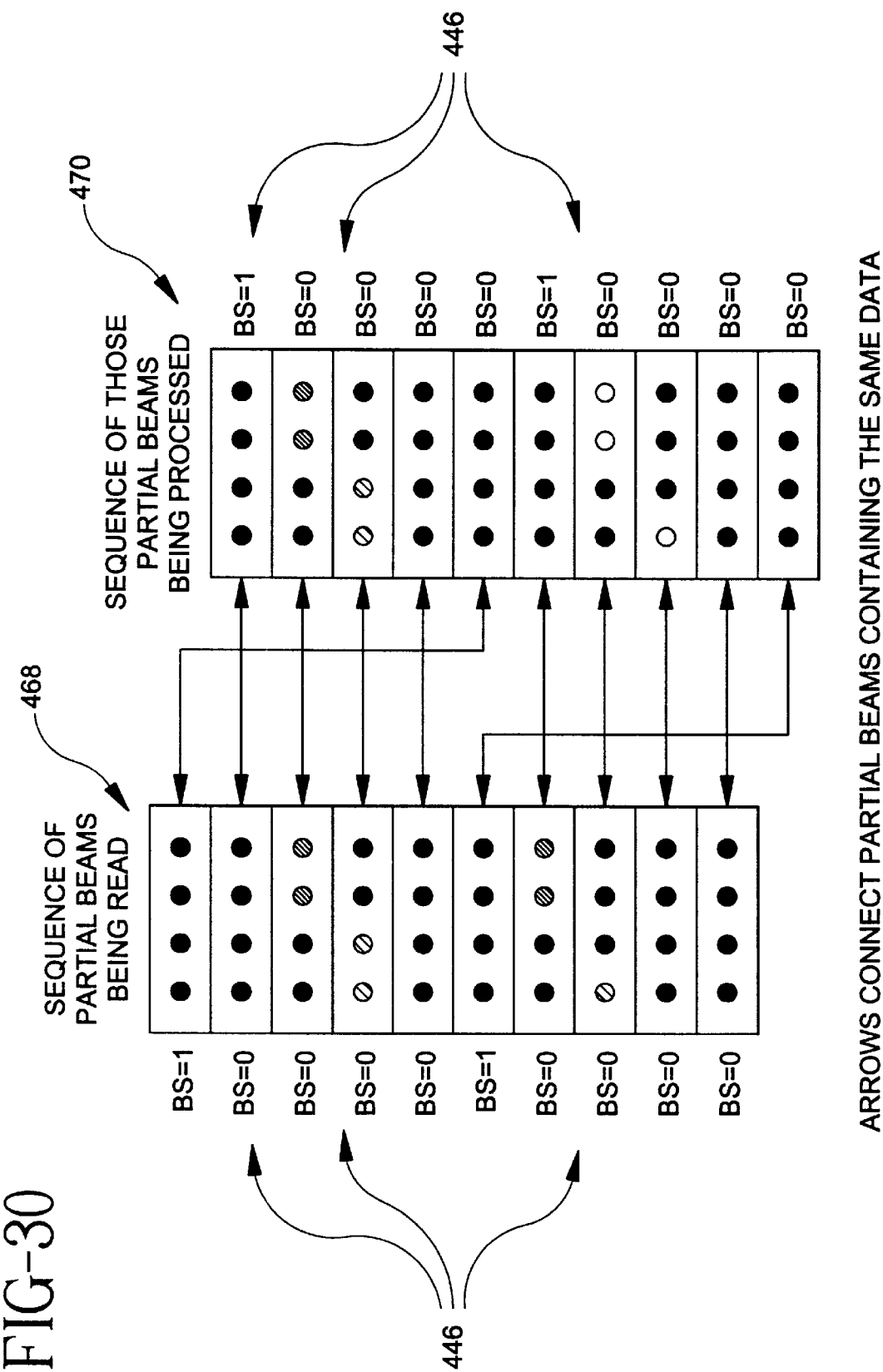
FIG. 30 shows two consecutive full beams of the present invention in time.

Referring now to FIG. 30, a superior approach is suggested wherein the beginning of a beam is shifted by one partial beam to the right. The left column 468 depicts those partial beams 446 which are being processed, while the right column 470 of the figure depicts those partial beams 446 which are being processed. The arrows which run between the columns 468, 470 connect those partial beams 446 which contain the same data. The first partial beam 446 which is read is buffered in an extension unit for b–1 cycles. The following partial beams immediately process their data. After the last partial beam 446 is finished, its right most voxel and the voxels from the extension buffer are used to perform the computations on the first partial beam. In this manner, the extension buffer for each stage that forwards data to the right shrinks from full beam size to partial beam size. This increases the scalability of the architecture of the present invention.

Reference should now be had to FIG. 31, which depicts a SFG employing the ideas described for wrap-around connections between the ends of the partial beams, just illustrated with respect to FIG. 30. FIG. 31 also depicts the above-described extension unit EX. The extension unit is designated by reference character 472. With reference to FIG. 31, extension unit 472 has a first input 474 for receiving the input data x, and a second input port 476 for receiving the BS (or other) bit from the control unit 454. Normally, input data x is forwarded directly to first output port 478. However, if the BS (or other) bit is true, then the value of x is stored in the D flip flop 480 and the old value of x is forwarded to output port 478, through demultiplexer 482. It should be appreciated that, while the beam start control bit (BS) is depicted in FIG. 31, the extension unit EX 472 functions similarly for any of the control bits employed in the present invention, for example, the partial-beam-end, beam-end or slice-end control bits discussed above.

Reference should now be had to FIG. 32, which depicts a first alternative for complete x, y and z gradient computation in a single SFG. The configuration of FIG. 32 is designed to minimize pin count. Only two crossings between pipelines 440 are required. Accordingly, considering the connections to the left and the right pipeline, as well as 16 bits per voxel, a module constructed in accordance with FIG. 32 would require 2×2×16=64 input/output pins. The drawback is that four full slice buffers are necessary.

Figure 33:
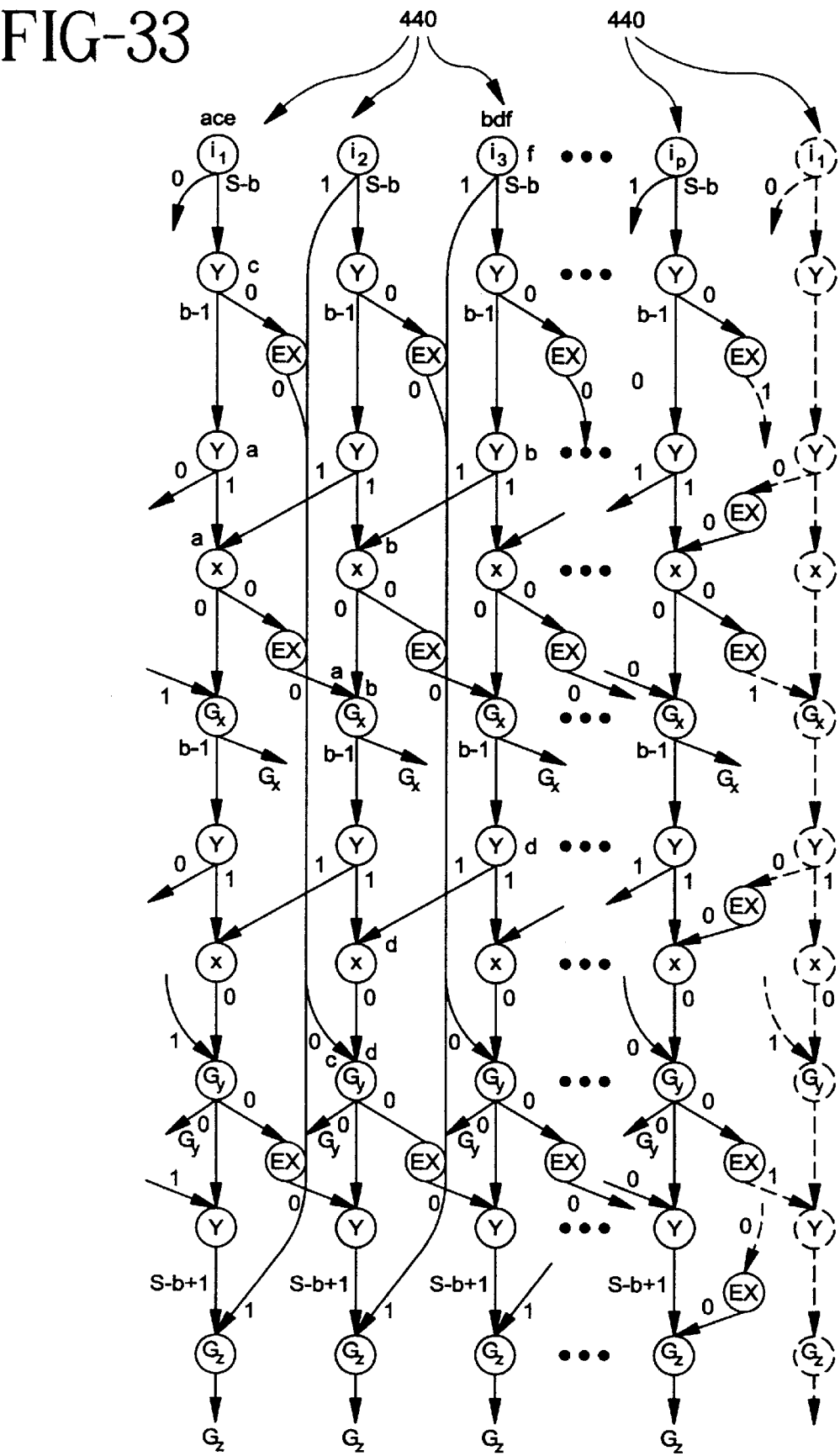
FIG. 33 shows a signal flow graph for all gradient components in a configuration which minimizes internal buffer size.

Referring now to FIG. 33, only two full slice buffers are required for the configuration depicted there. The configuration of FIG. 33 is designed to minimize on-chip buffer size. However, each pipeline 440 in FIG. 33 requires six connections to one neighboring pipeline. Thus, 6×2×16=192 input/output pins are required. In the configurations depicted in FIGS. 32 and 33, pin count can be reduced by 75% if only the four most significant bits are sent across pipelines 440. This approach is feasible if the shader 466 uses only the four most significant bits of the computed gradient components. The hardware requirements of the system as depicted in FIGS. 32 and 33 can be summarized as follows:

| MINIMIZING PINS | MINIMIZING BUFFERS |
|---|---|
| Buffer size = 4 slices | Buffer size = 2 slices |
| I/O pins for 16 bit = 64 | I/O pins for 16 bit = 192 |
| I/O pins for 4 bit = 16 | I/O pins for 4 bit = 48 |

The shading and classification apparatus and method according to the present invention will now be discussed. Note that shading and classification are identical to the shading and classification techniques set forth hereinabove with respect to the parent Ser. No. 08/388,066 application, with particular reference to preceding FIGS. 12–16. The shading stage or unit 466 and its inter-relationship to other components in the pipeline 440 are depicted in FIG. 22 above. Once voxel intensity and the corresponding gradient are available, the shader 466 uses the intensity as an index into RGB color tables, and the gradient as an index into a reflectance map. The color tables map different intensities to different colors. The color transfer function can be used to segment the data on the fly. The reflectance map is a quantized solution table for the illumination equation for rays along the main viewing direction and any surface orientation. The final color of a shaded voxel is then composed from the values returned from these tables. The most compact implementation just multiplies the RGB values from the color table with the intensity taken from the reflectance map. Reference should also be had to the above discussion of the gradient, classification and shading units 468, 470, 466 respectively.

Pixels are typically represented by RGBA where A represents the opacity $\alpha$. The opacity for each voxel is determined by a classification function which depends on the voxel intensity and the gradient magnitude. This function is stored in another look-up table. Filling the table using different algorithms allows very flexible viewing modes such as X-ray, surface, fog and the like. It should be understood that, as an alternative to RGBA, RGBT can instead be employed in the apparatus and method of the present invention, wherein T represents the transparency t, transparency t being equal to $1-\alpha$. Transparency can, if desired, be substituted for opacity $\alpha$ inasmuch as it simplifies compositing calculations. The transparencies for each sample can be taken from a "transfer function" look-up table which is indexed by the sample value and the gradient magnitude at the given position. Such a transparency table also permits the flexible viewing modes discussed above for the opacity table.

The compositing employed with the present invention will now be discussed. Either back-to-front or front-to-back compositing can be employed. The choice will normally depend on the major viewing direction. If, in the dataset coordinate system 462 the view point 412 is left, above or in front of the dataset 404, front-to-back compositing is normally used. When the view point 412 is located other than those locations, back-to-front compositing is normally employed. In usage herein, when, in the dataset coordinate system, the view point is left, above or in front of the dataset 404, the view point will be referred to as being in front of the three dimensional buffer 450 and when the view point is right, below or behind the dataset 404, the view point will be referred to as being behind or in back of the three dimensional buffer 450. It is to be noted that the preferred compositing directions assume front-to-back sweeping through the slices 414 of the three dimensional volumetric dataset 404. However, when back-to-front sweeping is employed, back-to-front compositing can be used with the view point 412 in front, and front-to-back compositing can be used with the view point 412 in back of the dataset 404. For back-to-front compositing, the following equations are employed:

$C = (1 - A_{new})C_{acc} + C_{new}$ $A = (1 - A_{new})A_{acc} + A_{new}$

Alternatively, for front-to-back compositing, the equations are:

$C = (1 - A_{acc})C_{new} + C_{acc}$ $A = (1 - A_{acc})A_{new} + A_{acc}$

The term $C_{new}$ is used for any of the shaded voxel color components (RGB), and the term $A_{new}$ is used for the classified voxel opacity. The subscript "acc" is used for the corresponding accumulated values taken from the compositing buffer 474.

Figure 34:
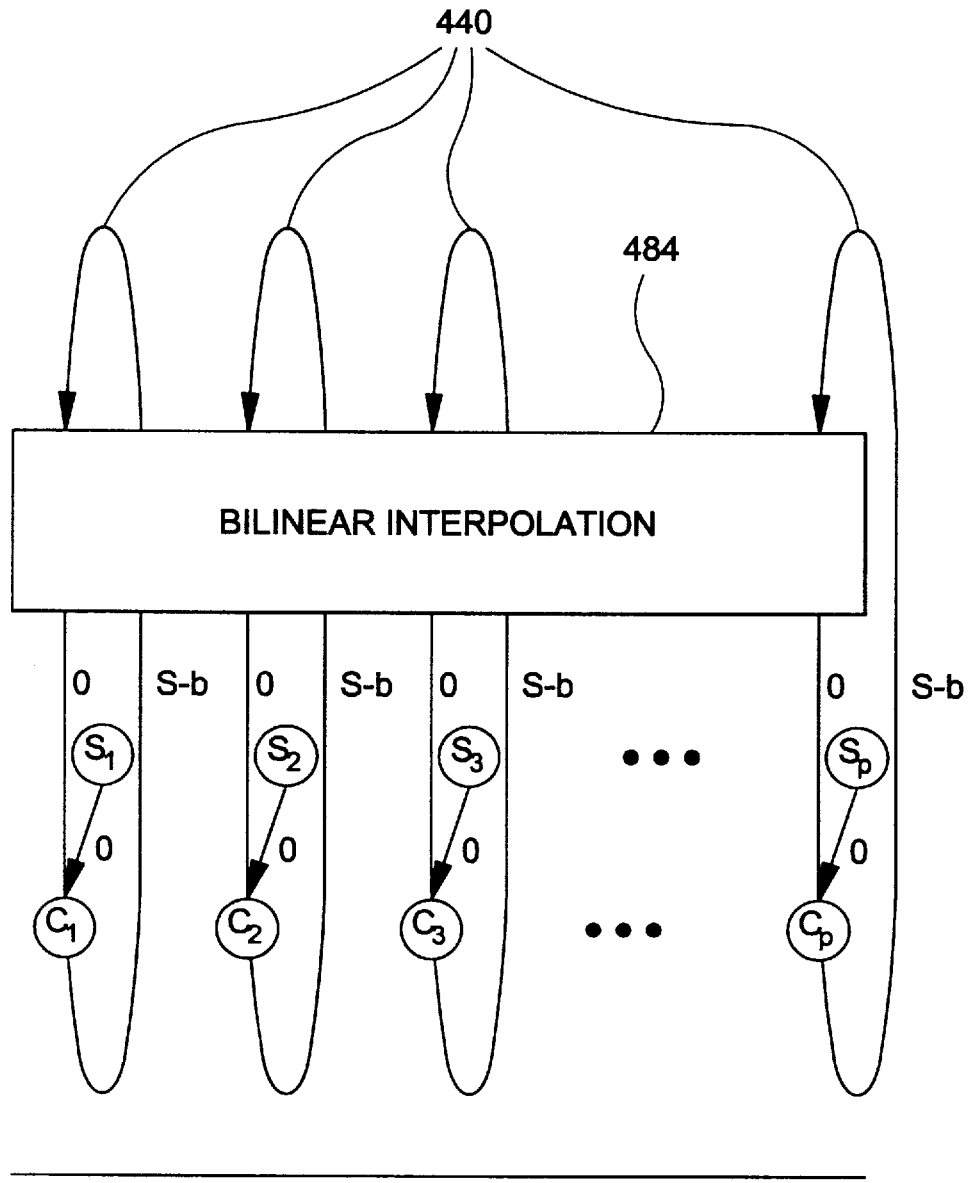
FIG. 34 shows a compositing method in accordance with the present invention employing a compositing buffer and bilinear interpolation.

Referring now to FIG. 34, the foregoing compositing equations are evaluated in the $C_k$ circles of that figure. The box 484 labeled bilinear interpolation is intended to include the interpolation units 472 for each pipeline 440. It is to be understood that other types of interpolation, besides bilinear interpolation, can be employed. Note that the circles containing $S_k$ indicate the new pixel from the shader and classification stages 466, 470. The circles containing $C_k$ indicate composition of new and accumulated pixels.

The preferred form of compositing buffer 474 is a FIFO with the capacity for a full slice of RGBA values. The compositing unit 464 preferably writes new values to the bottom of the slice FIFO compositing buffer 474, while the interpolation unit 472 preferably reads from the top. These relationships are depicted in FIG. 22. The storage capacity and pin requirements for two cases of FIFO compositing buffer 474 are set forth below:

| RGBA 48 bit | RGBA 32 bit |
| --- | --- |
| 1 slice buffer 384 KBytes | 1 slice buffer 256 KBytes |
| I/O pins = 384 | I/O pins = 256 |

The interpolation unit 472 of the present invention will now be discussed. It is preferred that the interpolation unit 472 be a bilinear interpolation unit. The aim of the bilinear interpolation unit is to determine the color at the intersection between the compositing buffer plane 432 and the sight ray through the already shaded voxel (refer to FIG. 19). It should be recalled that, inasmuch as the viewing angle is limited to ±45°, the sight ray increments dx and dy are bounded. The intersection can therefore only occur within a 3×3 region around the current voxel.

Figure 35:
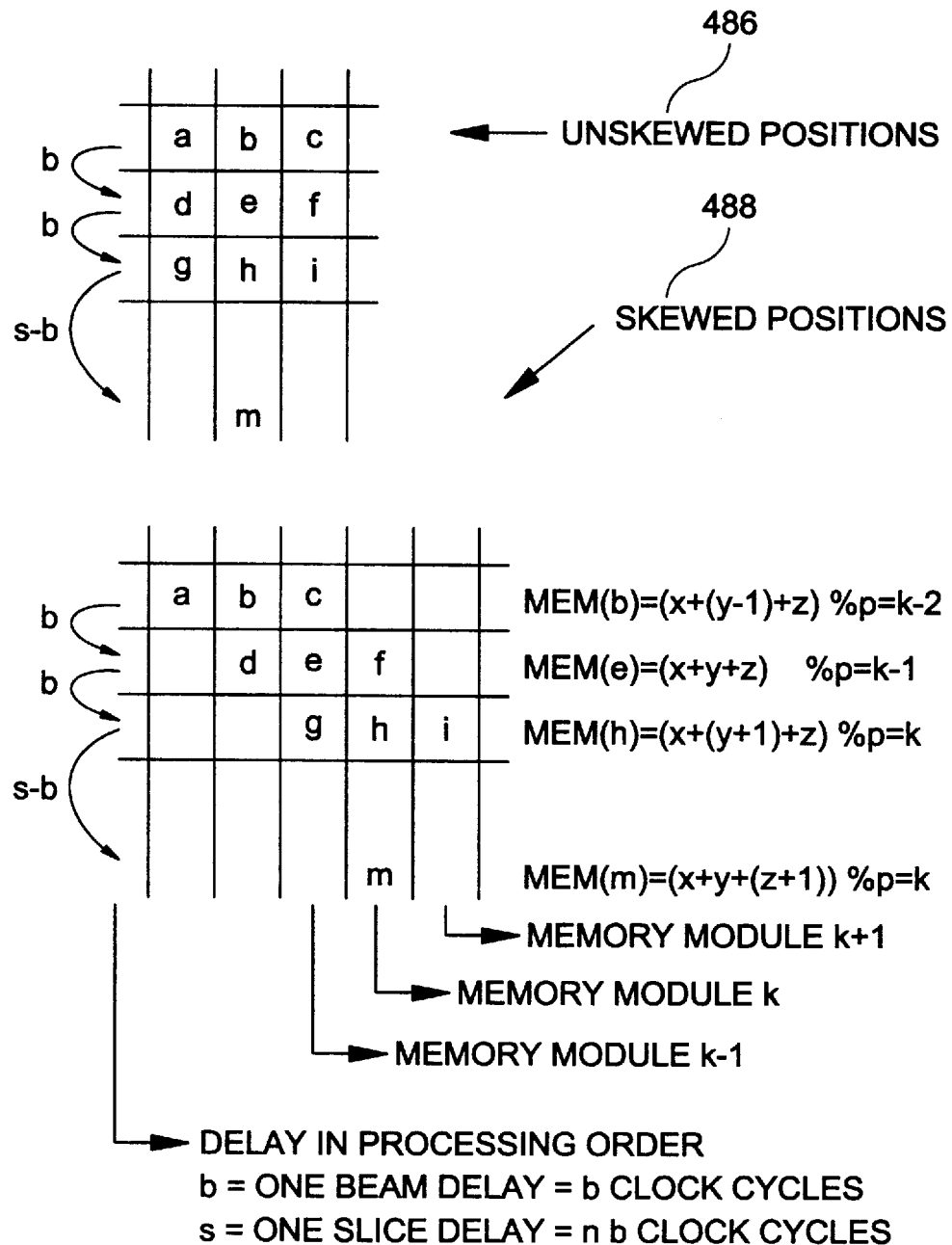
FIG. 35 depicts the skewed relative positions of a current voxel and voxels in a previous slice.
Figure 37:
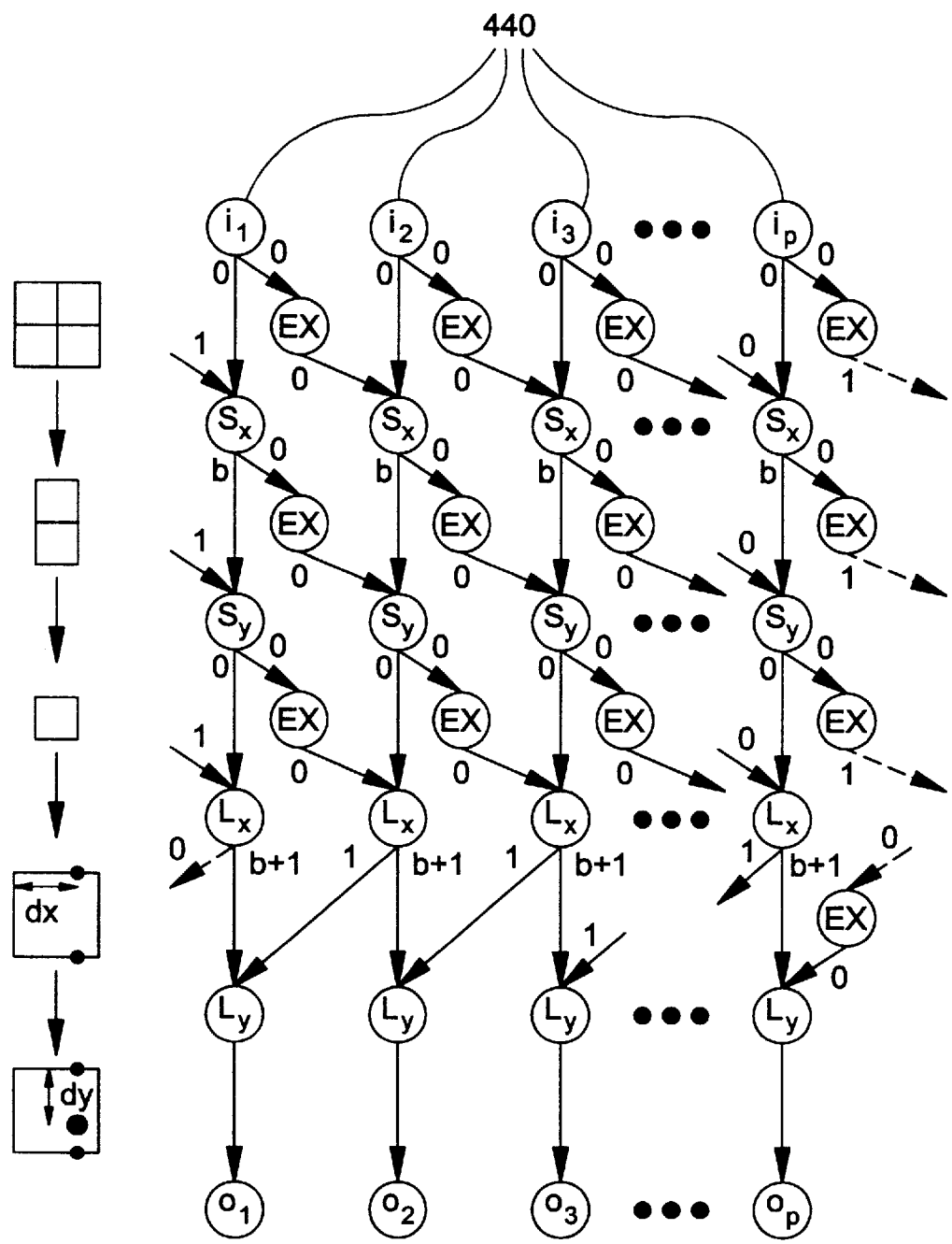
FIG. 37 depicts a signal flow graph for bilinear interpolation in accordance with the present invention.

Reference should now be had to FIG. 35, which depicts the skewed relative positions of the current voxel m and voxels a–i, from the previous slice, which may possibly influence voxel m. Thus, FIG. 35 shows the skewed relationship of the voxels within the aforementioned 3×3 region. In order to transfer the data from that region to that pipeline 440 in which the voxel m resides, a minimum of four pipeline stages are necessary; three which forward their data to their right neighbors and one which forwards its data to the left. This optimal configuration is depicted in FIG. 37, to be discussed below. Still with reference to FIG. 35, the unskewed positions of voxels a–i with respect to voxel m are shown at 486, while the skewed positions are depicted at 488. The terminology "%p" shown in the figures refers, as is known in the computer science art, to the modulo operation. That is, a %p means divide a by p and take the remainder; for example, 10% 8=2.

Figure 36:
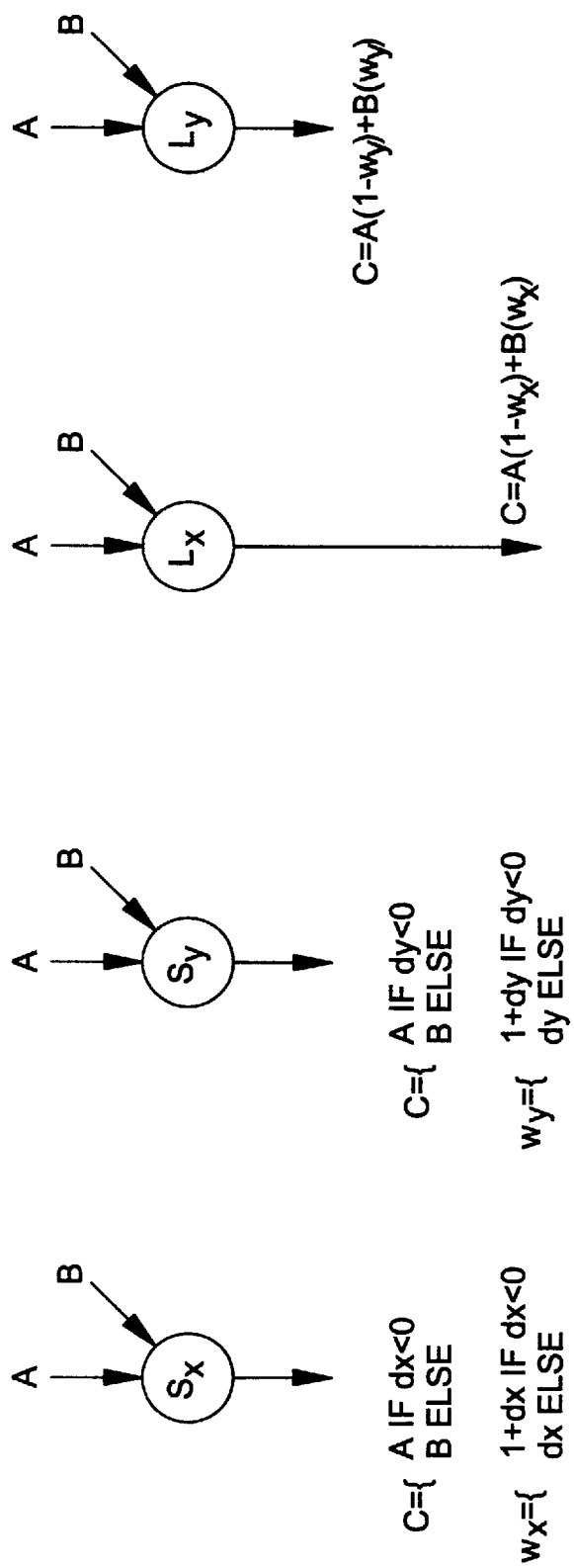
FIG. 36 depicts the functionality of the pipeline stages in bilinear interpolation for back-to-front compositing.

With continued reference to FIG. 35, and now considering also FIGS. 36 and 37, it will be appreciated that the possible region can be reduced from a 3×3 region to a 2×2 region merely by evaluation of the sign of dx and dy. In each case, refer to the first two stages depicted in FIGS. 36 and 37. The second two stages in those figures then compute the actual bilinear interpolation from those four compositing buffer pixels. FIGS. 19 and 36 present the appropriate equations for the dependency of the interpolation weights from the sight ray increments. Note that FIG. 36 depicts the functionality of the pipeline stages 440 of FIG. 37 assuming back-to-front compositing. For front-to-back compositing, dx and dy have the opposite sign, slightly changing the computations.

Figure 38:
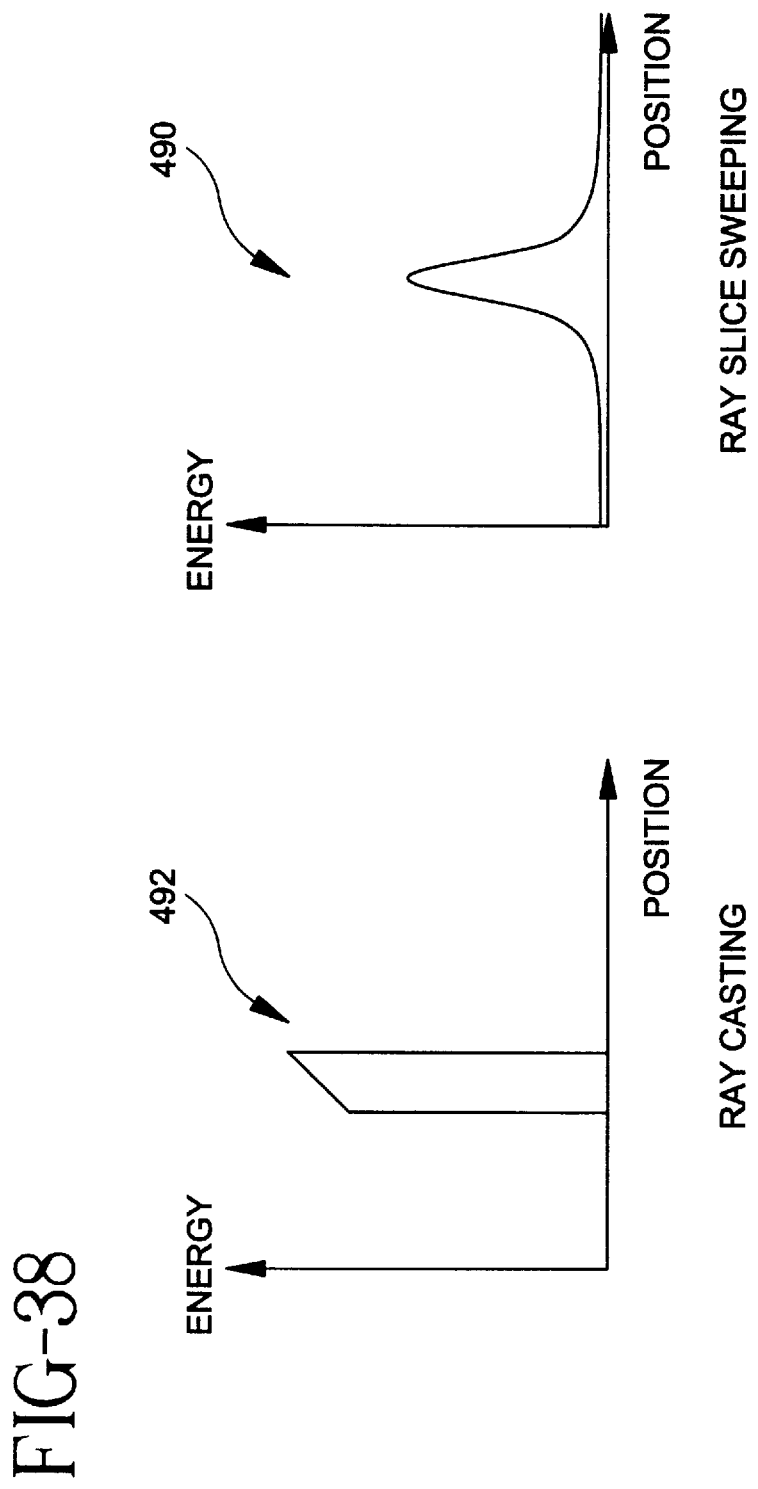
FIG. 38 compares the voxel energy distribution in the ray-slice-sweeping method of the present invention to that in traditional ray casting techniques.

Reference should now be had to FIG. 38, which depicts a comparison of the energy distribution in the ray-slice-sweeping method 490 of the present invention, contrasted to ray-casting techniques 492. In traditional ray-casting, each voxel can only contribute to a maximum of four rays. Accordingly, the voxel energy distribution on the image plane has very sharp edges. In the ray-slice-sweeping technique of the present invention, the energy of a voxel is concentrated along the ray direction, but with each slice it spreads to the neighboring voxels. This spreading is caused by the bilinear (or other) interpolation. Thus, on average, for bilinear interpolation, a quarter of each voxel contribution flows towards the nearest four voxels of the next slice. In the subsequent slice they spread over nine pixels, but also recombine in the center. As a result, the energy distribution function is a discrete approximation of the rapidly decaying function $f(x)=1/x^2$ rotated around the y-axis, as depicted in case 490 of FIG. 38. This shows great similarity to the filter kernels used in splatting techniques, and automatically provides anti-aliasing.

Figure 39:
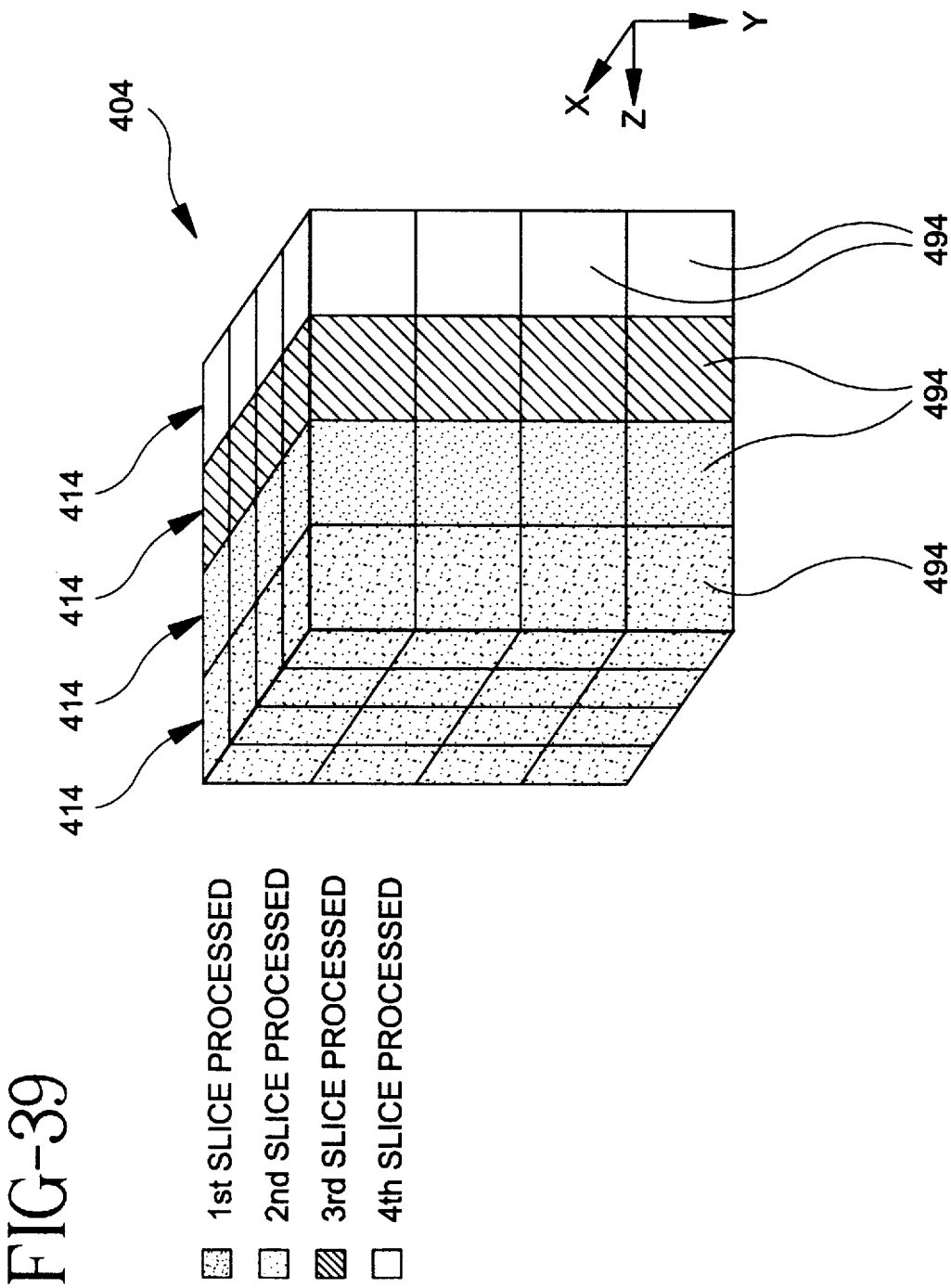
FIG. 39 depicts slice-order processing in the present invention.

Reference should now be had to FIG. 39, for further explanation of the slice-order accessing of the data contained within the three dimensional volume 404. In the apparatus and method of the present invention, for a given cube of data 404, all voxel elements 494 from a given slice 414 of voxels are processed before any voxel elements 494 from the next slice 414 are accessed. FIG. 39 depicts back-to-front processing of the data set 404. The dark-shaded slice 414 is the first slice processed, having Z=n. Following this, slices are processed in consecutive order, with the final processing happening on the unshaded slice 414, at Z=0. In front-to-back processing, the slices will be processed in reverse order.

Since an entire slice 414 is processed before moving on to the next slice of input data, a slice of partially composited rays is stored in each step of the method, and as the next slice of data 414 is processed, it is composited with the slice buffer. Thus, although the slice-order method of the present invention only requires each voxel 494 to be accessed once, it does require more buffer storage.

In one preferred slice-order compositing scheme of the present invention, the data is not sampled in a regular fashion precisely along rays from the eyepoint through an image pixel and then through the three dimensional data 404. Instead, the data is sampled exactly at the grid points on each slice 414, and then composited with the slice buffer using a direction ray that is shot from the eye, through the gridpoint where the data was sampled and onto the compositing buffer. Hardware architectures of the present invention, suitable for use in practicing the method of the present invention, can have separate pipelines/processors for each grid coordinate, so that the compositing information is buffered onto that chip-discrete grid coordinate.

Another preferred form of apparatus and method in accordance with the present invention, designated as slice-order ray-casting, will now be described. The slice-order ray-casting method is a hybrid which combines data sampling in a manner similar to the previously-described ray casting of the parent and grandparent applications, with the voxel access pattern of slice-order processing just described above. This is accomplished by casting a ray through the data, but storing the information at discrete grid positions. Since the processing is still in a slice-order fashion, the data is sampled in each slice at the point where the ray would intersect the current slice plane by using bilinear (or other) interpolation, instead of on the exact grid coordinates like other slice-order methods. Since all the points needed for the preferred bilinear interpolation are contained within the slice of voxels currently being processed, it is simpler than the trilinear interpolation performed in traditional ray-casting, while being more accurate than sampling on the exact grid coordinates. As the method moves through the dataset, the point where the ray intersects the current slice moves off the current grid position. This offset is stored and accumulated. Once the ray moves closer to another grid position, the compositing information is shifted in order to be stored in the other grid position. In other words, the compositing information of each ray is stored in the grid position closest to the ray intersection with the current slice, similar to three dimensional Bresenham line stepping.

Figure 40:
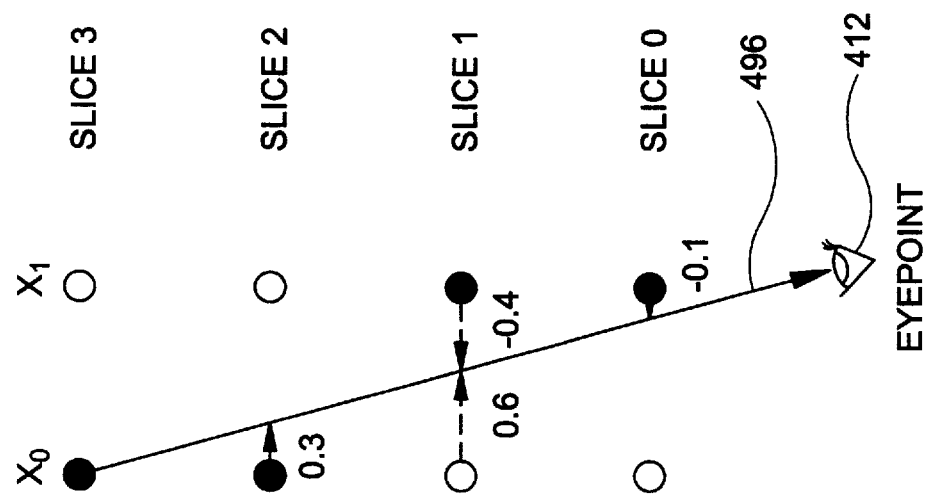
FIG. 40 depicts a new type of ray-casting in accordance with the present invention, known as slice-order ray-casting.

Reference should now be had to FIG. 40. FIG. 40 represents a constant y coordinate plane within the three dimensional volumetric data 404, for a case of z-access slice-order processing. In the case of back-to-front processing with parallel projections, the method begins by creating an initial compositing buffer for slice 3. The initial compositing buffer contains the shaded and classified points sampled on the grid coordinates and composited with the background. A ray 496 is shown from the voxel at location $X_0$ in slice 3 to the eyepoint (i.e., view point) 412. The black dots represent the gridpoint coordinate in which the data for the ray 496 is stored. It will be seen that for the first two steps, corresponding to slices 2 and 3, the data is stored at the $X_0$ grid coordinate. After two steps of the method however, the data for the ray 496 is shifted to the grid coordinate $X_1$, as indicated by the black dot now contained at $X_1$ in slice 1. When the data shifts to the new storage position, its offset is adjusted by the unit distance; in this case, the data was offset 0.6 units at the time when it was shifted, with 0.6−1 being equal to −0.4.

For parallel projection, there is a regular data movement pattern among the rays. At the slice where a ray attempts to shift to the next grid position, all the rays in the entire slice buffer shift together. For perspective projections, however, there are locations where one ray attempts to be stored at a particular grid coordinate and the ray which was already occupying that grid coordinate has not yet accumulated enough offset to move out yet. In order to deal with this type of situation, a ray-merging or ray-splitting approach can be employed.

In perspective volumetric ray-casting, rays which are one unit apart at the front of the volume exit the rear of the volume more than one unit apart. Unchecked, neighboring rays may leave gaps in the sampling of the volume, so that some form of supersampling is necessary. Ray-splitting is the idea of adaptive supersampling in order to maintain a uniform ray density. In front-to-back compositing, the ray is split into two child rays when neighboring rays diverge beyond some threshold. The reference "An Efficient Method for Volume Rendering Using Perspective Projection" by K. L. Novins, F. X. Sillion and D. P. Greenberg, of the Program of Computer Graphics at Cornell University in Ithaca, N.Y. 14850, published in *Computer Graphics*, SIGGRAPH'90 pages 95–100 sets forth a method intended for use with software volume rendering systems in order to handle problems with main-memory storage. The ideas set forth therein can be adapted to deal with the merging problem in the present invention. One problem with splitting rays is that it becomes difficult to prevent split rays from colliding with themselves in the future. In order to prevent this, a local method is not sufficient, but a global method is too complex for real-time interaction.

Ray-merging is similar to ray-splitting, except that it runs in the front-to-back order. When two or more rays suddenly attempt to utilize a single grid coordinate storage location, the two parent rays are averaged, spawning a new child ray. The new ray with averaged intensity, opacity and offset is shot from the current grid location directly toward the eye. A further problem encountered with perspective projections is that sometimes a ray shifts into a neighboring grid coordinate, and there is no other ray shifting into its original grid coordinate. When this happens, a new orphan ray is generated with zero offset such that it starts at the grid coordinate and shoots toward the eyepoint (i.e., view point).

Figure 41:
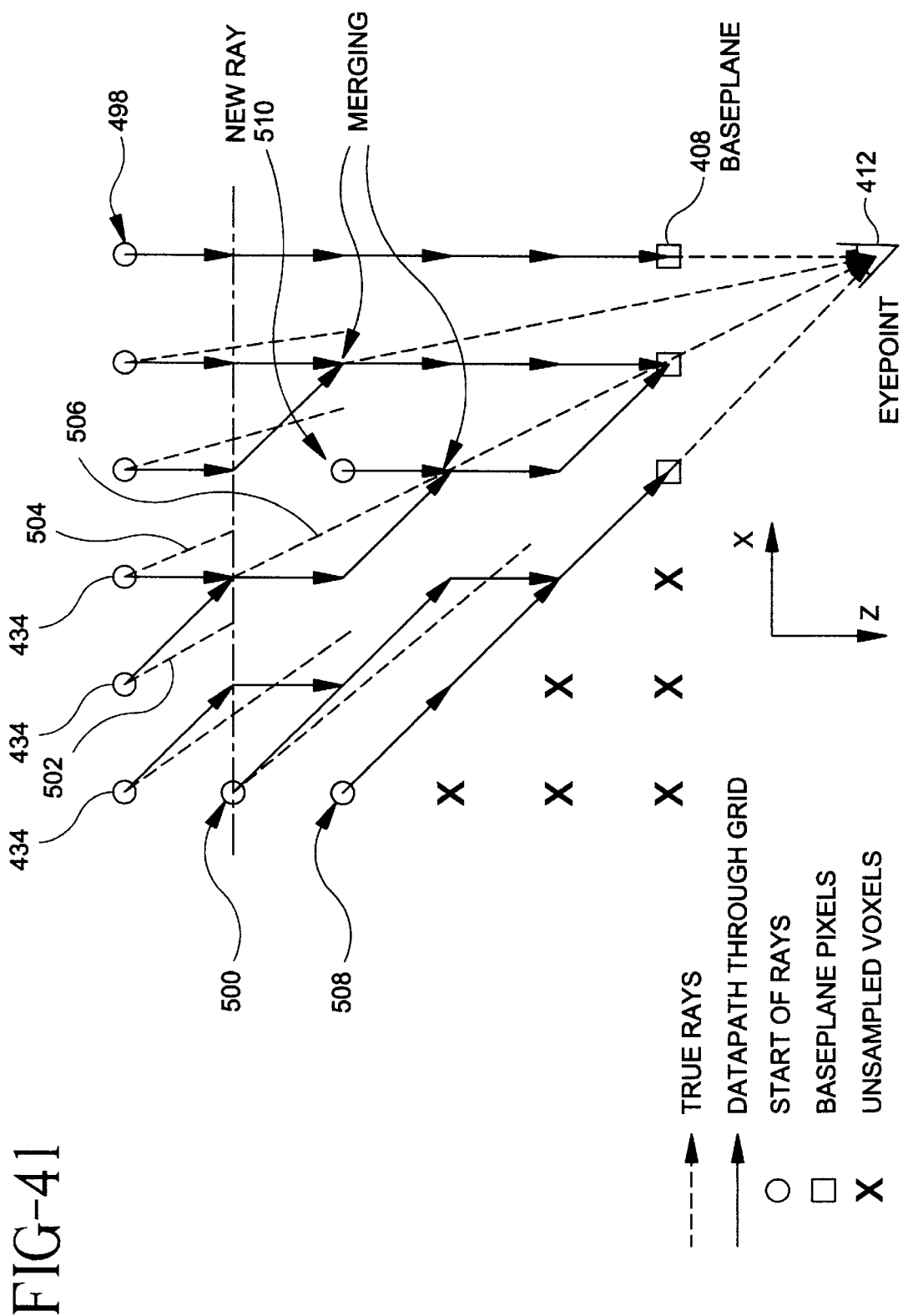
FIG. 41 depicts a two dimensional example of perspective ray-merging in accordance with the present invention.

Reference should now be had to FIG. 41. As depicted therein, a large number of rays can merge in a perspective, merging-ray tree. In FIG. 41, the processing order is from the top of the diagram to the bottom, getting closer to the eyepoint (i.e., view point) 312 with each step. The rear slice 498, which is located at the top of the figure, is initialized by generating a plurality of new rays (true rays designated by dotted lines), with zero offset, at each grid position 434 (indicated by open circles). As the processing moves to the next slice 500, there are two rays 502, 504 which attempt to share the same column and they must be merged into a new ray 506.

When the third slice 508 is processed, there are two two-way merges, and a new ray is spawned at the gridpoint location designated by the open circle at 510. The new ray at 510 is necessary because the data path directly above it shifted to the right, while the upper left data path did not correspondingly shift. Note that the solid black lines represent the data path through the grid; it will be noted that they extend only between gridpoint locations. If a new ray were not started at 510, the illumination at the voxel position would not be represented in the final image, which would result in a visual gap in the rendered object.

In the next (fourth) slice 512, the ray newly spawned at 510 merges with its left neighbor. At this point, the left subtree represents the contribution of four voxels and the right subtree, one. If we simply took the average intensity of the two ray subtrees, one voxel contribution is over represented and the other four are under-represented in the merged ray. To avoid such complications, it is preferred to initialize the intensity of the newly spawned ray with average intensities of an appropriate neighborhood of rays. For example, one can follow a ray from the view point 412 through the new ray point and to the intersection with the compositing buffer. A bilinear interpolation can then be performed on the 4 pixels surrounding the intersection, weighted based on distance from the intersection point. Note that in FIG. 41, the open squares represent pixels of the base plane 408, while the x's represent voxels which are processed but do not contribute to the final image as they lie beyond 45 degrees. The "x" voxels can contribute in a second rendering path with a different base plane, as in the parent Ser. No. 08/388,066 application.

It should be appreciated that there are times when more than one ray may converge onto a single column at the same time. For example, consider a symmetrical two dimensional case where the eye is directly lined up with one of the columns. When the ray to the left eventually merges into the center column, the ray to the right also is merged in by symmetry. While this case is infrequent, it must be supported. While, in the two dimensional case, a maximum of three rays can be merged at once, it should be understood that in a three dimensional case, a maximum of nine rays may be merged into a single ray.

Figure 1:
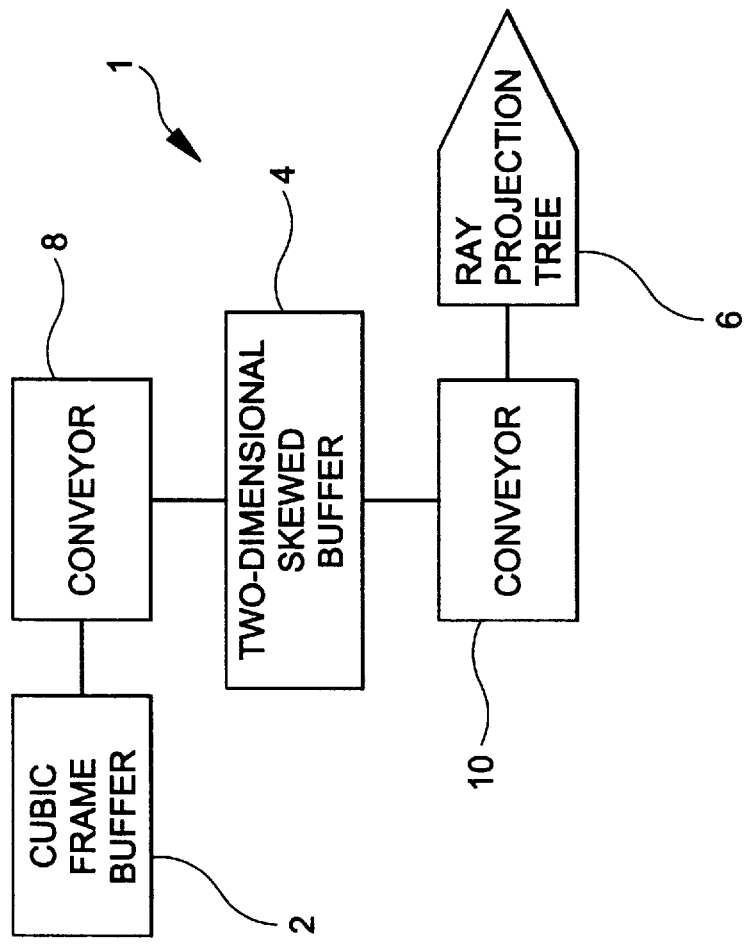
FIG. 1 is a block diagram of a traditional volume visualization system.
Figure 2:
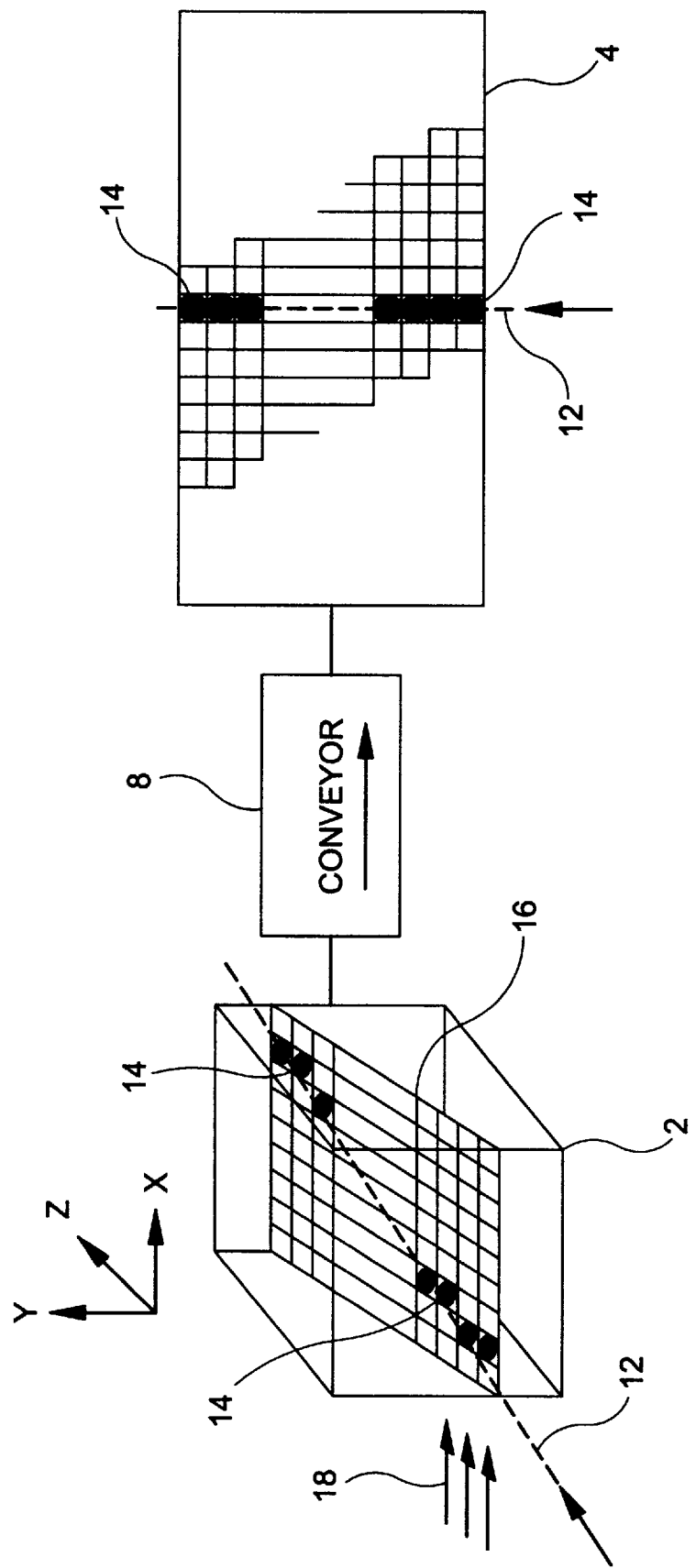
FIG. 2 is a representation showing the inter-relationship of a cubic frame buffer, viewing rays, orthogonal beams, projection ray planes and the two-dimensional skewed buffers of the traditional volume visualization system.

A simulation has been developed to evaluate ray merging decisions for arbitrary eyepoints (i.e., view points). Using the simulation, various statistical properties of the method of the present invention were evaluated on a 256 voxel square two dimensional grid. It was noted that 10.1% of newly spawned rays were encountered; 13.3% two-way merging steps were encountered; and $6.4 \times 10^{-7}\%$ of three-way merging steps were encountered. An average of 8.1 slices were traversed between merges. The percentages are based on the total number of voxel positions in the 3-D grid. It should be noted that the ray-merging method depicted in FIG. 41 also performs some number of bilinear (or other order) interpolations, but significantly less often than every step. Thus, the ray-merging method depicted in FIG. 1 benefits from some inherent anti-aliasing On average, one merging step is performed every 8.1 slices. This has the benefit of leading to an anti-aliased image.

Figure 42:
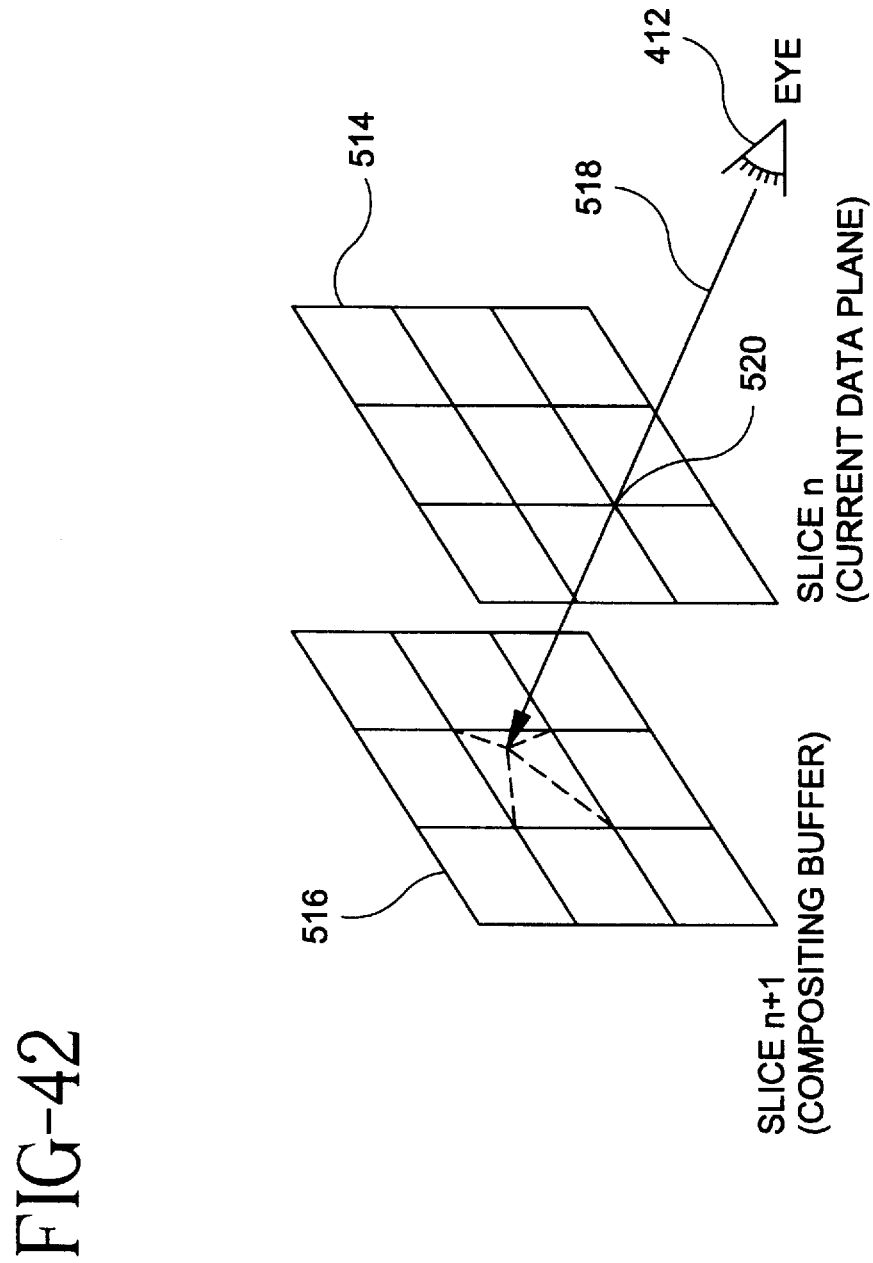
FIG. 42 depicts the unit distance energy distribution in a slice-order energy-splatting method in accordance with the present invention.

In the just-described slice-order ray-casting method, since the data is still interpolated (preferably bilinearly), there is some buffering of data points required before they can be processed. An energy splatting approach does not require that the voxel data be resampled along the ray at each slice. Instead, the data points on the grid coordinates are utilized, where they are already sampled and stored. The RGB and α energy for the datapoint is then spread out onto the compositing buffer to the four grid coordinate points surrounding where the intersection point of a ray from the eye through the datapoint intersects the compositing buffer, by a sort of reverse bilinear (or other order) interpolation. Reference should now be had to FIG. 42. The eye (i.e., view point) is designated at 412. Slice n is designated as 514 and is the plane containing the current data. Slice 516 contains the values associated with the compositing buffer. Ray 518 is shot from view point 512 through gridpoint locations 520 in the current data plane slice n. It intersects the compositing buffer at the location marked with cross-hairs; and it is clear that the RGB and α energy for datapoint 520 is spread out to the four adjacent grid coordinate points in the compositing buffer which are designated by the dotted lines from the crosshair. The slice-order energy-splatting approach saves on voxel buffering and also produces more accurate gradient measurements.

After the new datapoints are composited into the compositing buffer (slice 516), the compositing buffer is slid forward to get ready for the processing of the next slice forward in the data. When the compositing buffer is slid forward, a ray is shot toward the eyepoint. Offsets of where the data is stored at each grid coordinate position are again accumulated and stored. Like the previously-described ray-casting approach, the compositing buffer data slides along rays and stores itself in the closest grid coordinate to the current position of the ray. Merging and new rays are handled in the same way as in ray-casting.

A full three dimensional simulation of the method was developed and implemented on a Silicon Graphics work station. The method performs volumetric ray-casting and is suitable for both software and hardware utilizing a fixed number of rays in a slice-by-slice processing order. A constant number of rays per slice produces perfect load balancing when mapping the rays to a constant number of processors like many currently proposed parallel architectures. This method minimizes storage requirements because the preferred bilinear interpolation requires less buffering than trilinear interpolation. Further, bandwidth requirements are reduced because each voxel is read only once. The method is independent of the classification and illumination model, and the resulting image is a base plane image of size $n^2$, which is then projected onto the image plane by a two dimensional warp.

Figure 43:
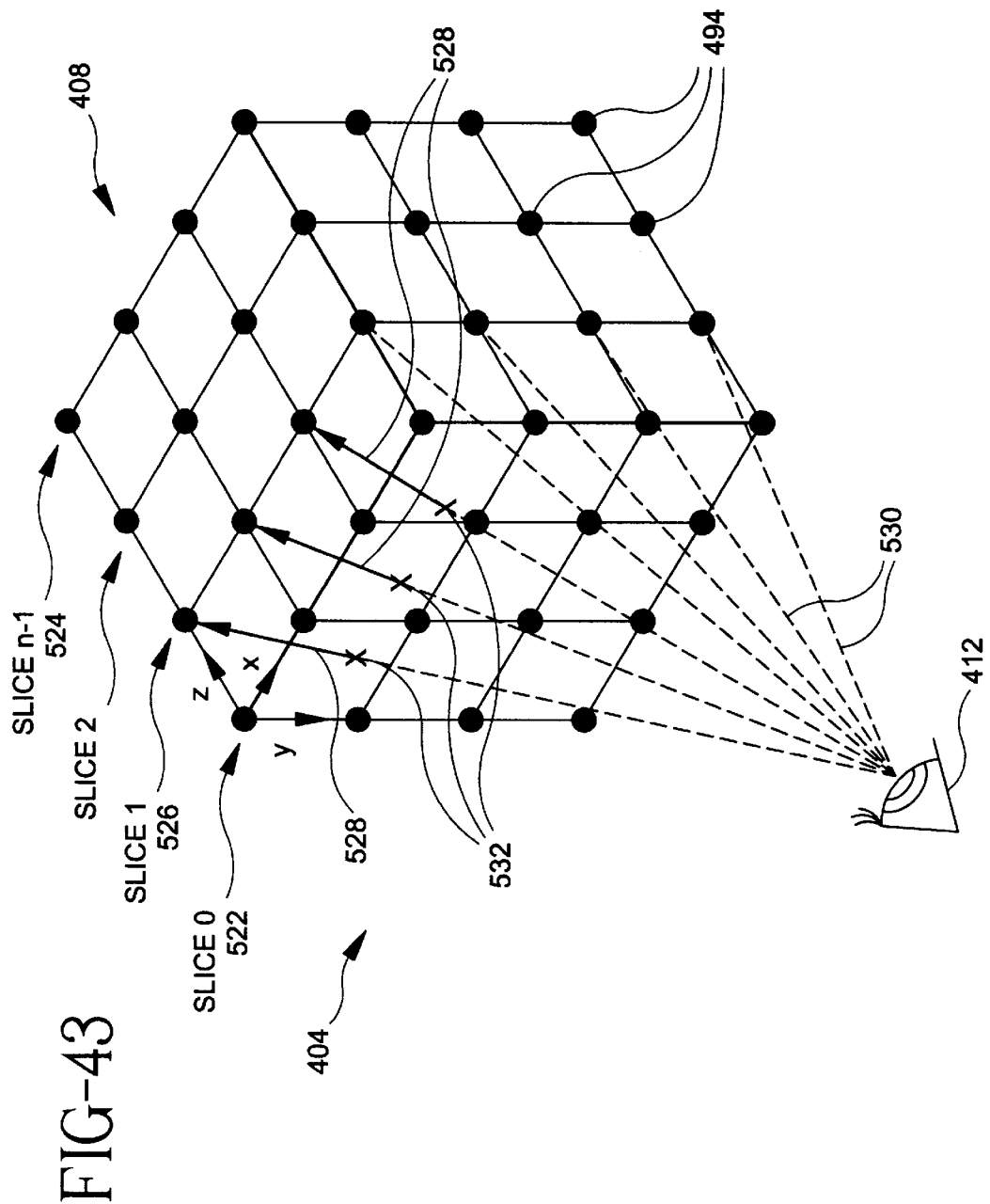
FIG. 43 depicts the ray-slice-sweeping method of the present invention applied to a three dimensional volume of voxel elements.

The method and apparatus of the present invention, previously described above, will now be summarized with reference to FIG. 43 and the previously-discussed figures. The ray-slice-sweeping method of the present invention generates a three-dimensional volume projection image having a plurality of pixels. The image is generated from a view point 412, and utilizes discrete voxels 494, arranged in a three dimensional volume 404 which can be stored in the previously-discussed cubic frame buffer 450. Each of the voxels 494 has a location and at least one voxel value associated with it. The first step of the method includes selecting viewing and processing parameters which define the viewpoint 412, at least one base plane 408 of the three dimensional buffer containing the volume 404, with the base plane 408 being employed for projection purposes; and first and last processing slices 522, 524 of the three dimensional buffer 450. As depicted in FIG. 43, first slice 522 would normally be considered as slice zero, while last processing slice 524 would normally be considered as slice n−1. For the case shown in FIG. 43, n is equal to 4.

A further step of the method includes initializing a compositing buffer, such as compositing buffer 474 discussed above, which has a plurality of pixels, each of which has at least color, transparency and position associated with it. A further method step includes sampling voxel values from three dimensional buffer 450 onto a current slice of sample points parallel to the first processing slice in order to provide sample point values. With reference to FIG. 43, slice 1 (reference character 526) is the current slice, parallel to the first processing slice 522, onto which the voxel values are sampled from the three dimensional buffer 450. FIG. 43 depicts a case where slice 1, reference character 526, is the current processing slice. It is to be understood that during the first execution of the sampling step, the first processing slice (slice 0, reference character 522) would be the current slice. In this case, initializing could include, for example, combining with the background.

A further step in the present method includes combining the sample point values from the sampling step with pixels of the compositing buffer along a plurality of interslice ray segments 528. Interslice ray segments 528 extend only between the current slice 526 and an adjacent slice, here, 522, which is associated with the compositing buffer. As noted, slice 0 (reference character 522), the first processing slice, would have been initialized into the compositing buffer, preferably by combination with the background.

The sampling and combining steps are repeated by sequentially sweeping through subsequent slices of sample points parallel to the first processing slice 522 until the last processing slice 524 is reached. During the sequential sweeping, each subsequent slice in turn becomes the current slice. It should be appreciated that each voxel 494 in the current slice (here slice 526) would normally have an associated interslice ray segment 528 which would extend to the compositing buffer slice (here slice 0, reference character 522). Only three interslice ray segments 528 have been shown, for clarity.

In a first preferred method in accordance with the present invention, the sampling step includes sampling voxel values from the three dimensional buffer 450 (which contains the volumetric data set 404) directly onto grid points of the current slice of sample points 526, with the sample points (location of voxels 494 in slice 1) coinciding with the grid points. This condition is depicted in FIG. 43. Further, the combining step preferably includes the substep of casting a plurality of sight rays 528 from the view point 412 through the grid points in the current slice of sample points 526. The intersice ray segments 528 then extend along the sight rays 530 from the sample points of the current slice 526 to the adjacent slice 522 associated with the compositing buffer. The interslice ray segments 528 intersect the adjacent slice 522 at a plurality of intersection points 532, designated by crosses. Only three intersection points 532 are shown in FIG. 43, for clarity. Furthermore, in the first preferred method, the step of repeating the sampling and combining steps includes re-casting the sight rays 530 as each of the subsequent slices becomes the current slice.

The first preferred form of the method includes the additional step of performing at least one of zero order interpolation, first order interpolation, second order interpolation, third order interpolation, higher order interpolation and adaptive combinations thereof Bilinear interpolation as discussed above, is preferred. The interpolation is performed among pixels of the compositing buffer (slice 522) adjacent the intersection points 532, in order to provide interpolated pixel values for combination with the sample points of the current slice 526. For bilinear interpolation, the four voxels (pixels in the compositing buffer) which define the vertices of the square which encloses the intersection point 532 are utilized. For order 2 interpolation, the nine closest points, centered about the nearest neighbor are utilized. For order 3 interpolation, inner and outer squares are utilized. It will be apparent to those skilled in the art how to adapt other types of interpolation to the present method.

As discussed above, when the view point 412 is in front of the three dimensional buffer 450 containing the volumetric data 404, the first processing slice 522 is normally in front of the buffer and the last processing slice 524 is normally in back of the buffer, such that front-to-back sweeping is performed. In this case, front-to-back compositing is also preferably performed, as previously discussed and shown in FIG. 19. The preferred method can also be performed with the viewpoint 412 in front, as shown in FIG. 43, but utilizing slice 524 as the first processing slice and slice 522 as the last processing slice, such that back-to-front sweeping is instead performed (depicted in FIG. 39). In this case, the combining is performed from back-to-front with respect to the view point 412, utilizing the back-to-front compositing techniques depicted in FIG. 19. It is to be understood that other types of combining techniques rather than compositing can be employed, however, compositing is preferred.

Yet further, in the first preferred method, when the view point 412 is in back as depicted in FIG. 18, front-to-back sweeping and back-to-front compositing can be performed. In this case, the first processing slice would be slice 522 and the last processing slice would be slice 524. Back-to-front compositing as depicted in FIG. 19 would be employed. It is to be understood that the back and front with respect to sweeping are defined in dataset coordinates, while back and front with respect to compositing is relative to the eye (view point 412). In a final case for the first preferred method, the view point 412 may be behind the data set, with the first processing slice in the back of the 3-D buffer (slice 524) and the last processing slice in the front of the three dimensional buffer (slice 522). In this case, the combining would be performed from front-to-back with respect to the view point 412, using the front-to-back compositing techniques of FIG. 19, for example. For brevity, the sweeping and compositing order options presented in this and the preceding paragraph are referred to hereinafter as "sweeping/compositing order options."

Figure 44:
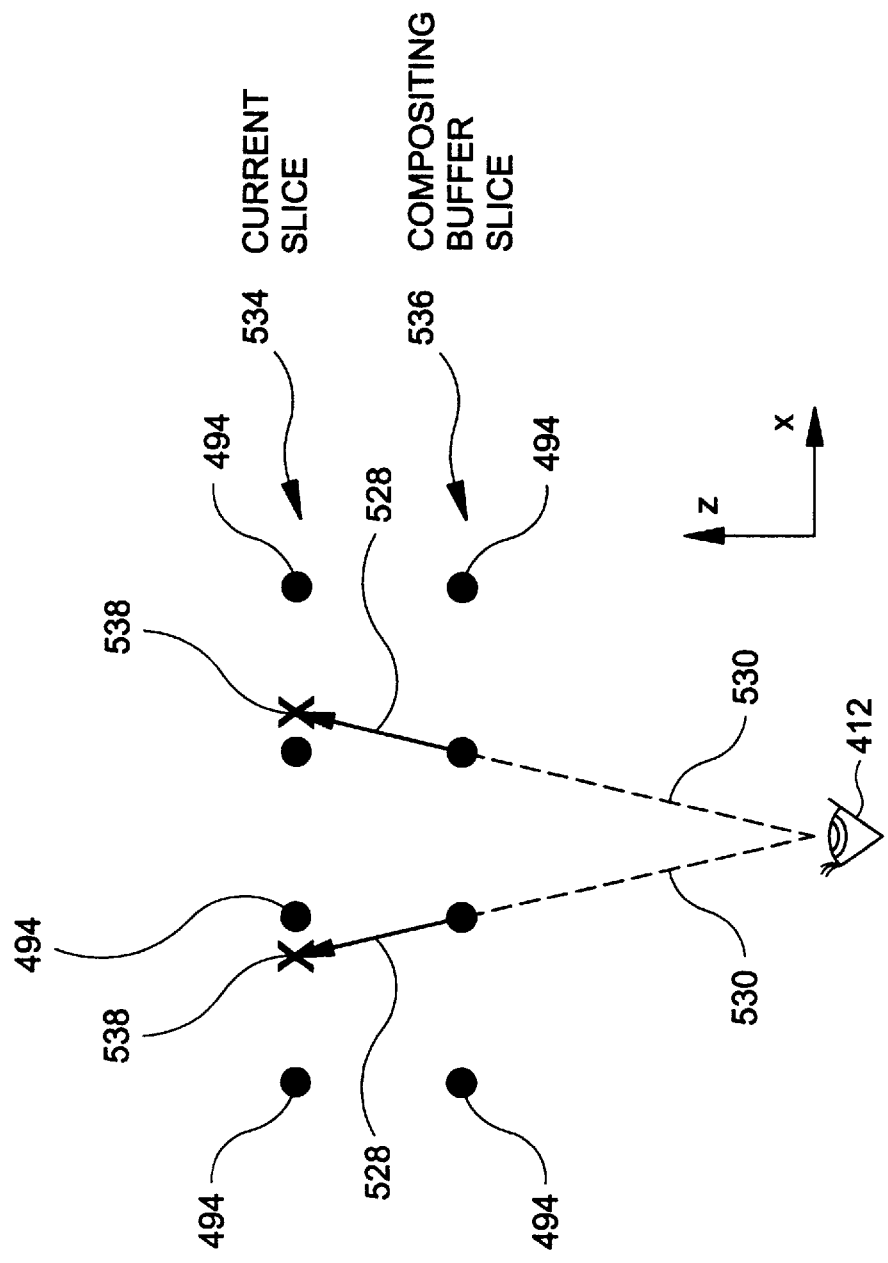
FIG. 44 depicts a form of the present invention wherein interpolation is performed on the current slice.

Reference should now be had to FIG. 44, for purposes of describing a second preferred form of the present method. In the second preferred form, the combining step includes the sub-step of casting a plurality of sight rays 530 from the view point 412 through locations in the adjacent slice 536 associated with the compositing buffer. The locations correspond to grid point locations of pixels within the compositing buffer (voxels 494 within the associated slice). The sight rays 530 intersect the current slice 534 at a plurality of intersection points 538 designated by crosses. The sampling step includes sampling the voxel values from the three dimensional buffer 450 containing the three dimensional volumetric image 404 onto the plurality of intersection points 538 by performing at least one of zero order interpolation, first order interpolation, second order interpolation, third order interpolation, higher order interpolation and adaptive combinations thereof The interpolation is performed among voxel values associated with voxel locations adjacent the plurality of intersection points 538. Bilinear interpolation, as discussed above, is preferred. Furthermore, in the second preferred method, the step of repeating the sampling and combining steps includes re-casting the sight rays 530 as each of the subsequent slices becomes the current slice. The sweeping/compositing order options are the same in the second preferred method as they are in the first preferred method, discussed above.

In a third preferred form of the method of the present invention, the sampling step (see FIG. 43) includes sampling voxel values of voxel elements 494 from the three dimensional buffer 450 directly onto grid point locations of the current slice 526 of sample points (referring to FIG. 43), with the sample points coinciding with the grid points. Further, the first execution of the combining step includes the sub-step of casting a plurality of sight rays 530 from the view point 412 through the grid points of the current slice 526 of sample points, with the interslice ray segments 528 extending from the sample points of the current slice 526 to intersections 532 of the sight rays 530 with the compositing buffer.

The third preferred form of the method of the present invention also includes performing one of zero order, first order, second order, third order or higher order interpolation and adaptive combinations thereof The interpolation is performed among pixels (corresponding to the voxel elements) of the compositing buffer (slice 522) in order to provide interpolated pixel values for combination with the sample points of the current slice 526. The results of the interpolation and the combination are stored, with an accumulated offset, in grid point locations of those of the pixels in the compositing buffer which are closest to the intersections 532 of the sight rays 530 with the compositing buffer (slice 522).

The third preferred method also includes performing either merging of two or more of the interslice ray segments 528 or splitting of at least one of the interslice ray segments 528. Merging of two or more of the interslice ray segments 528 is performed when an attempt is made to store two or more of the results of the interpolation and the combination at an identical grid point location. Merging has been discussed extensively above and has been depicted in FIG. 41. Splitting is performed when adjacent interslice ray segments 528 diverge beyond a given divergence threshold. The divergence threshold is selected as follows. The divergence can initially be started at zero and when it exceeds a divergence threshold of one, splitting can be performed. This corresponds to an empty cell between any two rays. Alternatively, rays can be started with a distance of one between them, and splitting can be performed when a divergence threshold of two is exceeded. Splitting has been discussed above and will be discussed in further detail below.

The third preferred method also includes the step of maintaining the sight rays 530 formed during the first execution of the combining step throughout the sequential sweeping through the subsequent slices. Reference should be had to FIG. 40. In other words, the sight rays are not re-cast when every new slice is traversed. New sight rays are cast, however, when either merging or splitting is performed. A new sight ray is generated from the view point 412 to a preselected location in the neighborhood of the identical grid point location when merging is performed, as depicted in FIG. 41. The preselected location will, as noted, be in a neighborhood of the identical grid point where the attempt is made to store two or more of the results of the interpolation and the combination. The new sight ray could be cast to the identical grid point location, but can start with an initial offset of plus or minus one-half voxel to the right or left, depending on the accumulated offsets of the two merging rays. Alternatively, when splitting is performed, two new sight rays are generated from the view point to corresponding preselected locations in the current slice, as discussed below. The preselected locations for generating the two new sight rays may be selected as follows. If the single ray to be split hits exactly between two grid points, the new rays can be started at the adjacent grid point locations. If the single ray hits closer to the left most grid location, one starting point can be shifted to the left with the old ray maintained in the middle with an initial offset. Similarly, if the single ray hits closer to the right, the start point could be shifted to the right, with the old ray in the middle with an initial offset.

Finally, the third preferred method includes storing the results of the interpolation and the combination in an adjacent grid point location when the accumulated offset exceeds a predetermined value, for example, more than half way to the adjacent grid point, as depicted in FIG. 40. The storing is done together with a new accumulated offset value. For example, with continued reference to FIG. 40, results are initially stored, at slice 2 in the left most voxel indicated by the dark circle, with an accumulated offset of 0.3. Once slice I is reached, the accumulated offset is 0.6 such that the adjacent grid point, indicated by the black circle, is the appropriate place to store the results. Since a displacement of 1 to the right has occurred, 1 is subtracted from 0.6, yielding a −0.4 offset, which is the new accumulated offset value.

In the third preferred method, merging is preferably performed when the combining step is performed from back to front with respect to view point 412. This case is illustrated in FIG. 41. Most preferably, bilinear interpolation is used in the interpolation step. Also in the third preferred method, splitting of interslice ray segments 528 is preferably performed when the combining step is performed from front to back with respect to the view point 412. Reference should now be had to FIG. 47, which depicts a form of the third preferred method using splitting with front-to-back compositing and front-to-back processing (i.e. sweeping). As each slice becomes the current slice, sight rays 530 are cast from the view point 412 through grid points (valid voxels indicated by open circles) in the current slice of sample points when a split occurs. Ray splits are indicated by the dotted horizontal lines with arrow heads at either end (items 550). Once again, the "x" marks denote voxels beyond 45°

Figure 45:
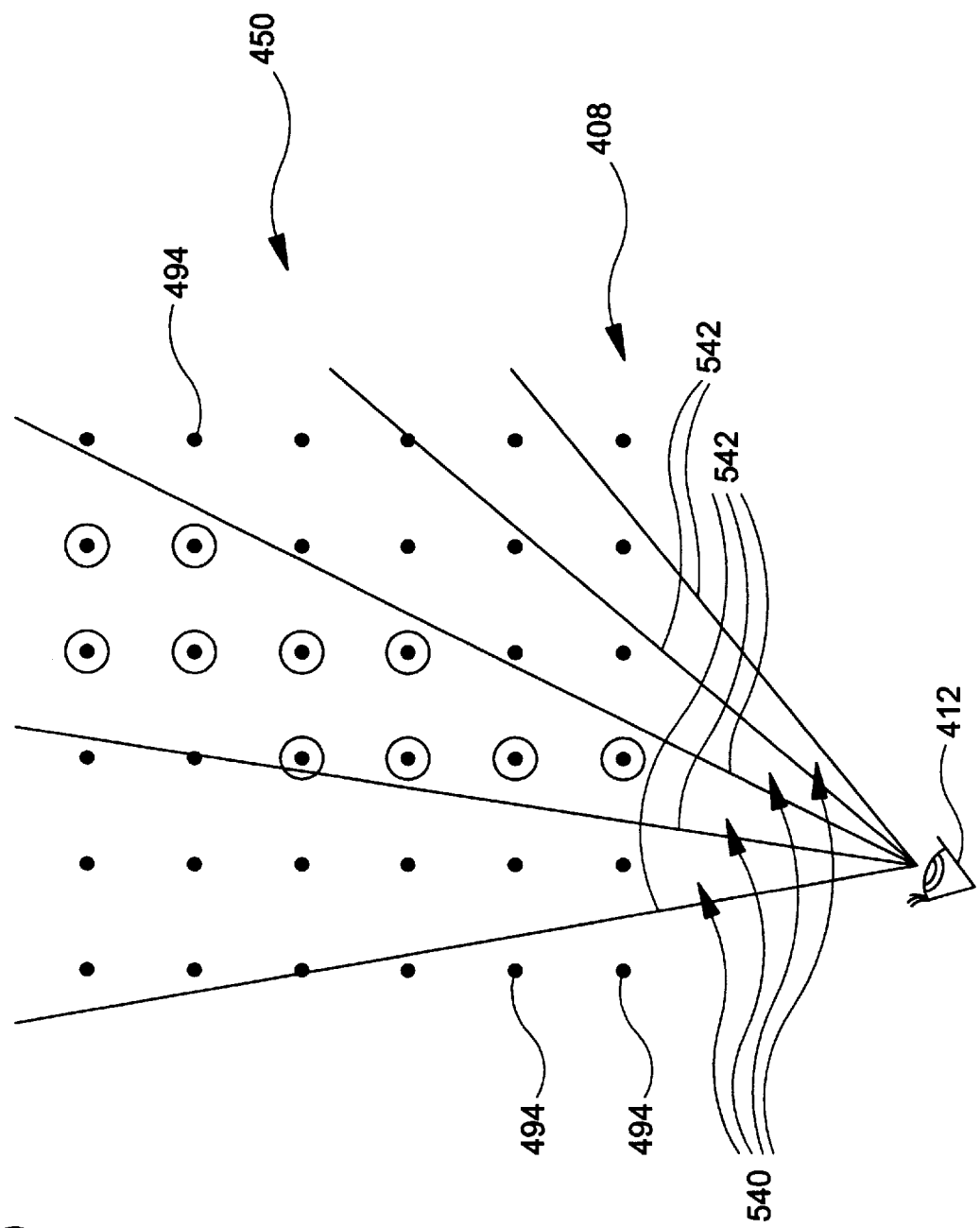
FIG. 45 depicts a form of the present invention wherein the voxel volume is divided into a plurality of zones.

In an especially preferred form of the third preferred method, an additional step is included which comprises dividing the three dimensional buffer 450 into a plurality of zones 540 which are separated by zone boundaries 542. In the third preferred form of the method, when the step of dividing the three dimensional buffer 450 into the plurality of zones 540 is employed, merging and splitting are confined to zones 540, and preferably do not occur across zone boundaries 542. The zones 540 and zone boundaries 542 are selected for enhancing image sharpness and accuracy. One preferred method of determining the zone boundaries 542 is to form generalized three dimensional pyramids which extend from the view point 412 through the boundaries of pixels (two dimensional consideration of voxels 494) associated with the base plane 408 into the three dimensional buffer 450. It will be appreciated that the zones 540 in FIG. 45 are generalized three dimensional pyramids although FIG. 45 is a two dimensional view for simplicity. It is also preferred to perform a step of labeling those voxels 494 which belong to a given one of the zones 540. For example, the encircled voxel elements 494 in FIG. 45 could all be given the label "γ" to signify that they belong to the given one of the zones 542 which is designated as zone gamma.

In a fourth preferred form of the method in accordance with the present invention, the first execution of the combining step includes the sub-step of casting a plurality of sight rays 530 from the view point 412 through locations in the adjacent slice 536 associated with the compositing buffer (refer to FIG. 44). The locations correspond to grid point locations of the pixels (two dimensional manifestations of voxel elements 494) within the compositing buffer. The sight rays 530 intersect the current slice 534 at a plurality of intersection points 538. The interslice ray segments 528 extend from the grid point locations of the pixels within the compositing buffer to the intersection points 538.

Further, in the fourth preferred form of the method, a sampling step includes sampling voxel values from the three dimensional buffer 450 onto the plurality of intersection points 538 by performing one of zero order interpolation, first order interpolation, second order interpolation, third order interpolation, higher order interpolation and adaptive combinations thereof. The interpolation is performed among voxel values associated with voxel locations 494 adjacent the plurality of intersection points 538. Bilinear interpolation is preferred. The method further includes the additional step (refer to FIG. 40) of storing the results of the interpolation and combination, together with an accumulated offset, in grid point locations of the pixels within the compositing buffer. The fourth preferred form of the method further includes performing one of merging of two or more of the interstice ray segments, as shown in FIG. 41 and discussed above, or splitting at least one of the interslice ray segments 528. As discussed above, merging is performed when an attempt is made to store two or more of the results of the interpolation and combination in an identical grid point location, while splitting is performed when adjacent interslice ray segments 528 diverge beyond a given divergence threshold. The fourth preferred form of the method also includes maintaining the sight rays 530 formed in the first execution of the combining step throughout sequential sweeping through subsequent slices, that is, new sight rays are not normally cast when each subsequent slice is processed. However, new sight rays are cast whenever one of merging and splitting is performed. When merging is performed, a new sight ray is generated from the view point 412 to a preselected location in the neighborhood of the identical grid point location (as discussed above); while when splitting is performed, two new sight rays are generated from the view point 412 to corresponding preselected locations in the compositing buffer (as discussed above with respect to the current slice for the third preferred method; the same considerations apply here). Merging and splitting have been discussed in detail above.

Finally, again with reference to FIG. 40, the fourth preferred form of the method preferably includes storing the results of the interpolation and combination in an adjacent grid point location when the accumulated offset exceeds a predetermined value; the storing is done together with a new value for the accumulated offset.

In the fourth preferred form of the method, the merging is preferably employed when the combining step is performed from back to front with respect to the view point 412, while splitting is preferably employed when the combining step is performed from front to back with respect to the view point 412. Reference should now be had FIG. 48, which depicts a form of the fourth preferred method using splitting with front-to-back compositing and front-to-back processing (i.e., sweeping). As each slice becomes the current slice, two new sight rays 530 are cast from the view point 412 through preselected locations 552 in the compositing buffer slice whenever a splitting operation is carried out. Ray splits are again indicated by the dotted horizontal lines with arrow heads at either end (items 550). Once again, the "x" marks denote voxels beyond 45°.

As in the third preferred method, an especially preferred form of the fourth method includes the additional step of dividing the three dimensional buffer 450 into a plurality of zones 540 separated by zone boundaries 542. In the case of the fourth preferred method, the merging and splitting are confined to individual zones 540 and also to adjacent zones on either side of a given zone 542. Thus, merging and splitting, for any given zone 542, do not occur across more than one of the zone boundaries 542 on each side of the given zone 540. Again, the zones and zone boundaries are selected for enhancing image sharpness and accuracy and reduction of alaising. Again, as in the third preferred method, the zones and zone boundaries 540, 542 are preferably determined by forming generalized three dimensional pyramids which extend from the view point 412 through boundaries of pixels (two dimensional manifestation of voxels 494) associated with the base plane 408 into the three dimensional buffer 450. Again, those voxels 494 that belong to a given one of the zones 540 can be labeled.

It is to be understood, throughout the foregoing discussion of preferred methods and the discussion to be commenced below of preferred forms of apparatus, that perspective projection can be obtained with the view point 412 at a noninfinite distance, while paralleled projection can be obtained by locating the view point 412 at an effectively infinite distance from the dataset.

Reference should now be had to the above-discussed FIGS. 20 and 22, together with FIG. 46, in order to appreciate the apparatus in accordance with the present invention. The description of the apparatus should be read together with the above description of the method, An apparatus for parallel and perspective real time volume visualization via ray-slice-sweeping is responsive to viewing and processing parameters which define a view point. The apparatus generates a three dimensional volume projection image from the view point. The image has a plurality of pixels. The apparatus includes three dimensional buffer 450; a pixel bus 442 which provides global horizontal communication; a plurality of rendering pipelines 440; and a control unit 454 which can be configured as part of the memory 450.

The three dimensional buffer 450 stores a plurality of discrete voxels, each of which has a location and at least one voxel value associated with it. The three dimensional buffer 450 includes a plurality of memory modules 438. The viewing and processing parameters define at least one base plane of the three dimensional buffer 450, as well as first and last processing slices of the three dimensional buffer 450, as discussed above.

Each of the rendering pipelines 440 is vertically coupled to a corresponding one of the plurality of memory units 438 and to the pixel bus 442. Each rendering pipeline 440 has horizontal communication with at most its two nearest neighbors, i.e., the neighbor on each side. Each of the rendering pipelines 440 in turn includes at least a first slice unit 544, which can be in the form of a two-dimensional (2-D) first-in-first-out (FIFO) slice buffer. Slice unit 544 has an input coupled to the corresponding one of the plurality of memory units 438 and has an output. The slice unit 544, in addition to being in the form of the FIFO slice buffer, could be an internal FIFO within the memory module 338, or could include special circuitry within the memory module 338 which permits output of two beams in parallel. The at least first slice unit 544 includes a current slice of sample points parallel to the first processing slice (discussed above). The at least first slice unit 544 also receives voxel values from the three dimensional buffer 450 onto the sample points of the current slice to provide sample point values. Each rendering pipeline 440 further includes a compositing unit 464 having an input which is coupled to the output of the at least first slice unit and having an output which is coupled to the pixel bus 442. Yet further, each rendering pipeline 440 has a two dimensional slice compositing buffer 474 which has a plurality of pixels. Each of the pixels of the two dimensional slice compositing buffer 474 has at least color, transparency (alternatively, opacity) and position associated therewith. The compositing buffer 474 has an input coupled to the output of the compositing unit 464 and has an output coupled back to the input of the compositing unit 464.

Each of the rendering pipelines 440 also includes a first bilinear (or other order) interpolation unit. The first interpolation unit has an input and an output. The input of the first interpolation unit can be coupled to the output of the compositing buffer, as for interpolation unit 472 in FIG. 46. Alternatively, the input of the interpolation unit can be coupled to the corresponding one of the plurality of memory units 438, as for interpolation unit 546 in FIG. 46. The first interpolation unit also has an output. The output is preferably coupled to the input of the compositing unit 464 for the case when the input of the first interpolation unit is coupled to the output of the compositing buffer, as for interpolation unit 472 in FIG. 46. Alternatively, the output of the first interpolation unit can be coupled to the input of the at least first slice unit 544 when the input of the first interpolation unit is coupled to the corresponding one of the plurality of memory units, as for interpolation unit 546.

The control unit 354 initially designates the first processing slice as the current slice and controls sweeping through subsequent slices of the three dimensional buffer 450, with each slice in turn becoming the current slice, until the last processing slice is reached. The sample point values are combined with the pixels of the compositing buffer 474 in the compositing unit 464, along a plurality of interslice ray segments which extend only between the current slice in the first slice unit 544 and a slice contained in the two dimensional slice compositing buffer 474.

In a first preferred form of apparatus in accordance with the present invention, the first slice unit 544 receives the voxel values from the three dimensional buffer 450 directly onto grid points of the current slice of sample points, with the sample points coinciding with the grid points. The interslice ray segments extend along a plurality of sight rays cast from the view point through the grid points of the current slice of sample points. The interslice ray segments extend from the sample points of the current slice in the first slice unit 544 to the slice contained in the two dimensional slice compositing buffer 474. The interslice ray segments intersect the slice contained in the two dimensional slice compositing buffer 474 at a plurality of intersection points.

The interpolation unit has its input coupled to the output of the compositing buffer 474 and its output coupled to the input of the compositing unit 464. That is, the configuration of interpolation unit designated as 472 in FIG. 46 is employed. The interpolation unit 472 receives signals associated with pixels of the two dimensional slice compositing buffer 474 which are adjacent the intersection points, and provides interpolated pixel values for combination with the sample points of a current slice in the compositing unit 464. The control unit 454 recasts the sight rays as each of the subsequent slices becomes the current slice.

In a particularly preferred form of the first preferred apparatus, each of the rendering pipelines 440 further includes a second slice unit 548 having an input coupled to the output of the first slice unit 544 and having an output. The second slice unit can be a FIFO or special configuration of memory 438, as set forth above with respect to the first slice unit. Each pipeline 440 also preferably contains a gradient computation unit 468 having an input coupled to the output of the second slice unit 548 and having an output; and each rendering pipeline 440 preferably further contains a shading unit 466 having input coupled to the output of the gradient computation unit 468 and having an output coupled to the input of the compositing unit 464. The second slice unit 548 is used for gradient computation in conjunction with the gradient computation unit 468.

In a second preferred form of apparatus in accordance with the present invention, the first interpolation unit has its input coupled to the three dimensional buffer 450 and its output coupled to the input of the first slice unit 544, i.e., the interpolation unit is configured as item 546 in FIG. 46. Further, the interslice ray segments extend along a plurality of sight rays cast from the view point through locations in the slice contained in the 2-D slice compositing buffer 474. The locations correspond to grid point locations of the pixels within the compositing buffer 474, and the sight rays intersect the current slice at a plurality of intersection points. The first interpolation unit 546 receives voxel values associated with voxel locations adjacent the plurality of intersection points and interpolates among the voxel values to provide interpolated voxel values associated with the plurality of intersection points. The control unit 454 recasts the sight rays as each of the subsequent slices becomes the current slice.

In an especially preferred form of the second preferred embodiment of apparatus in accordance with the invention, each of the plurality of rendering pipelines 440 further includes a second slice unit 548 having an input coupled to the output of the first slice unit 544 and having an output; a gradient computation unit 468 having an input coupled to the output of the second slice unit 548 and having an output; and a shading unit 466 having an input coupled to the output of the gradient computation unit 468 and having an output coupled to the input of the compositing unit 464. The second slice unit 548 can be a FIFO or specially configured memory, as discussed above. Furthermore, each of the plurality of rendering pipelines 440 preferably also includes a second interpolation unit (preferably bilinear) having an input coupled to the output of the compositing buffer 474 and having an output coupled to the input of the compositing unit 464, i.e., interpolation unit 472 is preferably also used along with interpolation unit 546 in the second preferred form of apparatus. The second slice unit 548 is employed for gradient estimation in conjunction with the gradient computation unit 468.

In a third preferred form of apparatus in accordance with the present invention, the first slice unit 544 receives the voxel values from the three dimensional buffer 450 directly onto grid points of the current slice of sample points, with the sample points coinciding with the grid points. The interslice ray segments extend along a plurality of sight rays cast from the view point through the grid points of the current slice of sample points. The interslice ray segments extend from the sample points of the current slice in the slice unit 544 to the slice contained in the two dimensional slice compositing buffer 474, with the interslice ray segments intersecting the slice contained in the two dimensional slice compositing buffer 474 at a plurality of intersection points.

The first interpolation unit (preferably bilinear) has its input coupled to the output of the compositing buffer 474 and its output coupled to the input of the compositing unit 464. Essentially, the first interpolation unit is configured as item 472 in FIG. 46. The first interpolation unit 472 receives signals associated with pixels of the two dimensional slice compositing buffer 474 which are adjacent the intersection points and provides interpolated pixel values for combination with the sample points of the current slice within the compositing unit 464. Results of the combination of the interpolated pixel values and the sample points of the current slice are stored, with an accumulated offset, in grid point locations of those of the pixels in the compositing buffer 474 which are closest to the intersection of the sight rays with the compositing buffer 474.

Furthermore, in the third preferred form of apparatus, the control unit 454 enables one of merging of two or more of the interslice ray segments ray segments or splitting of at least one of the interslice ray segments. It is to be understood that the control unit 454 provides appropriate controls to, for example, the compositing unit 464 so that the compositing unit 464 performs the merging or splitting. Throughout the application, this meaning is included when it is stated that the control unit enables a particular function. As discussed above with respect to the method, merging is performed when an attempt is made to store two or more of the results of the interpolation and the combination in an identical grid point location. Splitting is performed when adjacent interslice ray segments diverge beyond a divergence threshold, determined as set forth above with respect to the method.

Further, the control unit 454 maintains the sight rays throughout the sequential sweeping through the subsequent slices, except when one of the merging and the splitting is performed. The control unit 454 generates a new sight ray from the view point to a preselected location in the neighborhood of the identical grid point location when merging is performed and generates two new sight rays from the view point to corresponding preselected locations in the current slice when the splitting is performed. In either case, the preselected locations are determined as set forth above with respect to the method. Furthermore, the control unit 454 stores the results of the interpolation and combination in an adjacent one of the grid point locations when the accumulated offset exceeds a predetermined value (also as set forth above with respect to the method). The storing is done together with a new accumulated offset value.

In an especially preferred form of the third preferred form of apparatus, the control unit 454 divides the three dimensional buffer 350 into a plurality of zones separated by zone boundaries of the type described above, and the merging and splitting are confined to the zones and do not occur across the zone boundaries. The zone and zone boundaries are selected for enhancing image sharpness and accuracy, as set forth above.

In a fourth preferred form of apparatus in accordance with the present invention, the first interpolation unit has its input coupled to the three dimensional buffer 450 and its output coupled to the input of the first slice unit 544, i.e., the first interpolation unit (preferably bilinear) is connected in accordance with item 546 in FIG. 46. Further, the interslice ray segments extend along a plurality of sight rays cast from the view point through locations in the slice contained in the two dimensional slice compositing buffer 474, with the locations corresponding to grid point locations of the pixels within the compositing buffer 474. The sight rays intersect the current slice at a plurality of intersection points.

The first interpolation unit 546 receives voxel values associated with voxel locations adjacent the plurality of intersection points and interpolates among the voxel values to provide interpolated voxel values associated with the plurality of intersection points for combination with the pixels of the compositing buffer 474. Results of the combination are stored, with an accumulated offset, in the grid point locations of the pixels within the compositing buffer 474.

Furthermore, the control unit 454 enables (see discussion above) one of merging and splitting of the interslice ray segments. Specifically, merging of two or more of the interslice ray segments is performed when an attempt is made to store two or more of the results of the interpolation and combination at an identical grid point location. Splitting of at least one of the interslice ray segments is performed when adjacent interslice ray segments diverge beyond a divergence threshold (discussed above with respect to the method). Further, the control unit 454 maintains the sight rays throughout the sequential sweeping through the subsequent slices, except when the merging or splitting is performed. Yet further, the control unit 454 generates a new sight ray from the view point to a preselected location in the neighborhood of the identical grid point location when merging is performed and generates two new sight rays from the view point to corresponding preselected locations in the compositing buffer 474 when splitting is performed. Finally, the control unit 454 stores the results of the interpolation and combination in an adjacent one of the grid point locations when the accumulated offset exceeds a predetermined value. The storing is done together with a new accumulated offset value. Further details are provided above in the discussion of the fourth preferred method.

In a particularly preferred form of the fourth preferred apparatus, the control unit 454 divides the three dimensional buffer 450 into a plurality of zones separated by zone boundaries, as described above. As also described above, the merging and splitting is confined to individual zones and, in the case of the fourth preferred apparatus, to adjacent zones (the zone immediately on either side) and does not occur, for a given zone, across more than one of the zone boundaries on each side of the given zone. The zones and zone boundaries are selected for enhancing image sharpness and accuracy and for reduction of aliasing, as set forth above with respect to the fourth preferred method.

Finally, the apparatus in accordance with the present invention can include a global feedback connection 548 between pixel bus 442 and 3-D buffer 450, as shown in FIG. 20. Global feedback connection 548 forms a global feedback loop. The global feedback loop is configured for feedback from the pixel bus 442 to the three dimensional buffer 450, and subsequently to any of the intermediate stages 544, 546, 548, 468, 466, 464, 474 and 472, for example, in the rendering pipelines 440. Feedback to any of the intermediate stages depicted in FIG. 22 is also possible. Global feedback enables reuse of intermediate results and enhances the flexibility of the present apparatus and method. It will be appreciated that any of the methods set forth above can include a method step of providing global feedback from the pixel bus 442 to the three dimensional buffer 450, and subsequently to any of the intermediate stages. The global feedback can be provided for purposes of changing the order of computation in a given pipeline 440. One might choose to perform interpolation at the end of a pipeline; or if one had data which was not shaded, it would be possible to shade the input data and then restore it in the cubic frame buffer 450 for subsequent use as original input data. Yet further, one could make one pass through the pipeline to filter the data and make smoother transitions.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A ray-slice-sweeping method for generating a three-dimensional (3-D) volume projection image having a plurality of pixels, said image being generated from a view point, said method utilizing discrete voxels stored in a 3-D buffer, each of said voxels having a location and at least one voxel value associated therewith, said method comprising the steps of:

(a) selecting viewing and processing parameters which define:
      said view point;
      at least one base plane of said 3-D buffer which is employed for projection purposes; and
      first and last processing slices of said 3-D buffer;

(b) initializing a compositing buffer having a plurality of pixels, each of said pixels having at least color, transparency and position associated therewith;

(c) sampling voxel values from said 3-D buffer onto a current slice of sample points parallel to said first processing slice to provide sample point values, said current slice being said first processing slice during a first execution of step(c);

(d) combining said sample point values with said pixels of said compositing buffer along a plurality of interslice ray segments, said segments extending only between said current slice and an adjacent slice associated with said compositing buffer; and (e) repeating steps (c) and (d) by sequentially sweeping through subsequent slices of sample points parallel to said first processing slice until said last processing slice is reached, each of said subsequent slices in turn becoming said current slice.

2. The ray-slice-sweeping method of claim 1, wherein:

step (c) includes sampling said voxel values from said 3-D buffer directly onto grid points of said current slice of sample points, said sample points coinciding with said grid points;

step (d) includes the sub-step of casting a plurality of sight rays from said view point through said grid points of said current slice of sample points, said interslice ray segments extending along said sight rays from said sample points of said current slice to said adjacent slice associated with said compositing buffer, said interslice ray segments intersecting said adjacent slice at a plurality of intersection points; and step (e) includes re-casting said sight rays as each of said subsequent slices becomes said current slice;

said method further comprising the additional step of:
      (f) performing one of:
         zero order interpolation;
         first order interpolation;
         second order interpolation;
         third order interpolation;
         higher order interpolation; and
         adaptive combinations thereof,
         said interpolation being performed among pixels of said compositing buffer adjacent said intersection points in order to provide interpolated pixel values for combination with said sample points of said current slice.

3. The ray-slice-sweeping method of claim 2, wherein step (f) includes performing bilinear interpolation among said pixels adjacent said intersection points.

4. The ray-slice-sweeping method of claim 3, wherein:
   said view point is in front of said 3-D buffer;

said first processing slice is in front of said 3-D buffer;
said last processing slice is in back of said 3-D buffer; and
in step (d), said combining is performed from front to back with respect to said view point.

5. The ray-slice-sweeping method of claim 3, wherein:
said view point is in front of said 3-D buffer;
said first processing slice is in back of said 3-D buffer;
said last processing slice is in front of said 3-D buffer; and
step (d), said combining is performed from back to front with respect to said view point.

6. The ray-slice-sweeping method of claim 3, wherein:
said view point is in back of said 3-D buffer;
said first processing slice is in front of said 3-D buffer;
said last processing slice is in back of said 3-D buffer; and
in step (d), said combining is performed from back to front with respect to said view point.

7. The ray-slice-sweeping method of claim 3, wherein:
said view point is in back of said 3-D buffer;
said first processing slice is in back of said 3-D buffer;
said last processing slice is in front of said 3-D buffer; and
in step (d), said combining is performed from front to back with respect to said view point.

8. The ray-slice-sweeping method of claim 1, wherein:
step (d) includes the sub-step of casting a plurality of sight rays from said view point through locations in said adjacent slice associated with said compositing buffer, said locations corresponding to grid point locations of said pixels within said compositing buffer, said sight rays intersecting said current slice at a plurality of intersection points;
step (c) includes sampling said voxel values from said 3-D buffer onto said plurality of intersection points by performing one of:
zero order interpolation;
first order interpolation;
second order interpolation;
third order interpolation;
higher order interpolation; and
adaptive combinations thereof, said interpolation being performed among voxel values associated with voxel locations adjacent said plurality of intersection points; and
step (e) includes re-casting said sight rays as each of said subsequent slices becomes said current slice.

9. The ray-slice-sweeping method of claim 8, wherein step (c) includes performing bilinear interpolation among said voxel values associated with said voxel locations adjacent said plurality of intersection points.

10. The ray-slice-sweeping method of claim 9, wherein:
said view point is in front of said 3-D buffer;
said first processing slice is in front of said 3-D buffer;
said last processing slice is in back of said 3-D buffer; and
in step (d), said combining is performed from front to back with respect to said view point.

11. The ray-slice-sweeping method of claim 9, wherein:
said view point is in front of said 3-D buffer;
said first processing slice is in back of said 3-D buffer;
said last processing slice is in front of said 3-D buffer; and
in step (d), said combining is performed from back to front with respect to said view point.

12. The ray-slice-sweeping method of claim 9, wherein:
said view point is in back of said 3-D buffer;

said first processing slice is in front of said 3-D buffer;
said last processing slice is in back of said 3-D buffer; and
in step (d), said combining is performed from back to front with respect to said view point.

13. The ray-slice-sweeping method of claim 9, wherein:
said view point is in back of said 3-D buffer;
said first processing slice is in back of said 3-D buffer;
said last processing slice is in front of said 3-D buffer; and
in step (d), said combining is performed from front to back with respect to said view point.

14. The ray-slice-sweeping method of claim 1, wherein:
step(c) includes sampling said voxel values from said 3-D buffer directly onto grid points of said current slice of sample points, said sample points coinciding with said grid points; and
a first execution of step (d) includes the sub-step of casting a plurality of sight rays from said view point through said grid points of said current slice of sample points, said interslice ray segments extending from said sample points of said current slice to intersections of said sight rays with said compositing buffer;
said method further comprising the additional steps of:
(f) performing one of:
zero order interpolation;
first order interpolation;
second order interpolation;
third order interpolation;
higher order interpolation; and
adaptive combinations thereof,
said interpolation being performed among pixels of said compositing buffer adjacent said intersection points in order to provide interpolated pixel values for combination with said sample points of said current slice, results of said interpolation and said combination of step (d) being stored, with an accumulated offset, in grid point locations of those of said pixels in said compositing buffer which are closest to said intersections of said sight rays with said compositing buffer;
(g) performing one of:
(i) merging of two or more of said interslice ray segments when two or more of said results of said interpolation and said combination are attempted to be stored at an identical grid point location; and
(ii) splitting of at least one of said interstice ray segments when adjacent interstice ray segments diverge beyond a divergence threshold;
(h) maintaining said sight rays formed in said first execution of step (d) throughout said sequential sweeping through said subsequent slices, except when one of said merging and said splitting is performed;
(i) generating a new sight ray from said view point to a preselected location in the neighborhood of said identical grid point location when said merging is performed;
(j) generating two new sight rays from said view point to corresponding preselected locations in said current slice when said splitting is performed; and
(k) storing said results of said interpolation and said combination of step (d) in an adjacent one of said grid point locations when said accumulated offset exceeds a predetermined value, said storing being done together with a new accumulated offset value.

15. The ray-slice-sweeping method of claim 14, wherein:
step (g) comprises said merging of said two or more of said interslice ray segments; and in step (d), said combining is performed from back to front with respect to said view point.

16. The ray-slice-sweeping method of claim 15, wherein step (f) comprises performing bilinear interpolation among said pixels of said compositing buffer adjacent said intersection points.

17. The ray-slice-sweeping method of claim 14, wherein:
step (g) comprises said splitting of said at least one of said interstice ray segments; and
in step (d), said combining is performed from front to back with respect to said view point.

18. The ray-slice-sweeping method of claim 17, wherein step (f) comprises performing bilinear interpolation among said pixels of said compositing buffer adjacent said intersection points.

19. The ray-slice-sweeping method of claim 14, further comprising the additional step of:
(1) dividing said 3-D buffer into a plurality of zones separated by zone boundaries, said merging and splitting being confined to said zones and not occurring across said zone boundaries, said zones and zone boundaries being selected for enhancing image sharpness and accuracy.

20. The ray-slice-sweeping method of claim 19, wherein said zone boundaries are determined by forming generalized 3-D pyramids extending from said view point through boundaries of pixels associated with said base plane into said 3-D buffer, further comprising the additional step of:
(m) labeling those voxels that belong to a given one of said zones.

21. The ray-slice-sweeping method of claim 1, wherein:
a first execution of step (d) includes the sub-step of casting a plurality of sight rays from said view point through locations in said adjacent slice associated with said compositing buffer, said locations corresponding to grid point locations of said pixels within said compositing buffer, said sight rays intersecting said current slice at a plurality of intersection points, said interslice ray segments extending from said grid point locations of said pixels within said compositing buffer to said intersection points; and
step (c) includes sampling said voxel values from said 3-D buffer onto said plurality of intersection points by performing one of:
zero order interpolation;
first order interpolation;
second order interpolation;
third order interpolation;
higher order interpolation; and
adaptive combinations thereof,
said interpolation being performed among voxel values associated with voxel locations adjacent said plurality of intersection points;
said method further comprising the additional steps of:
(f) storing results of said interpolation and said combination of step (d), with an accumulated offset, in said grid point locations of said pixels within said compositing buffer;
(g) performing one of:
(i) merging of two or more of said interslice ray segments when two or more of said results of said interpolation and said combination are attempted to be stored at an identical grid point location; and
(ii) splitting of at least one of said interslice ray segments when adjacent interslice ray segments diverge beyond a divergence threshold;

(h) maintaining said sight rays formed in said first execution of step (d) throughout said sequential sweeping through said subsequent slices, except when one of said merging and said splitting is performed;
(i) generating a new sight ray from said view point to a preselected location in the neighborhood of said identical grid point location when said merging is performed;
(j) generating two new sight rays from said view point to corresponding preselected locations in said compositing buffer when said splitting is performed; and
(k) storing said results of said interpolation and said combination of step (d) in an adjacent one of said grid point locations when said accumulated offset exceeds a predetermined value, said storing being done together with a new accumulated offset value.

22. The ray-slice-sweeping method of claim 21, wherein:
step (g) comprises said merging of said two or more of said interslice ray segments; and
in step (d), said combining is performed from back to front with respect to said view point.

23. The ray-slice-sweeping method of claim 22, wherein step (f) comprises performing bilinear interpolation among said voxel values associated with said voxel locations adjacent said plurality of intersection points.

24. The ray-slice-sweeping method of claim 21, wherein:
step (g) comprises said splitting of said at least one of said interslice ray segments; and
in step (d), said combining is performed from front to back with respect to said view point.

25. The ray-slice-sweeping method of claim 24, wherein step (f) comprises performing bilinear interpolation among said voxel values associated with said voxel locations adjacent said plurality of intersection points.

26. The ray-slice-sweeping method of claim 21, further comprising the additional step of:
(1) dividing said 3-D buffer into a plurality of zones separated by zone boundaries, said merging and splitting being confined to individual zones and adjacent zones only and not occurring, for a given zone, across more than one of said zone boundaries on each side of said given zone, said zones and zone boundaries being selected for enhancing image sharpness and accuracy and for reduction of aliasing.

27. The ray-slice-sweeping method of claim 26, wherein said zone boundaries are determined by forming generalized 3-D pyramids extending from said view point through boundaries of pixels associated with said base plane into said 3-D buffer, further comprising the additional step of:
(m) labeling those voxels that belong to a given one of said zones.

28. An apparatus for parallel and perspective real-time volume visualization via ray-slice-sweeping, said apparatus being responsive to viewing and processing parameters which define a view point, said apparatus generating a three-dimensional (3-D) volume projection image from said view point, said image having a plurality of pixels, said apparatus comprising:
(a) a three-dimensional (3-D) buffer which stores a plurality of discrete voxels, each of said voxels having a location and at least one voxel value associated therewith, said three-dimensional buffer including a plurality of memory units, said viewing and processing parameters defining at least one base plane of said 3-D buffer and first and last processing slices of said 3-D buffer;

(b) a pixel bus which provides global horizontal communication;

(c) a plurality of rendering pipelines, each of said rendering pipelines being vertically coupled to both a corresponding one of said plurality of memory units and said pixel bus, each of said rendering pipelines having horizontal communication with at most its two nearest neighbors, each of said rendering pipelines in turn comprising:

(i) at least a first slice unit having an input coupled to said corresponding one of said plurality of memory units and having an output, said slice unit including a current slice of sample points parallel to said first processing slice, said slice unit receiving voxel values from said 3-D buffer onto said sample points to provide sample point values;

(ii) a compositing unit having an input which is coupled to said output of said slice unit and having an output which is coupled to said pixel bus;

(iii) a two-dimensional slice compositing buffer having a plurality of pixels, each of said pixels having at least color, transparency and position associated therewith, said compositing buffer having an input coupled to said output of said compositing unit and having an output coupled to said input of said compositing unit; and (iv) a first bilinear interpolation unit having an input coupled to one of:
said output of said compositing buffer; and
said corresponding one of said plurality of memory units;

said bilinear interpolation unit having an output which is coupled to:
said input of said compositing unit when said input of said bilinear interpolation unit is coupled to said output of said compositing buffer; and
said input of said at least first slice unit when said input of said bilinear interpolation unit is coupled to said corresponding one of said plurality of memory units; and (d) a control unit which initially designates said first processing slice as said current slice and which controls sweeping through subsequent slices of said 3-D buffer as current slices, until said last processing slice is reached; wherein said sample point values are combined with said pixels of said compositing buffer in said compositing unit, said combination occurring along a plurality of interslice ray segments extending only between said current slice in said slice unit and a slice contained in said 2-D slice compositing buffer.

29. The apparatus of claim 28, wherein:

said slice unit receives said voxel values from said 3-D buffer directly onto grid points of said current slice of sample points, said sample points coinciding with said grid points;

said interslice ray segments extend along a plurality of sight rays cast from said view point through said grid points of said current slice of sample points, said interslice ray segments extending from said sample points of said current slice in said slice unit to said slice contained in said 2-D slice compositing buffer, said interslice ray segments intersecting said slice contained in said 2-D slice compositing buffer at a plurality of intersection points;

said bilinear interpolation unit has its input coupled to said output of said compositing buffer and its output coupled to said input of said compositing unit, said bilinear interpolation unit receiving signals associated with pixels of said 2-D slice compositing buffer which are adjacent said intersection points and providing interpolated pixel values for combination with said sample points of said current slice in said compositing unit; and said control unit recasts said sight rays as each of said subsequent slices becomes said current slice.

30. The apparatus of claim 29, wherein each of said plurality of rendering pipelines further comprises:

(v) a second slice unit having an input coupled to said output of said first slice unit and having an output;

(vi) a gradient computation unit having an input coupled to said output of said second slice unit and having an output; and (vii) a shading unit having an input coupled to said output of said gradient computation unit and having an output coupled to said input of said compositing unit; wherein said second slice unit is used for gradient estimation in conjunction with said gradient computation unit.

31. The apparatus of claim 28, wherein:

said first bilinear interpolation unit has its input coupled to said 3-D buffer and its output coupled to said input of said slice unit;

said interslice ray segments extend along a plurality of sight rays cast from said view point through locations in said slice contained in said 2-D slice compositing buffer, said locations corresponding to grid point locations of said pixels within said compositing buffer, said sight rays intersecting said current slice at a plurality of intersection points;

said first bilinear interpolation unit receives voxel values associated with voxel locations adjacent said plurality of intersection points and interpolates among said voxel values to provide interpolated voxel values associated with said plurality of intersection points; and said control unit recasts said sight rays as each of said subsequent slices becomes said current slice.

32. The apparatus of claim 31, wherein each of said plurality of rendering pipelines further comprises:

(v) a second slice unit having an input coupled to said output of said first slice unit and having an output;

(vi) a gradient computation unit having an input coupled to said output of said second slice unit and having an output;

(vii) a shading unit having an input coupled to said output of said gradient computation unit and having an output coupled to said input of said compositing unit; and (viii) a second bilinear interpolation unit having an input coupled to said output of said compositing buffer and having an output coupled to said input of said compositing unit; wherein said second slice unit is used for gradient estimation in conjunction with said gradient computation unit.

33. The apparatus of claim 28, wherein:

said slice unit receives said voxel values from said 3-D buffer directly onto grid points of said current slice of sample points, said sample points coinciding with said grid points;

said interslice ray segments extend along a plurality of sight rays cast from said view point through said grid points of said current slice of sample points, said interslice ray segments extending from said sample points of said current slice in said slice unit to said slice contained in said 2-D slice compositing buffer, said interslice ray segments intersecting said slice contained in said 2-D slice compositing buffer at a plurality of intersection points;

said first bilinear interpolation unit has its input coupled to said output of said compositing buffer and its output coupled to said input of said compositing unit, said bilinear interpolation unit receiving signals associated with pixels of said 2-D slice compositing buffer which are adjacent said intersection points and providing interpolated pixel values for combination with said sample points of said current slice in said compositing unit, results of said combination of said interpolated pixel values and said sample points of said current slice being stored, with an accumulated offset, in grid point locations of those of said pixels in said compositing buffer which are closest to said intersection of said sight rays with said compositing buffer; and said control unit:
  enables one of:
    (i) merging of two or more of said interslice ray segments when two or more of said results of said interpolation and said combination are attempted to be stored at an identical grid point location; and
    (ii) splitting of at least one of said interslice ray segments when adjacent interslice ray segments diverge beyond a divergence threshold;
  maintains said sight rays throughout said sequential sweeping through said subsequent slices, except when one of said merging and said splitting is performed;
  generates a new sight ray from said view point to a preselected location in the neighborhood of said identical grid point location when said merging is performed;
  generates two new sight rays from said view point to corresponding preselected locations in said current slice when said splitting is performed; and
  stores said results of said interpolation and said combination in an adjacent one of said grid point locations when said accumulated offset exceeds a predetermined value, said storing being done together with a new accumulated offset value.

34. The apparatus of claim 33, wherein said control unit divides said 3-D buffer into a plurality of zones separated by zone boundaries, said merging and splitting being confined to said zones and not occurring across said zone boundaries, said zones and said zone boundaries being selected for enhancing image sharpness and accuracy.

35. The apparatus of claim 28, wherein:
  said first bilinear interpolation unit has its input coupled to said 3-D buffer and its output coupled to said input of said slice unit;
  said interslice ray segments extend along a plurality of sight rays cast from said view point through locations in said slice contained in said 2-D slice compositing buffer, said locations corresponding to grid point locations of said pixels within said compositing buffer, said sight rays intersecting said current slice at a plurality of intersection points;
  said first bilinear interpolation unit receives voxel values associated with voxel locations adjacent said plurality of intersection points and interpolates among said voxel values to provide interpolated voxel values associated with said plurality of intersection points for combination with said pixels of said compositing buffer, results of said combination being stored, with an accumulated offset, in said grid point locations of said pixels within said compositing buffer; and
  said control unit:
    enables one of:
      (i) merging of two or more of said interslice ray segments when two or more of said results of said interpolation and said combination are attempted to be stored at an identical grid point location; and
      (ii) splitting of at least one of said interslice ray segments when adjacent interslice ray segments diverge beyond a divergence threshold;
    maintains said sight rays throughout said sequential sweeping through said subsequent slices, except when one of said merging and said splitting is performed;
    generates a new sight ray from said view point to a preselected location in the neighborhood of said identical grid point location when said merging is performed;
    generates two new sight rays from said view point to corresponding preselected locations in said compositing buffer when said splitting is performed; and
    said results of said interpolation and said combination in an adjacent one of said grid point locations when said accumulated offset exceeds a predetermined value, said storing being done together with a new accumulated offset value.

36. The apparatus of claim 35, wherein said control unit divides said 3-D buffer into a plurality of zones separated by zone boundaries, said merging and splitting being confined to individual zones and adjacent zones only and not occurring, for a given zone, across more than one of said zone boundaries on each side of said given zone, said zones and zone boundaries being selected for enhancing image sharpness and accuracy and for reduction of aliasing.

37. The apparatus of claim 28, further comprising:
  (e) a global feedback connection between said pixel bus and said 3-D buffer, said global feedback connection forming a global feedback loop, said global feedback loop being configured for feedback from said pixel bus to said 3-D buffer, and subsequently to any intermediate stage in said plurality of rendering pipelines.

* * * * *

UNITED STATES PATENT AND TRADEMARK OFFICE
CERTIFICATE OF CORRECTION

PATENT NO. : 5,847,711
DATED : December 8, 1998
INVENTOR(S) : Kaufman, et al.

It is certified that error appears in the above-indentified patent and that said Letters Patent is hereby corrected as shown below:

In Column 8, Line 43,     the patent now reads "real-time time"; this should read --real-time--

In Column 15, Line 54,     the patent now reads "$P_{000}$ a(1-b)(1-c)" this should read --$P_{100}$ a(1-b)(1-c)--

In Column 15, Line 58,     the patent now reads "comer"; this should read --corner--

In Column 15, Line 60,     the patent now reads "comer"; this should read --corner--

In Column 28, Line 64,     the patent now reads "2n)2mod n"; this should read --2n) mod n--

In Column 29, Line 35,     the patent now reads "GX, G, and G."; this should read --$G_x$, $G_y$ and $G_z$--

In Column 38, Line 45,     the patent now reads "intersice"; this should read --interslice--

UNITED STATES PATENT AND TRADEMARK OFFICE
CERTIFICATE OF CORRECTION

PATENT NO. : 5,847,711
DATED : December 8, 1998
INVENTOR(S) : Kaufman, et al.

It is certified that error appears in the above-indentified patent and that said Letters Patent is hereby corrected as shown below:

<u>In Column 40, Line 17,</u>   the patent now reads "thereof The"; this should read --thereof. The--

<u>In Column 51, Line 9,</u>   the patent now reads "interstice"; this should read --interslice--

Signed and Sealed this

Thirteenth Day of April, 1999

Attest:

Q. TODD DICKINSON

*Attesting Officer*   Acting Commissioner of Patents and Trademarks